United States Patent [19]
Iijima et al.

[11] Patent Number: 5,587,264
[45] Date of Patent: Dec. 24, 1996

[54] ELECTROSTATIC INFORMATION RECORDING MEDIUM AND ELECTROSTATIC INFORMATION RECORDING AND REPRODUCING METHOD

[75] Inventors: Masayuki Iijima; Kyoji Dantani; Hiroyuki Obata; Makoto Matsuo; Minoru Utsumi; Seiji Take, all of Tokyo, Japan

[73] Assignee: Dai Nippon Printing Co. Ltd., Tokyo, Japan

[21] Appl. No.: 462,563

[22] Filed: Jun. 5, 1995

Related U.S. Application Data

[60] Continuation of Ser. No. 981,141, Nov. 24, 1992, abandoned, which is a division of Ser. No. 613,689, filed as PCT/JP90/00341, Mar. 15, 1990, abandoned.

[30] Foreign Application Priority Data

| Mar. 16, 1989 | [JP] | Japan | 1-064264 |
| Mar. 18, 1989 | [JP] | Japan | 1-066793 |
| Mar. 18, 1989 | [JP] | Japan | 1-066796 |
| Mar. 18, 1989 | [JP] | Japan | 1-067242 |
| Mar. 18, 1989 | [JP] | Japan | 1-067248 |

[51] Int. Cl.⁶ ................ G03G 15/02
[52] U.S. Cl. .............. 430/57; 430/60; 430/62; 430/48; 430/31
[58] Field of Search .......... 430/57, 60, 20, 430/62, 48, 31

[56] References Cited

U.S. PATENT DOCUMENTS

| 4,496,642 | 1/1985 | Tam et al. | 430/127 |
| 4,762,761 | 8/1988 | Mitani | 430/65 |
| 5,161,233 | 5/1989 | Matsuo et al. | 430/48 |

Primary Examiner—S. Rosasco
Attorney, Agent, or Firm—Nikaido, Marmelstein, Murray & Oram LLP

[57] ABSTRACT

The electrostatic information recording medium according to the present invention comprises an electrode layer and an electric charge retaining layer. By improving the laminating method of electric charge retaining layer or by improving the layer arrangement or by converting electrostatic information to the visible information or position information, high information retaining property can be obtained and the accumulated electrostatic information can be maintained for long period.

In the electrostatic information recording method according to the present invention, an electrostatic information recording medium is placed face-to-face to a photosensitive member having photoconductive layer on an electrode. The image exposure is performed by applying voltage between two electrodes, and the electrostatic information corresponding to the image exposure is recorded on the electrostatic information recording medium. The electrostatic information recorded in the electric charge retaining layer is easily reproduced by reading surface potential and by amplifying and outputting, or by electro-optical reading method, and further, by toner development.

The electrostatic information recording medium according to the present invention has excellent memory capacity with information density of $8 \times 10^8$ bits/cm². For example, it is possible to record the information by electrostatic information recording method using a photosensitive member, to record analog, digital, image, sound and (0.1) information, and to apply for electrostatic recording card and the like.

14 Claims, 28 Drawing Sheets

FIG. 4
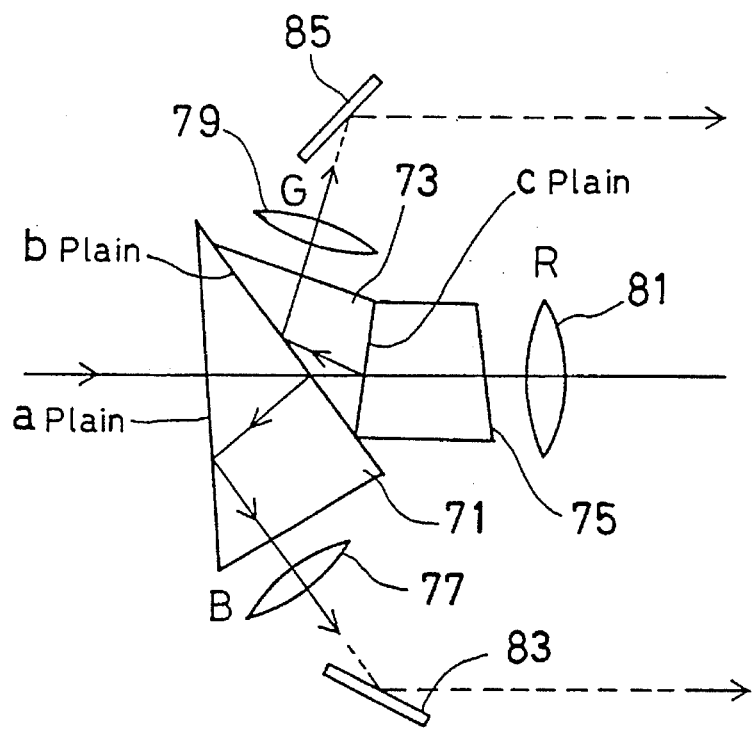
FIG.5(a)
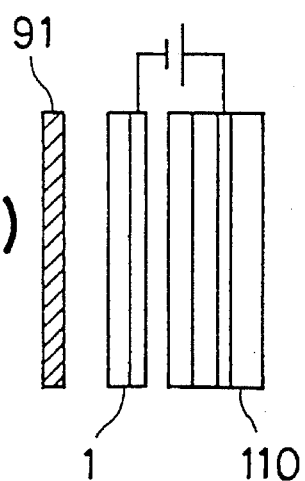
FIG.5(b)
FIG.5(c)
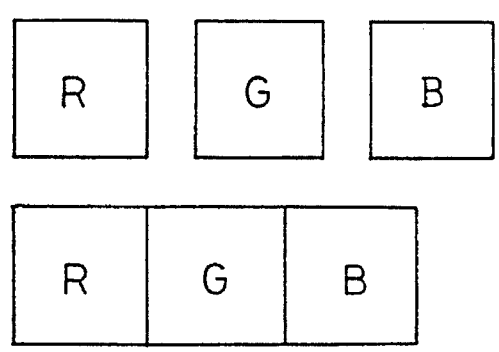

ELECTROSTATIC INFORMATION RECORDING MEDIUM AND ELECTROSTATIC INFORMATION RECORDING AND REPRODUCING METHOD

This application is a continuation of application Ser. No. 07/981,141 filed Nov. 24, 1992 now abandoned, which in turn is a division of application Ser. No. 07/613,689, filed as PCT/JP90/00341, Mar. 15, 1990, now abandoned.

FIELD OF THE INVENTION

The present invention relates to an electrostatic information recording medium, on which information can be electrostatically recorded by exposure under voltage application and the information can be reproduced at any desired time, and in particular to an electrostatic information recording medium having excellent electrostatic information retaining property and an electrostatic information recording and reproducing method using the same.

TECHNICAL BACKGROUND

In the electro photographic technique, a method is known in the past, in which a photoconductive layer is vacuum-deposited on an electrode layer, and the exposure is performed after the photoconductive layer is totally charged, electrostatic latent image is optically formed on the photoconductive layer by leaking electric charge on the exposed portion, the toner having electric charge of opposite polarity is attached on the residual electric charge, and the image is electrostatically transferred on paper or the like. This method is primarily used for duplicating purpose, while, according to this method, electrostatic charge retaining period on photoconductive layer is shortened, and toner development is performed immediately after electrostatic latent image is formed. Thus, this cannot be used for photographing purpose because of low sensitivity.

In the television imaging technique, line sequential scanning is required to take up and record electric image signals obtained through image pickup tube. Line sequential scanning is performed by electron beam in the image pickup tube and by magnetic head in video recording. Because resolution depends upon the number of scanning lines, the resolution is extremely decreased compared with planar analog recording such as conventional photography.

Further, the television imaging system using solid image sensor developed in recent years is also essentially the same as far as resolution is concerned. The problems with these techniques are: The higher quality and resolution the image recording has, the more complicated the process is, and the simpler the process is, the more it lacks the memory function or image quality is basically decreased.

Also, there is an electronic imaging technique. According to this method, electrode is vacuum-deposited on a photoconductive layer, and the entire surface of photoconductive layer is electrically charged by corona charging in dark place. Then, it is exposed to strong light to turn the exposed portion of the photoconductive layer to electrically conductive. By leaking electric charge on such portion, electrostatic latent image is optically formed on the surface of the photoconductive layer. The toner having electric charge of opposite polarity (or electric charge of the same polarity) is attached to the residual electrostatic charge, and the image is electrostatically transferred on paper or the like. This is mostly used for duplicating purpose, whereas it cannot be used for photographing because of low sensitivity. Because electrostatic charge retaining time on photoconductive layer as recording medium is short, toner development is usually performed immediately after electrostatic latent image is formed.

Further, a method is known, by which thermoplastic substance layer having selenium particle layer is furnished on a transparent electrode. After total surface corona charging and image exposure, the information is reproduced as visible information through heat development. The accumulated electric charge information is of permanent nature, while corona charging is required for information recording, and the information is reproduced by visualization. (U.S. Pat. Nos. 3,520,681, 4,101,321, and 4,496,642)

In the electrostatic information recording medium having electrode layer and electric charge retaining layer, electrostatic information can be recorded in the form of information electric charge on the electric charge retaining layer through exposure under voltage application, and the accumulated information can be reproduced by reading, amplifying and outputting the surface potential on the surface of electric charge retaining layer. The object of the present invention is to improve electrostatic information retaining property on electrostatic information retaining medium and also to offer an electrostatic information recording medium having excellent electrostatic information (electric charge) retaining property and an electrostatic information recording and reproducing method.

DISCLOSURE OF THE INVENTION

The electrostatic information recording medium according to the present invention has 9 aspects:

The first electrostatic information recording medium comprises an electric charge retaining layer on an electrode, characterized in that said electric charge retaining layer is formed by laminating the insulating resin by vacuum deposition method or by sputtering method while heating the electrode or it is formed by heating after insulating resin is laminated by vacuum deposition method or by sputtering method.

The electric charge retaining layer of the electrostatic information recording medium must be formed from macromolecular material having high insulating property in order to suppress the transfer of electric charge, and it must have the insulating property of $10^{14}$ $\Omega$cm or more as specific resistance. It is generally known that macromolecular material has insulating property, whereas no study has been made on the type of macromolecular material or the electric charge retaining condition from the viewpoint of electric charge retaining property.

In manufacturing the electrostatic information recording medium, it has been found that the electric charge retaining property varies extremely according to the laminating method of insulating macromolecular material. That is, in forming the electric charge retaining layer on an electrode layer, it has been found that, when electrode layer is heated or when insulating material is laminated by vacuum deposition or sputtering and is then heated, the electric charge retaining property is improved more than the electric charge retaining layer manufactured under normal temperature when insulating material is formed by vacuum deposition or sputtering.

The reason is not known in detail, but it appears that, when insulating macromolecular material is laminated on an electrode layer by vacuum deposition method or by sputtering method, insulating material is laminated on electrode layer in island-like form under normal temperature, and electric charge is easily leaked by air discharge because surface area is wide even when the information electric charge is accumulated on the electric charge retaining layer. However, when insulating resin is laminated and electrostatic information recording medium is formed while electrode layer is heated, the film surface formed by vacuum deposition or by sputtering method can be uniformly formed through melting of insulating resin or activation of molecular movement, and it appears that electric charge retaining property can be improved when information electric charge is accumulated on the electric charge retaining layer.

The electrostatic information recording medium thus manufactured can be used for electrostatic recording using electrode needle head or ion flow head or can be used as a recording medium for optical printer such as laser printer. In case it is used for electrostatic information recording method using photosensitive member, planar recording can be achieved. Moreover, because the information electric charge is stably retained on the electric charge retaining layer, information can be reproduced at any desired time. Also, when reproducing the information, the potential difference can be easily detected by measuring the potential difference between the electrode and surface potential. Thus, the information can be reproduced with high quality and high resolution.

The second electrostatic information recording medium comprises an electric charge retaining layer laminated on an electrode, characterized in that said electric charge retaining layer consists of the lamination of a resin layer with low glass transfer temperature and a heat-resistant insulating layer.

The electrostatic information recording method is characterized in that electrostatic information may be recorded on the medium as it is, or electrostatic information may be recorded on the electrostatic information recording medium by heating to higher than the glass transition temperature of the resin with low glass transition temperature, or said electrostatic information recording medium may be heated to higher than glass transition temperature of the resin with low glass transition temperature after electrostatic information is recorded on the electrostatic information recording medium in order to stabilize the electrostatic information on the electrostatic information recording medium.

In general, macromolecular material has glass transition temperature specific to it. Because heat energy is low at the temperature lower than the glass transition temperature, it seems to be an area where one segment of molecular chain cannot move as a whole. On the other hand, because heat energy is increased at the temperature higher than the glass transition temperature, several or more atoms constituting molecular chain can move, and conductivity is generated.

This electrostatic information recording medium has such structure that resin layer with low glass transition temperature and heat-resistant insulating layer are laminated on an electrode. When information electric charge is recorded on the electrostatic information recording medium while it is heated to higher than glass transition temperature of the resin with low glass transition temperature, or when the electrostatic information recording medium is heated to more than glass transition temperature of the resin with low glass transition temperature after electrostatic information is recorded on said electrostatic information recording medium at room temperature, it was found that the information electric charge moves in the resin layer with low glass transition temperature and that information electric charge is stably retained inside the electrostatic information recording medium.

The reason for the stabilization is not known in detail, whereas it appears that electric charge is heated and is apparently induced into the resin layer having low glass transition temperature and being electrically conductive, and that it is retained near the heat-resistant insulating layer. The information electric charge accumulated in the electrostatic information recording medium is protected in the resin layer restoring insulating property and having low glass transition temperature when the electrostatic information recording medium is cooled down. It is then stabilized and not influenced by moisture in the air.

The information electric charge accumulated in this electrostatic information recording medium is very stable because it is stored inside the electric charge retaining layer. When reproducing the information, the potential difference can be easily detected by measuring the potential difference between the electrode and the surface potential, and it can be easily reproduced as the information with high quality and high resolution.

The third electrostatic information recording medium is characterized in that an electrode layer is furnished on a support member, that photoconductive particles or electrically conductive particles are laminated in single layer or in multiple layers near the surface of said electrode layer, and that insulating layer is laminated on said particle layer.

This electrostatic information recording medium has such structure that an electrode is furnished on a support member, that photoconductive particles or electrically conductive particles are laminated in single layer or in multiple layers near the surface of said electrode, and that an insulating layer having specific resistance of $10^{14}$–$10^{18}$ $\Omega$cm is laminated on said particle layer.

Then, this electrostatic information recording medium and the photosensitive member are placed at face-to-face position and image is exposed to light with voltage applied between two electrodes. The information electric charge is first accumulated on the surface of the electrostatic information recording medium. When particle layer consists of photoconductive particles, the entire surface of the electrostatic information recording medium is exposed to light, and carrier is generated on the particle layer of the exposed portion. By giving electric charge corresponding to the information electric charge from the electrode by the electric field generated by the information electric charge, the information electric charge is accumulated on the photoconductive particle layer.

When the particle layer consists of electrically conductive particles, electric charge is accumulated on the electrically conductive particle layer from the electrode by the effect of electric field generated by the electric charge on the surface of the electrostatic information recording medium, and the information electric charge is accumulated in the electrically conductive particle layer in the insulating layer. In this case, the information is permanently held if the electrode terminal is sealed by a protective layer after information is stored to protect the information electric charge stored in the particle layer.

The information electric charge thus stored is extremely stable because it is accumulated inside the insulating layer. Because the particle layer is laminated in the insulating layer, the surface electric charge is again induced by the electric charge accumulated in the particle layer after dried even when it is immersed in water and surface electric charge is erased. Thus, the attenuation of the information electric charge due to moisture in the air can be prevented.

The fourth electrostatic information recording medium is characterized in that an insulating layer is laminated on a first electrode layer, that a second electrode layer having surface area smaller than the insulating layer is laminated on said insulating layer and photoconductive particles or electrically conductive particles are laminated in single layer or in multiple layers near said second electrode layer, and that insulating layer is laminated on the particle layer to incorporate the second electrode layer and the particle layer in the insulating layer.

When this electrostatic information recording medium and the photosensitive member are placed at face-to-face position, and the image is exposed to light with voltage applied between two electrodes, information electric charge is accumulated on the electrostatic information recording medium.

This fourth electrostatic information recording medium makes it possible to further improve the information electric charge retaining property of the above third electrostatic information recording medium.

The recording and the reproduction of information electric charge can be performed by short-circuiting 1st and 2nd electrodes. When reproducing, the information electric charge accumulated in the particles can be easily detected by measuring the potential difference between the electrode incorporated in the insulating layer and the surface potential of the electrostatic information recording medium.

The fifth electrostatic information recording medium comprises an electrode layer and an insulating layer, characterized in that photoconductive layer or electrically conductive layer is laminated on the insulating layer, that said photoconductive layer or said electrically conductive layer is patterned for each pixel, and that an insulating protective film is laminated on said photoconductive layer or electrically conductive layer.

On this electrostatic information recording medium, information electric charge accumulated on the insulating protective film can be maintained in the photoconductive layer or electrically conductive layer patterned for each pixel by providing the insulating protective film with such thickness that the image electric charge can pass through under the presence of electric field. The information can be reproduced from above the protective film. Thus, it is possible to prevent the damage of the surface or the attenuation of the information electric charge.

Further, because photoconductive layer or electrically conductive layer storing electric charge is sealed in the insulating layer, the information electric charge can be preserved for long period, and (0.1) signals can be stored for each pixel through the patterning for each pixel.

The sixth electrostatic information recording medium comprises a first transparent support member, which is placed face-to-face to a photosensitive member consisting of a conductive layer and a photoconductive layer on a transparent support member and which has an insulating layer on the surface facing to the photosensitive member, and a second transparent support member, which is placed face-to-face to said first transparent support member with electro-optical material layer between them and which has a conductive layer facing to the electro-optical material layer, characterized in that the. electro-optical material layer is exposed to light with voltage applied between the conductive layer of the photosensitive member and the conductive layer formed on the second transparent support member.

In this electrostatic information recording medium, electro-optical material layer such as liquid crystal, electro-optical crystal, etc. are incorporated in the electric charge retaining medium. The optical property of electro-optical material layer is changed by placing it face-to-face to the photosensitive member and by the exposure under voltage application. By reading the change of optical property under transmission light or reflected light, it is possible to read the electrostatic pattern with the accuracy of molecular level.

The seventh electrostatic information recording medium is characterized in that liquid crystal polymer layer is laminated on an electrode.

To record or reproduce the electrostatic information, the electrostatic information recording medium is placed face-to-face to the photosensitive member, and image is exposed to light by heating the electrostatic information recording medium up to the liquid crystal phase region with voltage applied between two electrodes. After the exposed pattern is recorded according to the orientation of liquid crystal polymer, the electrostatic information recording medium is separated and cooled down or it is separated after image exposure and is then heated and cooled down to record the information. Then, the exposure pattern thus recorded is reproduced through polarization means.

The liquid crystal polymer layer consists of thermotropic liquid crystal. When it is subjected to liquid crystal temperature it exhibits nematic liquid crystal phase in polyester type product, and viscosity is extremely decreased in liquid crystal status. When voltage is applied in this stage, molecular orientation is generated. When it is cooled down, the oriented molecular arrangement remains, and it exhibits memory effect.

This electrostatic information recording medium has liquid crystal polymer layer as electrostatic information recording layer. To record the information, the medium is placed face-to-face to the photosensitive member, and the information light is irradiated while heating the medium in the exposure under voltage application, or it is heated after the exposure to the information light is completed. Thus, orientation is generated on liquid crystal polymer molecules corresponding to the information light exposure, and the information light can be recorded in the form of liquid crystal polymer orientation.

To reproduce the information from the electrostatic information recording medium where the information is recorded, the medium is scanned by laser beam or natural light, and the information is reproduced through a polarizer.

The eighth electrostatic information recording medium is characterized in that an electrode is furnished on a substrate, that thermoplastic resin layer, electrophoretic substance layer or electrochromy layer and insulating layer are sequentially laminated, or that electrophoretic substance layer or electrochromy layer, thermoplastic resin layer are sequentially laminated on said electrode, and that said substrate, electrode, thermoplastic resin layer, and insulating layer are transparent or semi-transparent.

The electrostatic information recording and reproducing method on this electrostatic information recording medium is characterized in that the medium is placed face-to-face to the photosensitive member consisting of photoconductive layer having an electrode on its front, that pattern exposure is performed with voltage applied between two electrodes, and that heat development of electrostatic information recording medium is performed after exposure.

When the electrophoretic substance layer is an ionized dye layer in this electrostatic information recording medium, electrostatic information recording medium electrode is heated by resistance heating after information electric charge is accumulated on the insulating layer, or thermoplastic resin layer is heated by other means to soften. Then, the ionized dye at the site where information electric charge is accumulated is diffused toward electrode substrate by coulomb force to the electrode substrate under the effect of electric field generated by information electric charge. When heating is stopped, resin is hardened again, and the diffused ionized dye particles remain at the place. Thus, the information electric charge is converted to position information. When electrostatic information recording medium is observed by transmission light from the direction of electrode substrate, light is not transmitted at the non-diffused electrophoretic substance layer, while light is transmitted at the diffused electrophoretic substance layer, and the image corresponding to exposure is obtained.

In case the electrophoretic substance layer consists of the ionized pigment, the metal ions in ionized pigment are diffused toward the electrode by the effect of electric field generated by the information electric charge, and ion pigment layer is discolored. By utilizing this phenomenon, the image corresponding to the information electric charge can be reproduced as visible information.

In case electrochromy layer is used, reversible oxidation and reduction reaction occurs on the electrochromy layer by the effect of electric field generated by information electric charge accumulated in the insulating layer and by the thermoplastic resin, which has been turned to electrically conductive by heating. Thus, color develops, and the information electric charge can be turned to visible information.

When planar analog recording is performed on this electrostatic information recording medium, high resolution can be obtained because the information is in electrostatic charge, and the information electric charge can be easily turned to visible information. The visible information is fixed in the resin layer and is preserved there for long period.

The ninth electrostatic information recording medium is characterized in that the insulating layer having electric charge transporting property is laminated on the electrode layer with a destructible electric charge preventive layer between them.

To record the electrostatic information, the electric charge preventive layer is destroyed by heating, and the information is recorded by turning the electric charge preventive layer to electrically conductive. The information is reproduced by charging the entire surface of the insulating layer on the information recording medium.

In the other information recording and reproducing method, the electrostatic information recording medium is placed face-to-face to photoconductive layer surface of the photosensitive member laminated on the electrode, and pattern exposure is performed with voltage applied between two electrodes to form electrostatic charge pattern on the insulating surface. Then, by total exposure of the insulating surface to light, the electric charge preventive layer can be destroyed by discharge at the portion where electrostatic pattern is formed. By making it electrically conductive, the information is recorded, and the information can be reproduced by charging the entire surface of the information recording medium.

In so doing, the electrostatic information recording medium can convert and preserve the image electric charge in the form where electric charge preventive layer is present or not present. Thus, the information can be preserved permanently in the information recording medium.

Also, the present invention is characterized that electrostatic pattern recorded on electrostatic information recording medium is electro-optically read.

Electro-optical element, changing optical property by the effect of electric field, is placed face-to-face to an electrostatic information recording medium, which has an electrode and an insulating layer on a support member and on which electric charge is accumulated. The electrodes of both electro-optical element and the electrostatic information recording medium are short-circuited with each other, and light is irradiated to the electro-optical element. By reading the electric charge pattern through transmission light or reflection light, the electrostatic pattern recorded on the electrostatic information recording medium can be electro-optically read.

When electro-optical element is a liquid crystal element having memory function, the electrodes of both the electro-optical element and the electrostatic information recording medium are short-circuited, and the electric charge pattern information is memorized in the liquid crystal element. Then, light is irradiated to the liquid crystal element through a polarizing plate to read the information.

In the electrostatic information recording and reproducing method, electro-optical element such as liquid crystal, electro-optical effect material, etc. are placed in the proximity of the electrostatic information recording medium where electrostatic pattern is formed, and optical property of electro-optical element is changed by the effect of electric field of the accumulated electric charge on the electrostatic information recording medium. By reading this change of optical property through transmission light or reflection light, the electrostatic pattern on the electrostatic information recording medium can be read with the accuracy of molecular order.

BRIEF DESCRIPTION OF THE DRAWINGS

FIG. 4 is to explain the arrangement of color separation optical system to be used for electrostatic information recording;

FIG. 5 is to explain the formation of color electrostatic information;

THE BEST FORM TO EXECUTE THE INVENTION

The electrostatic information recording medium of this invention consists of the first to the ninth electrostatic information recording media as described below.

First, description is given on the first electrostatic information recording medium.

Figure 1A:
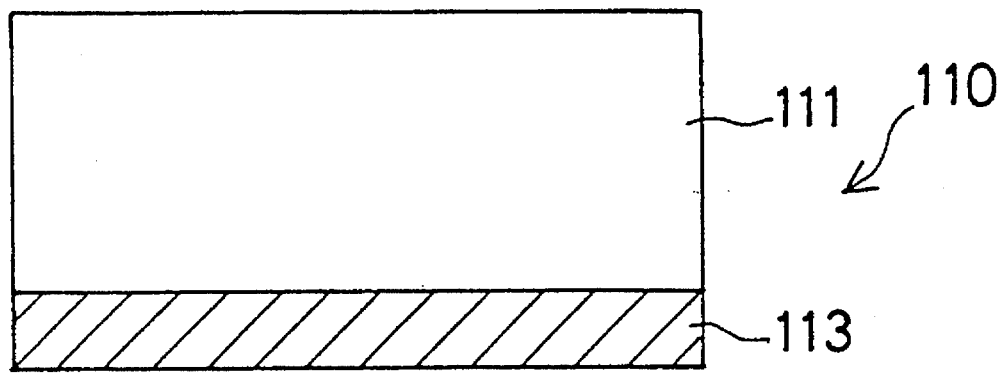
FIG. 1 represents cross-sectional views of the first electrostatic information recording medium.
Figure 1B:
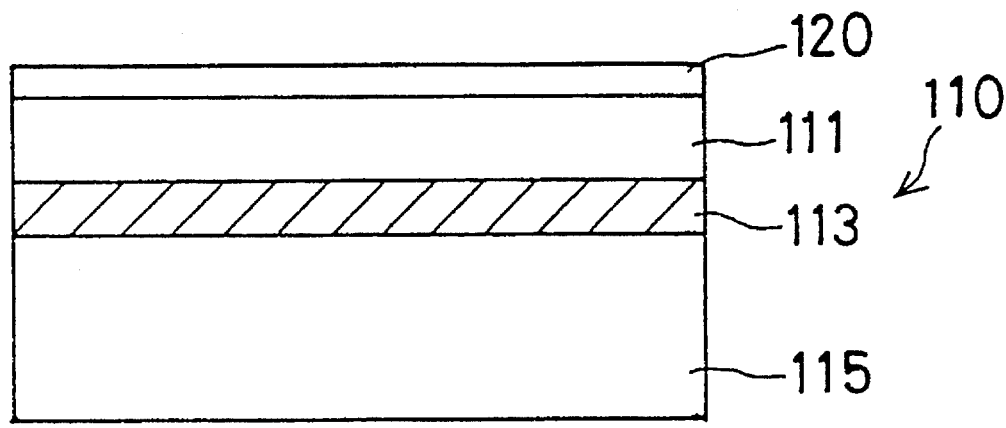
Figure 2A:
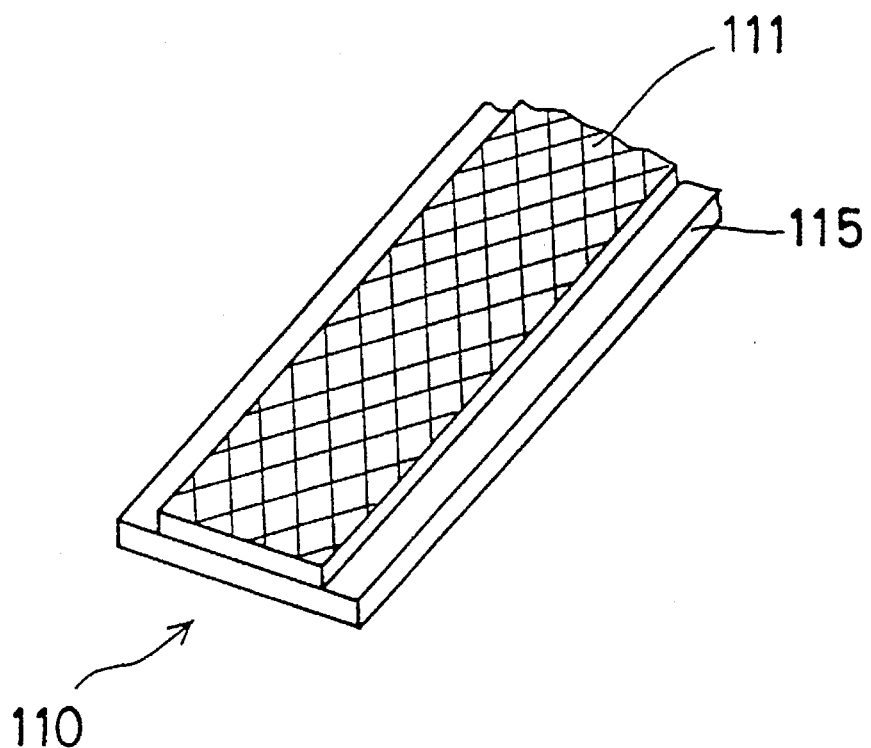
FIG. 2 shows perspective views of the shape of the electrostatic information recording medium.
Figure 2B:
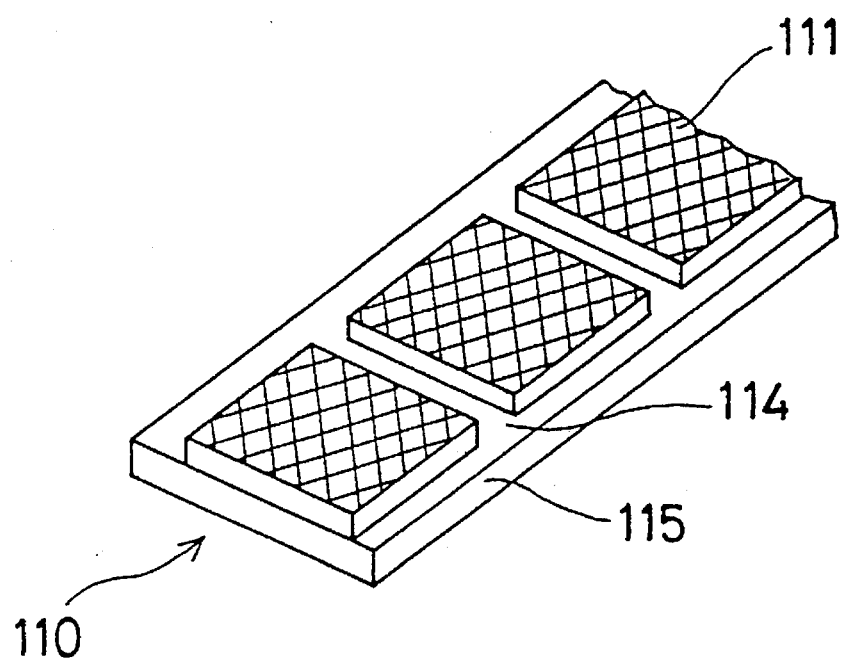
Figure 2C:
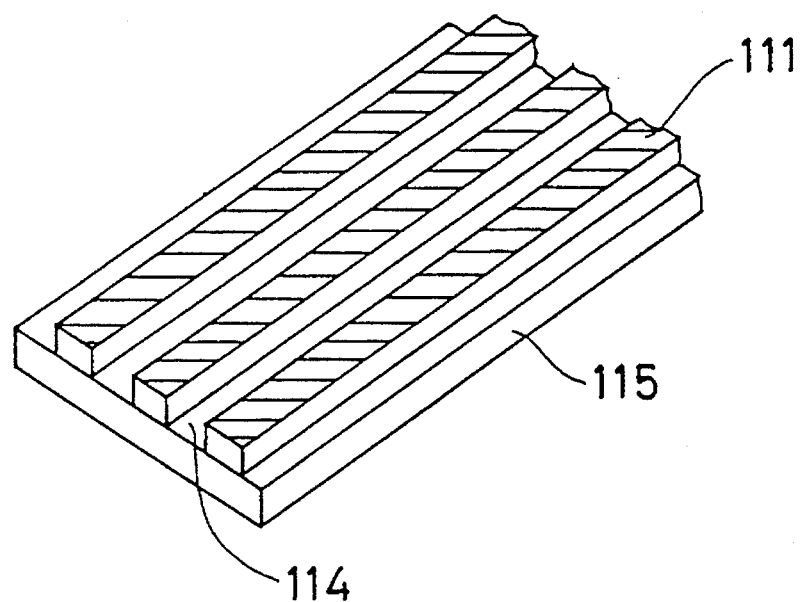
Figure 2D:
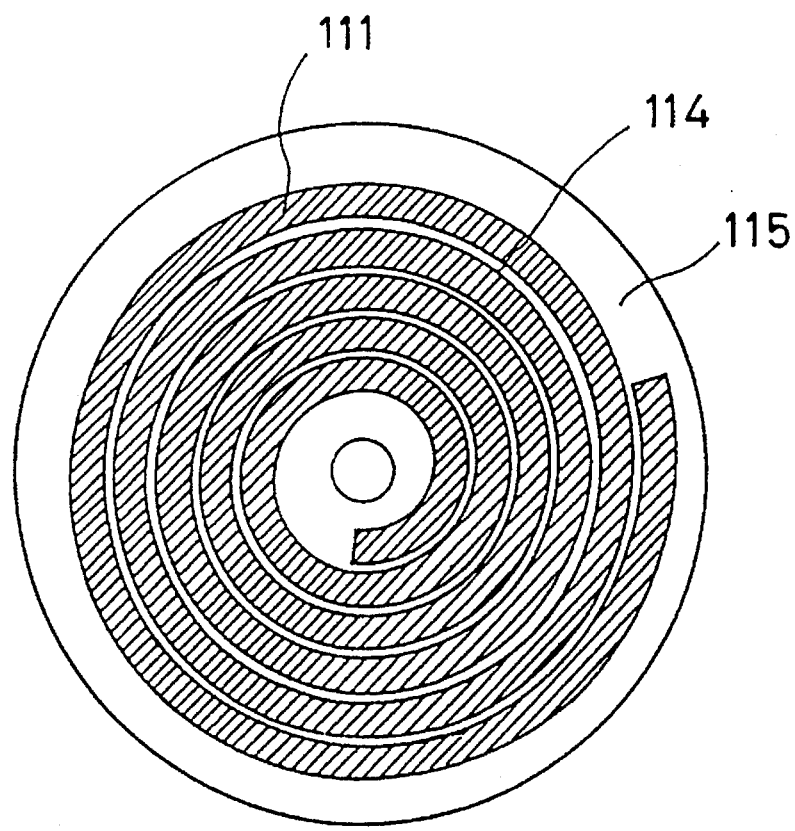

FIG. 1 represents cross-sectional views of the first electrostatic information recording medium. FIG. 1(a) shows the case where there is no support member, and FIG. 1(b) the case with a support member. In the figure, 110 is an electrostatic information recording medium, 111 an electric charge retaining layer, 113 an electrode layer, 115 a support member, and 120 a protective layer.

The first electrostatic information recording medium is formed by laminating an electric charge retaining layer 111, consisting of an insulating layer having specific resistance of $10^{14}$–$10^{18}$ Ωcm on an electrode 113 in order to increase the electric charge retaining property.

As the macromolecular materials to form the insulating layer, such materials can be used as polyethylene, vinyl chloride resin, polypropylene, styrene resin, ABS resin, polyvinyl alcohol, acryl resin, acrylonitrile-styrene resin, vinylidene chloride resin, AAS (ASA) resin, AES resin, cellulose derivative resin, thermoplastic polyurethane, polyvinyl butyral, poly-4-methylpentene-1, polybutene-1, rosin ester resin, etc. Further, as fluororesin, such materials can be used as polytetrafluoroethylene (PTFE), tetrafluoroethyleneperfluoroalkylvinylether copolymer (PFE), tetrafluoroethylene-hexafluoropropylene copolymer (FEP), tetrafluoroethylene-hexafluoropropylene-perfluoroalkylvinylether copolymer (EPE), tetrafluoroethyleneethylene copolymer (ETFE), polychlorotrifluoroethylene (PCTFE), chlorotrifluoroethylene-ethylene copolymer (ECTFE), etc. Also, polyparaxylylene given by the following structural formula can be used:

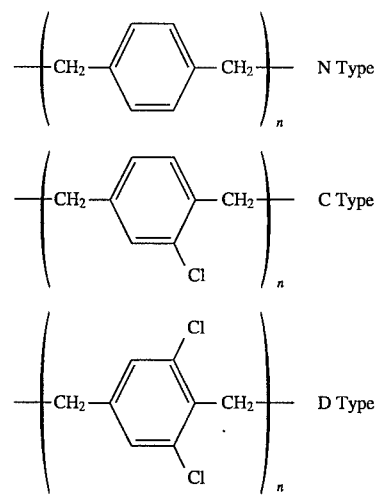

(The above Type C is not limited to the substance of the above structure, and it may be such substance that one of the sites other than the main chain bonding sites in the benzene ring is substituted by chlorine; Also, Type D may be the substance with two of the sites substituted by chlorine.)

Next, description is given to the method to manufacture the first electrostatic information recording medium.

The features of the first electrostatic information recording medium lie in the method to form the electric charge retaining layer. Specifically, when insulating material is laminated on an electrode to form the electric charge retaining layer, the electrode is heated by resistance heating (heating by connecting electric current to the electrode layer) to vacuum-deposit the insulating material and to laminate it on the heated electrode layer, or the insulating material is sputtered by argon discharge and is laminated on the heated electrode layer.

Also, the insulating material may be laminated on the electrode layer by vacuum deposition or by sputtering and is then heated in an oven to produce the electrostatic information recording medium.

The insulating layer, serving as an electric charge retaining layer, must have the thickness of 1000 Å (0.1 μm) or more, and it is preferable that it is 100 μm thick or less from the viewpoint of flexibility.

To increase the electric charge retaining property after information electric charge is recorded on the electric charge retaining layer, protective film 120 may be laminated on the electric charge retaining layer. Insulating macromolecular material is dissolved in solvent and is coated on the electric charge retaining layer by spinner coating method to film thickness of several hundreds to several tens of μm.

Next, description is given on the electrostatic information recording medium in connection with the drawings.

FIG. 1(*a*) shows the case where the insulating material to be laminated has a certain thickness and has a certain strength by itself, and it is laminated on the electrode layer in thin film form. Aluminum plate or the like having a certain strength is used as the electrode, and the support member as described later is not required in this case.

The electrode, on which the insulating layer is laminated, may be formed on the support member 115 as shown in FIG. 1(*b*), or the support member may be omitted if the insulating layer is in film form, or electrode layer may be laminated on the insulating layer film by vacuum deposition or other method.

The electrode may be transparent or semi-transparent or may be non-transparent if there is no need to transmit light. Similarly to the insulating layer, it must have heat-resistant property, and there is no restriction on the material as far as specific resistance is $10^6$ Ωcm or less. It may be inorganic metal conductive film, inorganic metal oxide conductive film, or organic conductive film such as tertiary ammonium salt. Such electrode is formed by the methods such as vacuum deposition, sputtering, CVD, coating, metalplating, dipping, or electrolytic polymerization. It is necessary to change the film thickness according to the electrical characteristics of the material of the electrode or to the applied voltage during information recording. The film thickness may be 100–3000 Å, for example.

There is no restriction to the material and the thickness of the support member as far as it has the strength enough to support the electrostatic information recording medium. For example, flexible plastic film, paper, or rigid body such as glass, plastic sheet, etc. may be used. Light transmission property is required in some cases when electrostatic information is reproduced. When light transmission property is required, it is preferable that a reflection preventive film is furnished on the support member, or film thickness is adjusted on electrode layer or insulating layer, or these two may be combined to provide reflection preventive effect.

In case the electrostatic information recording medium takes the form of flexible film, tape, or disk, flexible plastic film is used as the support member. In case strength is required, inorganic materials such as sheet, or glass having rigidity are used.

The electrostatic information recording medium can take various forms according to the information to be recorded or to the recording method. For example, it takes the form of general film (single frame, or continuous frame) or disk in case it is used for electrostatic camera. In case digital information or analog information is recorded by laser or the like, it takes the form of tape, disk or card.

Next, description is given to the case where the electrostatic information recording medium takes the form of flexible film, tape or disk by FIG. 2. In the figure, 111 is an insulating layer, 114 an insulating layer lacking portion, and 115 a support member.

FIG. 2(*a*) shows a type, in which the insulating layer 111 to record is continuous.

In this case, the insulating layer is formed on the entire surface of the support member, consisting of plastic film placed on the electrode layer except both ends of the support member. This electrostatic information recording medium is more than two times as long as one screen to be recorded (e.g. at least one frame in case of camera photographing, and track width in case of digital information recording). Naturally, this includes a combination of two or more electrostatic information recording media in longitudinal direction. In this case, there may be a slit zone where insulating layer is lacking between the adjacent insulating layers.

As shown in FIG. 2(*b*), there is a type, in which the insulating layer 111 is discontinuous in longitudinal direction.

This is formed by providing the insulating layer discontinuously on a support member of plastic film, leaving or not leaving both ends of the support member intact. Two or more insulating layers are formed in a certain size on the support member. The size of the insulating layer depends upon the image and the exposure method of information input unit. For example, it is 35 mm×35 mm in case of camera photographing, and it is equal to the track width of digital information recording in case of spot input such as laser beam. In case of digital information recording, the insulating layer lacking portion formed between the adjacent insulating layers can be used as tracking zone or information input and output. This naturally includes a combination of two or more electrostatic information recording media in longitudinal direction. In this case, there may be a slit zone lacking the insulating layer between the adjacent insulating layer.

As shown in FIG. 2(*c*), there is a type, in which the insulating layer 111 is discontinuous in lateral direction.

In this case, the insulating layer is formed discontinuously in lateral direction of the support member, consisting of plastic film placed on the electrode layer, leaving or without leaving both ends of the support member intact. Two or more band-like insulating layers are formed on the support member. The width of the insulating layer is either equal to or integer multiple of the track width of digital information, and the insulating layer lacking portion formed between adjacent insulating layers is used as tracking zone for information input or output.

As shown in FIG. 2(*d*), there is a disk-like type.

In this type, insulating layer is formed on the entire surface of the support member, consisting of circular plastic film placed on the electrode layer, or leaving the insulating layer lacking portion continuous spiral form. On this electrostatic information recording medium, circular lacking portion may be formed for driving the input/output unit. In case of digital information recording, the insulating layer lacking portion in continuous spiral form can be used as tracking zone for information input and output.

Next, description is given to the exposure method under voltage application, using a photosensitive member in the electrostatic information recording method of this invention.

FIG. 3 is to explain the electrostatic information recording method, in which 1 represents a photosensitive member, 5 a support member, 7 an electrode, 9 a photoconductive layer, 110 an electrostatic information recording medium, 111 an electric charge retaining layer, 113 an electrode, 115 a support member, 17 a power supply, and 18 an information light.

The photosensitive member is formed by laminating photoconductive layer such as organic photoconductive layer, inorganic photoconductive layer, etc. on the electrode. In the following, description is given on the method to manufacture photosensitive member to be used in the electrostatic information recording method of this invention.

[A manufacturing example of organic photosensitive member]

A mixture containing 10 g of poly-N-vinylcarbazole (manufactured by Anan Koryo Co., Ltd.), 10 g of 2,4,7-trinitrofluorenone, 2 g of polyester resin (binder: Byron 200; Manufactured by Toyobo Ltd.) and 90 g of tetrahydrofuran (THF) was prepared at dark place, and this was coated on a glass substrate (1 mm thick), sputtered with $In_2O_3$-$SnO_2$ in thickness of about 1000 Å, using doctor blade. After this was dried in the air at 60° C. for one hour, a photosensitive member having photoconductive layer of about 10 μm thick was obtained. For more perfect drying, this was further dried naturally for one day.

Figure 3A:
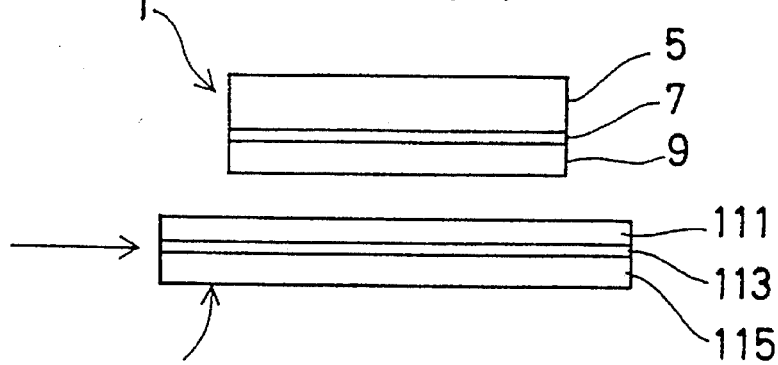
FIG. 3 is to explain the information recording method on the electrostatic information recording medium.
Figure 3B:
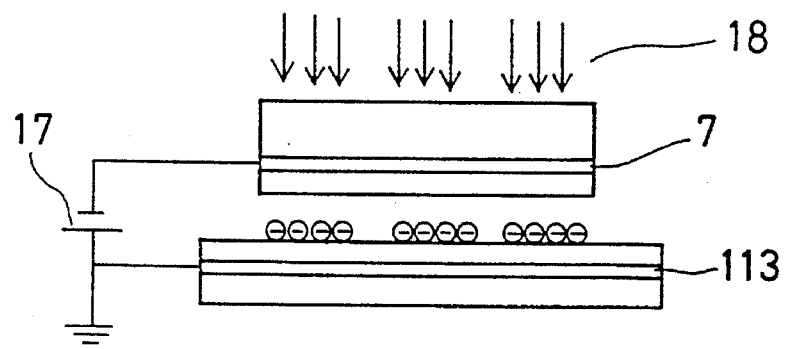

As shown in FIG. 3(a), the photosensitive member 1 thus prepared was placed face-to-face to the electrostatic information recording medium 110 with a gap of about 10 μm between them. Then, voltage was applied between the electrodes 7 and 113 from the power source 17 as shown in FIG. 3(b). Because the photoconductive layer 9 is a high resistance substance, no change occurs between the electrodes in dark place if the voltage applied on the gap is lower than the discharge starting voltage according to Paschen's law.

When information light 18 enters from the direction of the photosensitive member 1, the photoconductive layer 9 irradiated by information light exhibits electrical conductivity, and discharge occurs. Then, the information electric charge corresponding to the information light is accumulated in the electric charge retaining layer.

Figure 3C:
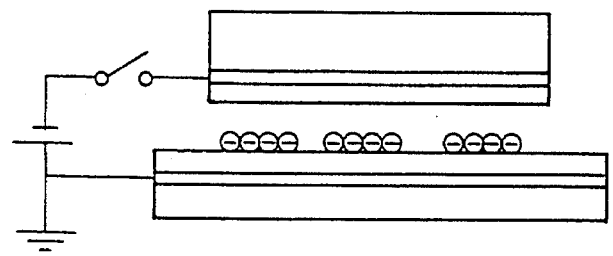
Figure 3D:
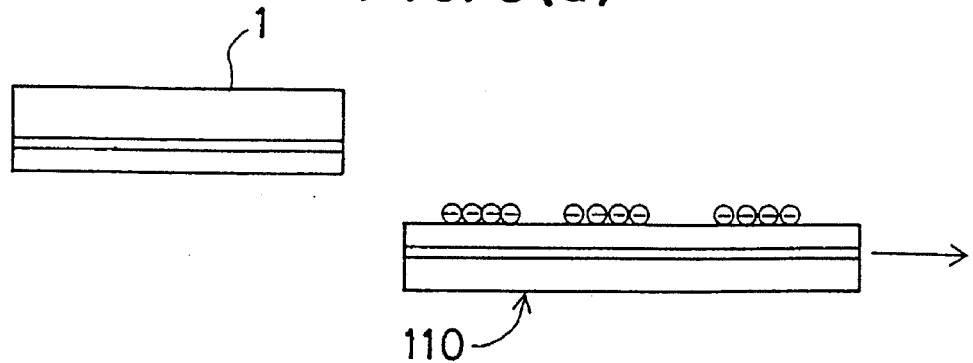

As shown in FIG. 3(c), when power source 17 is turned off and the electrostatic information recording medium 110 is separated from the photosensitive member 1 (FIG. 3(d)), information electric charge is accumulated on the surface of the electrostatic information recording medium.

To manufacture an electrostatic image recording apparatus from an photosensitive member and an electrostatic information recording medium, the photoconductive layer surface of the photosensitive member is brought into contact with the surface of the electrostatic information recording medium, or they are placed face-to-face without bringing them into contact. In case of this non-contact basis, non-contact condition is maintained mechanically, or they may be placed face-to-face with a spacer between them. Although it depends upon which kind of information input means is used, the spacer may be placed at any point on the surfaces of the photosensitive member and the electrostatic information recording medium. In case of non-contact basis, it is preferable that the distance between the photosensitive member and the electrostatic information recording medium is 1–50 μm. As the spacer, organic material such as plastics or inorganic materials such as glass may be used.

In a high resolution electrostatic camera, the recording member is formed by photosensitive member and electrostatic information recording medium instead of photographic film as used in normal camera, and electrostatic latent image is formed on the electric charge retaining layer according to the incident light. Mechanical shutter or electrical shutter may be used.

Light information may be separated into optical components of R, G and B by prism, or color filter may be used to take it out as parallel beams. By forming one frame from 3 sets of electrostatic information recording media separated into R, G and B or by aligning R, G and B images on a plane and by forming one frame by one set, color photographing can be achieved.

Color filter can be placed on the support member in the photosensitive member or on the support member having light reflection preventive layer. Color filter may be dye type color filter, pigment type color filter, inorganic interference filter type color filter, or holographic color filter recording interference fringes of 3 primary colors. Various arrangements are possible such as stripe type, plane division type, mosaic type. Color filter may be placed separately from the support member or may be placed by laminating on the support member.

FIG. 4 shows an optical system for color separation by prism, where 71, 73 and 75 represent prism blocks, 77, 79 and 81 filters, and 83 and 85 reflection mirrors.

The color separation optical system consists of 3 prism blocks. The light information coming from the surface a of the prism block 71 is partially separated and reflected on the surface b. It is further reflected on the surface a, and color light component B is taken out from the filter 77. The ramaining light information enters the prism block 73, and advances to the surface c, where it is partially separated and reflected. The remaining light components advance straightly further, and color light components G and R are taken out from the filters 79 and 81 respectively. By reflecting the color light components G and B by the reflection mirrors 83 and 85, the light components R, G and B can be taken out as parallel beams.

When such filter 91 is placed in front of the photosensitive member 1 as shown in FIG. 5 for photographing, it is possible to form one frame by 3 sets of the electrostatic information recording media separated into R, G and B as shown in FIG. 5(b) or to form one frame by aligning them as R, G and B images on a plane as one set as shown in FIG. 5(c).

As the recording method by laser, argon laser (514. 488 nm), helium-neon laser (633 nm) or semiconductor laser (780 nm, 810 nm, etc.) can be used as light source. By placing photosensitive member and electrostatic information recording medium closely together or placed face-to-face with a certain gap, and voltage is applied. In this case, it is preferable that the photosensitive member electrode is set to the same polarity as the polarity of the carrier of photosensitive member. Under such condition, laser exposure corresponding to image signal, character signal, code signal or line drawing signal is performed by scanning. Analog recording such as image is performed by modulating light intensity of laser, and digital recording such as characters, code and line drawing is performed by ON-OFF control of laser beam. The image formed by dots can be formed by ON-OFF control of dot generator on laser beam. The spectral characteristics of photocenductive layer in the photosensitive member need not be panchromatic as far as it is sensitive to the wavelength of the laser source.

In the above, description has been given on the case where electrostatic information is recorded using a photosensitive member, whereas electrostatic recording using electrode needle head or ion flow head may be performed, or the recording method by optical printer such as laser printer may be adopted.

Next, description is given on the method to reproduce electrostatic information recorded on the electrostatic information recording medium.

Figure 6:
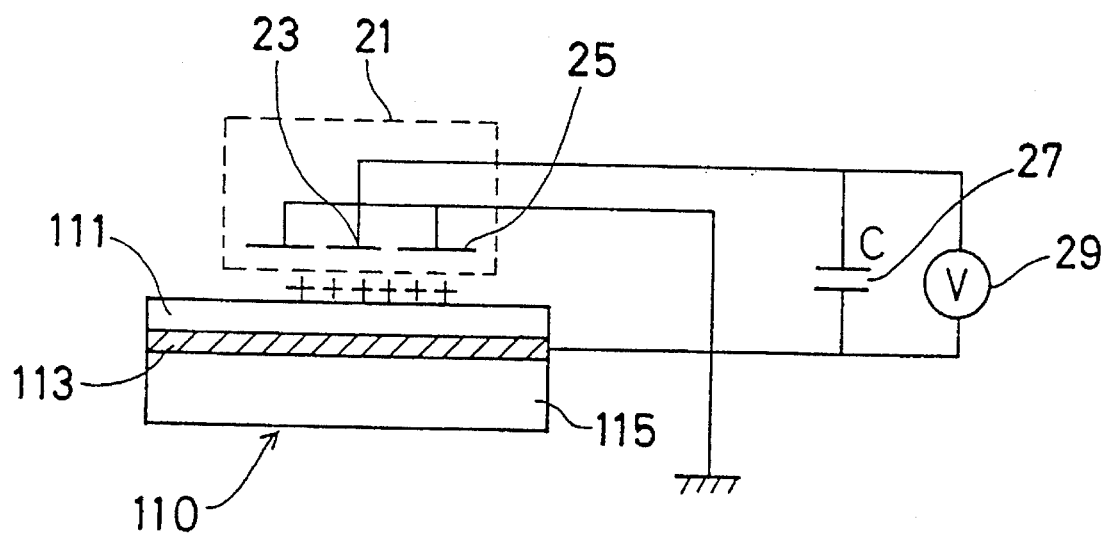
FIG. 6 is a diagram to show an example of potential reading method of electrostatic information.

FIG. 6 shows an example of the potential reading method in the electrostatic information reproducing method. The same number refers to the same number in FIG. 1. In the figure, 110 is an electrostatic information recording medium, 21 is a potential reading unit, 23 a detection electrode, 25 a guard electrode, 27 a capacitor, and 29 a voltmeter.

To reproduce the information from the electrostatic information recording medium where information electric charge is accumulated, the potential reading unit 21 is placed face-to-face to the surface of the electric charge retaining layer. Then, the electric field generated by electric charge accumulated inside the electric charge retaining layer gives effect on the detection electrode 23, and induction electric charge equivalent to the electric charge on the electrostatic information recording medium is generated on the detection electrode. Because the capacitor 27 is charged by the electric charge equivalent but having opposite polarity to this induction electric charge, and potential difference corresponding to the accumulated electric charge between electrodes of the capacitor is generated. By reading this value on the voltmeter 29, the potential of the information electric charge can be obtained. By scanning the surface of the electric charge retaining layer by the potential reading unit 21, electrostatic latent image can be outputted as electric signal. When detection electrode 23 is used alone, resolution is decreased because of the effect of electric field (electric line of force) by electric charge in wider range than the portion facing to the detection electrode of the electrostatic information recording medium. Thus, a guard electrode 25 grounded around the detection electrode may be disposed. In so doing, the electric line of force is directed toward the direction perpendicular to the plane, and electric line of force acts only on the portion facing to the detection electrode 23. Thus, the potential at the portion having approximately the same area as the area of detection electrode can be read. The accuracy and the resolution of potential reading widely differ according to the shape and size of detection electrode and guard electrode and to the distance from the electrostatic information recording medium. Therefore, it is necessary to design according to the optimal condition suitable for the desired performance characteristics.

Laser beam may be irradiated from the direction of the electrode having reflection preventive layer on the image electric charge on the electrostatic information recording medium, and the information may be reproduced through electro-optical crystal, utilizing the modulation by the image electric charge of laser beam. In this case, it is necessary to form the electrostatic information recording medium including support member, electrode, insulating layer, photoconductive layer and protective layer by transparent materials. Also, it is preferable to place electro-optical crystal in the light path and to use the substance having electro-optical effect such as barium titanate, lithium tantalate ($LiTaO_3$) as the electro-optical crystal.

Figure 7:
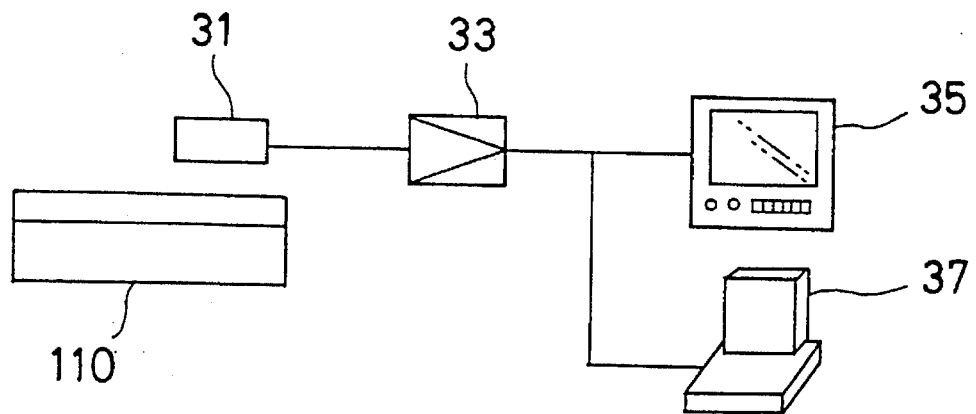
FIG. 7 is to explain the approximate arrangement of the electrostatic information recording and reproducing method.

FIG. 7 shows approximate arrangement of the electrostatic information reproducing method, where 31 respresents a potential reading unit, 33 an amplifier, 35 a CRT, and 37 a printer.

In the figure, electric charge potential is detected by the potential reading unit 31, and the detection output is amplified by the amplifier 33 and is displayed on CRT 35 or is printed out by the printer 37. In this case, the desired point can be selected and outputted as desired at desired time or the image can be reproduced repeatedly. Or, the image can be optically read using the material with its property changing by electric field such as electro-optical crystal. Further, because electrostatic latent image cab be obtained as electric signals, it can be used for the recording on the other recording media when necessary.

In the following, the invention will be described by a number of examples:

EXAMPLE 1

On a glass substrate of 1 mm thick, aluminum electrode was evaporated in thickness of 1000 A by vacuum evaporation method ($10^{-5}$ Torr). On this aluminum electrode, chlor-trifluoroethylene (CTFE) (manufactured by Daikin Industry) powder was applied by vacuum deposition method ($10^{-5}$ Torr) and laminated in film thickness of about 17–20 μm at evaporation speed of 0.8–1.8 μm/min. under conditions that electrode substrate temperature was kept at room temperature or resistance heating was performed at 45° C., 65° C. or 105° C. Thus, the electrostatic information recording media were prepared under each of these conditions.

Figure 8A:
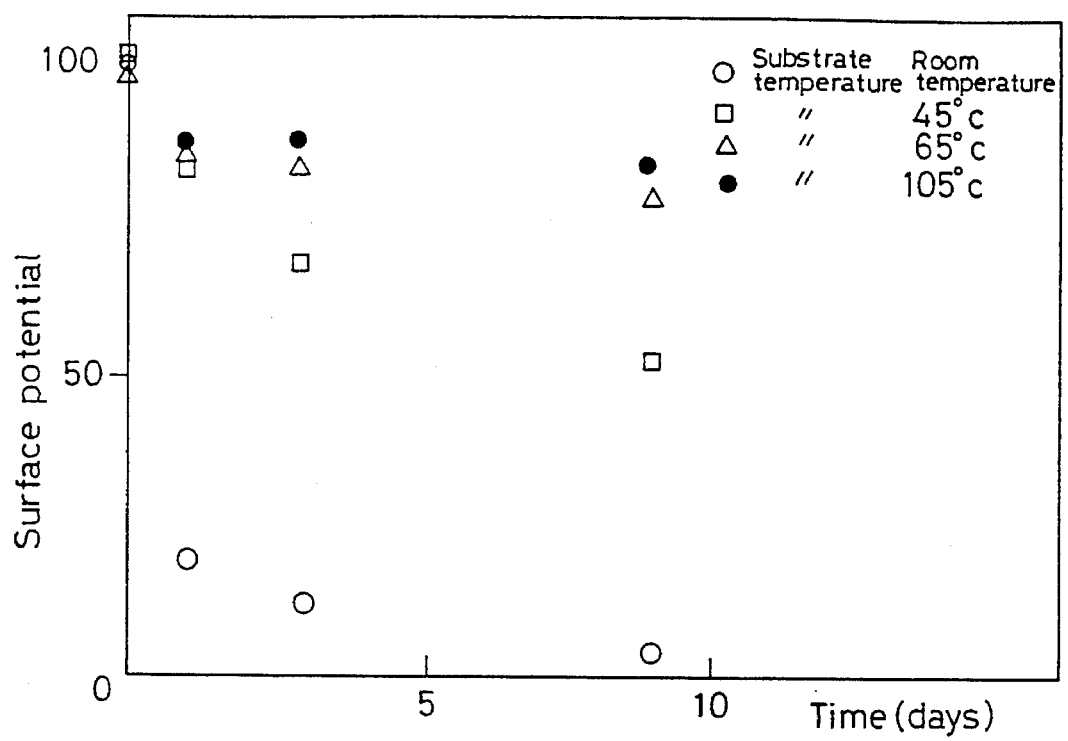
FIG. 8 is a graphic representation of the relationship between electric charge retaining layer forming temperature and electric charge carrying property of the first electrostatic information recording medium.
Figure 8B:
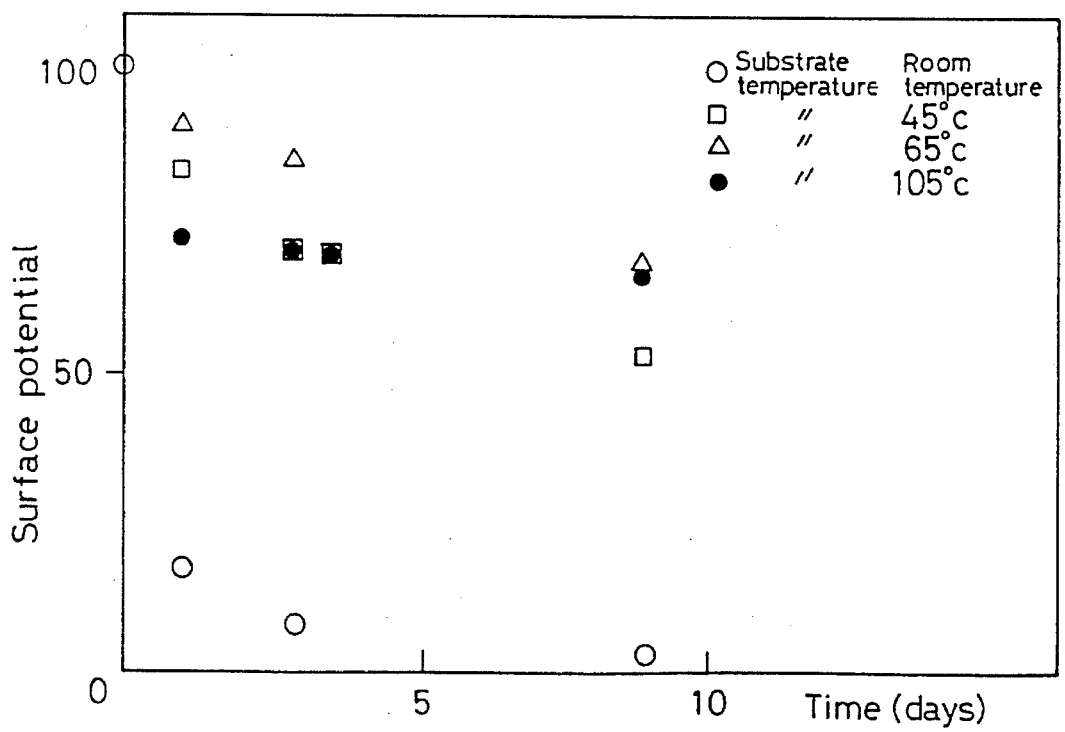

On each of the electrostatic information recording media thus obtained, electric charge was given to have the surface potential of +100 V or –100 V by corona charging, and then electric charge retaining property was measured. FIG. 8(*a*) shows the results in case of + charging, and FIG. 8(*b*) the results in case of – charging.

As it is evident from the figure, electric charge does not leak almost at all after the electrostatic information recording media were left for 10 days. However, when laminated by keeping substrate at room temperature, electric charge was rapidly attenuated on the first day.

EXAMPLE 2

On a glass substrate of 1 mm thick, aluminum electrode is evaporated in thickness of 1000 A by vacuum evaporation method ($10^{-5}$ Torr). On this aluminum electrode, chlor-trifluoroethylene (CTFE) (Daikin Industry) powder was laminated in thickness of about 17–20 μm by vacuum evaporation method ($10^{-5}$ Torr) at evaporation speed of 0.8–1.8 μm/min. with electrode substrate at room temperature. Then, it was heated at 200° C. by oven, and electrostatic information recording media were prepared.

On the electrostatic information recording media thus obtained, electric charge was given by corona charging to have the surface potential of +100 V or –100 V, and the electric charge retaining property was measured. As the result, electric charge did not leak almost at all even after the media were left for 10 days, and the surface potential of 98 V was maintained.

EXAMPLE 3

On a glass substrate of 1 mm thick, aluminum electrode was laminated in thickness of 1000 A by vacuum eveporation method ($10^{-5}$ Torr). On this aluminum electrode, polytetrafluoroethylene (PTFE) (Daikin Industry) powder was laminated by vacuum evaporation method ($10^{-5}$ Torr) at the evaporation speed of 0.8–1.8 μm/min. to film thickness of about 17–20 μm with electrode substrate temperature kept at 150° C., and electrostatic information recording media were obtained.

On the electrostatic information recording media thus obtained, electric charge was given by corona charging to have the surface potential of +100 V or –100 V, and the electric charge retaining property was measured. As the result, electric charge did not leak almost at all after the media were left for 10 days, and the surface potential of 99 V was maintained.

EXAMPLE 4

As shown in FIG. 3, organic photosensitive member 1 and the electrostatic information recording medium as obtained in the Example 1 were placed face-to-face using a polyester film of 10 μm thick as spacer. Then, DC voltage of 100 V was applied between two electrodes with the photosensitive member as negative, and the medium as positive.

Under voltage application, light was irradiated from a halogen lamp of 1000 luxes for one second, and electrostatic latent image was formed on the medium.

Next, the surface potential of the medium was measured. As the result, the surface potential of 100 V was measured by surface potentiometer on the surface of the medium, but the surface potential on unexposed portion was 0 V.

Next, description is given on the second electrostatic information recording medium.

FIG. 9 and FIG. 10 show cross-sectional views of the second electrostatic information recording medium, where 211 represents an electric charge retaining layer, 211a a resin layer with low glass transition temperature, 211b a heat-resistant insulating layer, 213 an electrode, and 215 a support member.

Figure 9A:
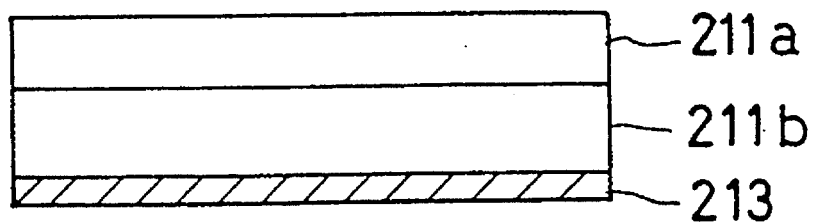
FIG. 9 and FIG. 10 show cross-sectional views of the second electrostatic information recording medium.
Figure 10A:
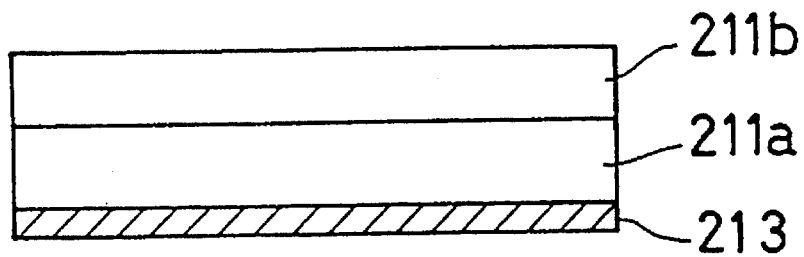

The second electrostatic information recording medium has two aspects. The first aspect has the structure that heat-resistant resin layer 211b is first laminated on an electrode 213, and resin layer 211a with low glass transition temperature is laminated on it. The second aspect has such structure that, as shown in FIG. 9(a), a resin layer 211a with low glass transition temperature is laminated on an electrode 213 and a heat-resistant insulating layer 211b is further laminated on it as shown in FIG. 10(a).

The resin to form the resin layer with low glass transition temperature in this electric charge retaining layer must have the insulating property with specific resistance of $10^{14}$ $\Omega \cdot$cm or more at the temperature lower than glass transition temperature. In general, the property of resin changes according to the change of molecular chain movement beyond glass transition temperature. In case it is used as the material for electric charge retaining layer, the insulating property is also decreased at higher than glass transition temperature, and electric charge leaks immediately even when it is accumulated. Accordingly, it is preferable in the normal operating condition to use the resin with glass transition temperature of 20° C. or more.

As the resins with low glass transition temperature, there are thermoplastic resins such as polyethylene, ethylene-vinyl acetate copolymer, ethylene-ethyl acrylate and ethylene-methyl acrylate copolymer, polypropylene, polybutylene, methyl pentene resin, polystyrene, polyparaxylylene, polyvinyl acetate, polyacrylate, polymetacrylate, vinyl chloride resin, polyvinylidene chloride, fluororesin, polyacrylonitrile, polyvinyl ether, polyvinylketone, polyether, polycarbonate, thermoplastic polyester, polyamide, diene type plastics, polyurethane type plastics, petroleum resin, rosin derivative, terpene type resin, etc., macromolecular resins such as aromatic polyamide, polyphenylene, polyxylylene, polyphenylene oxide, polysulfone, aromatic hetero-ring polymer, etc., silicone resin, inorganic plastics, and further, natural rubber type plastics, cellulose type plastics, protein type plastics, plastics from starch, etc. It is preferable to use the resin with relatively low glass transition temperature such as acryl resin, polystyrene, polyterpene, etc.

To form the resin layer, resin is dissolved in an adequate solvent, and resin layer is formed by coating, dipping, etc. When electrostatic information is accumulated on the electrostatic information recording medium, the electrostatic information moves in the resin layer by the effect of electric field and is accumulated. Accordingly, this layer is related to the retaining property of the accumulated electric charge, and the retaining potential of the accumulated electric charge differs according to film thickness.

Next, description is given on heat-resistant insulating layer.

The heat-resistant insulating layer is also required to have insulating property with specific resistance of $10^{14}$ $\Omega \cdot$cm or more. The heat-resistant resin or heat-resistant inorganic substance having glass transition temperature lower than the above resins with low glass transition temperature can be used.

As the heat-resistant resin, there are phenol resin, furan resin, xylene-formaldehyde resin, ketone-formaldehyde resin, urea resin, melamine resin, aniline resin, alkyd resin, unsaturated polyester resin, epoxy resin, triacyl cyanurate resin, tris-(2-hedroxyethyl)isocyanurate formaldehyde resin, acrolein resin, phosphonitrile-dihalogenide type polymer derivative, cured resin by dimaleimide, thermosetting resin from cyclopentadiene, crosslinked product from cyclic urea resin, thermosetting resin such as triazine type resin, polyethylene, ethylene-vinylacetate copolymer, ethylene-ethyl acrylate-ethylene-methyl acrylate copolymer, polypropylene, polybutylene, methylpentene resin, polystyrene, polyparaxylylene, plyvinyl acetate, polyacrylate, polymetacrylate, vinyl chloride resin, polyvinylidene chloride, fluororesin, polyacrylonitrile, polyvinyl ether, polyvinylketone, polyether, polycarbonate, thermoplastic polyester, polyamide, diene type plastics, polyurethane type plastics, petroleum resin, rosin derivative, thermoplastic resin such as terpene type resin, further, heat-resistant macromolecular resins such as aromatic polyamide, polyphenylene, polyxylylene, polyphenylene oxide, polysulfone, aromatic hetero-ring polymer, etc., silicone resin, inorganic plastics, further, natural rubber type plastics, cellulose type plastics, protein type plastics, plastics from starch, etc. It is preferable that the resin with higher glass transition temperature than the resin layer with low glass transition temperature is used. The same material having different glass transition temperature according to the difference in molecular weight can be laminated. For example, styrene resin has different molecular weights (Mw) of 348 and 53200 when glass transition temperature is −14° C. and 53° C. It is preferable to use the resin with glass transition temperature of 40° C. or more.

For example, the substances such as polytetrafluoroethylene, fluorinated ethylenepropylene, tetrafluoroethylene-perfluoroalkylvinylether copolymer, polyetheretherketone resin, polyparaxylylene given by the following structural formula can be used:

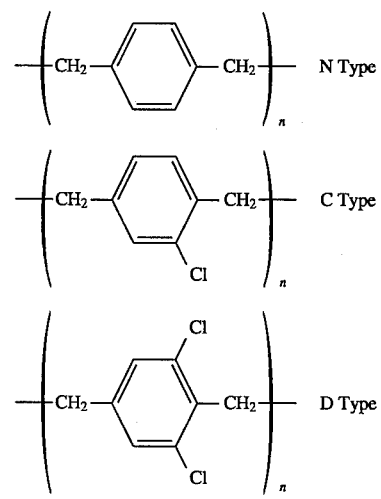

(The above Type C is not limited to the substance of the above structure, and it may be such substance that one of the sites other than the main chain bonding sites in the benzene ring is substituted by chlorine; Also, Type D may be the substance with two of the sites substituted by chlorine.)

To form the heat-resistant resin layer, the resin is dissolved in an adequate solvent, and the layer is formed by coating, dipping, etc.

Inorganic substances can also be used as heat-resistant insulating layer. For example, these are: Inorganic oxides such as $SiO_2$, $Al_2O_3$, $ZrO_2$, $TiO_2$, $As_2O_3$, $B_2O_3$, $Bi_2O_3$, CdS, CaO, $CeO_2$, $Cr_2O_3$, CoO, $GeO_2$, $HfO_2$, $Fe_2O_3$, $La_2O_3$, MgO, $MnO_2$, $Nd_2O_3$, $Nb_2O_5$, PbO, $Sb_2O_3$, $SeO_2$, $Ta_2O_5$, $WO_3$, $V_2O_5$, $Y_2O_5$, $Y_2O_3$, $BaTiO_3$, $Bi_2TiO_5$, CaO—SrO, CaO—$Y_2O_3$, Cr—$SiO_2$, $LiTaO_3$, $PbTiO_3$, $PbZrO_3$, $ZrO_2$—Co, $ZrO_2$—$SiO_2$ or inorganic compounds such as AlN, BN, NbN, $Si_3N_4$, TaN, TiN, VN, ZrN, SiC, TiC, WC, $Al_4C_3$, and silicon dioxide is the most desirable. The inorganic substance layer is formed by plasma CVD, vacuum evaporation, sputtering or forcible oxidation or nitriding of metal or semiconductor.

In the resin layer with low glass transition temperature or heat-resistant resin layer, photoconductive particles or electrically conductive particles may be given in order to increase the electric charge retaining property. As the photoconductive particle material, inorganic photoconductive materials such as amorphous silicon, crystal silicon, amorphous selenium, crystal selenium, cadmium sulfide, zinc oxide, etc. or organic photoconductive materials such as polyvinylcarbazole, phthalocyanine, azo type pigment, etc. are used. As the electrically conductive materials, IA group (alkali metal) of periodic table, IB group (copper group), II A group (alkali earth metal), IIB group (zinc group), III A group (aluminum group), III B group (rare earth group), IV B group (titanium group), V B group (vanadium group), VI B group (chromium group), VII B group (manganese group), and VIII group (iron group and platinum group) can be used. Carbon, silicon, germanium, tin, and lead can be used as VIA group (carbon group), antimony and bismuth can be used as V A group (nitrogen group), and sulfur, selenium and tellurium can be used in fine powder. Of the above elements, metal element can also be used in the form of fine powder alloy, organic metal or complex. Further, the above elements can be used in the form of oxide, phosphated compounds, sulfated compounds, or halogenated compounds. Above all, it is preferable to use carbon, gold, copper, aluminum, etc.

These photoconductive or electrically conductive substances are coagulated when evaporated at low pressure of about 10 to $10^{-3}$ Torr using vacuum evaporation device on the heated resin layer. They are turned to super-fine particles with diameter of 10 to 0.1 μm inside the resin layer. The particles may be dispersed into resin solution when coating.

It is preferable that the heat-resistant insulating layer 211b of FIG. 9 has thickness of 0.1 μm or more. If it is less than 0.1 μm, electric charge leaks because the electric charge of the electrode having opposite polarity to the accumulated information electric charge is injected by tunneling phenomenon. There is no restriction to the thickness of resin layer 211a with low glass transition temperature. If thickness exceeds 100 μm, it is difficult to read the potential when reproducing information electric charge. If high resolution is required in reproducing the information electric charge, it is preferable that resin layer is thin. If it is too thick, electric line of force is disturbed. However, if it is less than 0.1 μm, the influence by pin hole or the like becomes remarkable, and satisfactory characteristics cannot be obtained.

There is no restriction to the thickness of the resin layer 211a with low glass transition temperature of FIG. 10, whereas it is preferable that heat-resistant insulating layer 211b is laminated with thickness of 0.1 μm or more. If it is less than 0.1 μm, the accumulated information electric charge may leak.

Figure 9B:
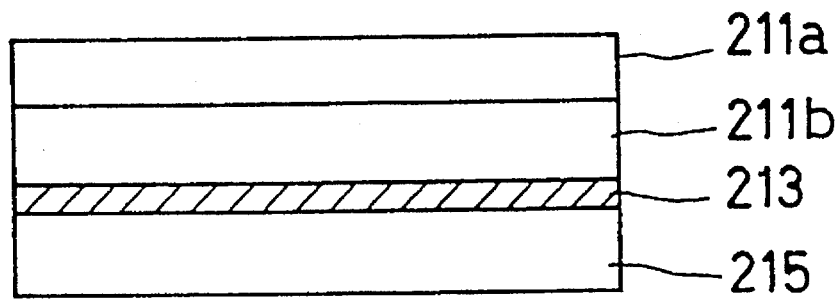
Figure 10B:
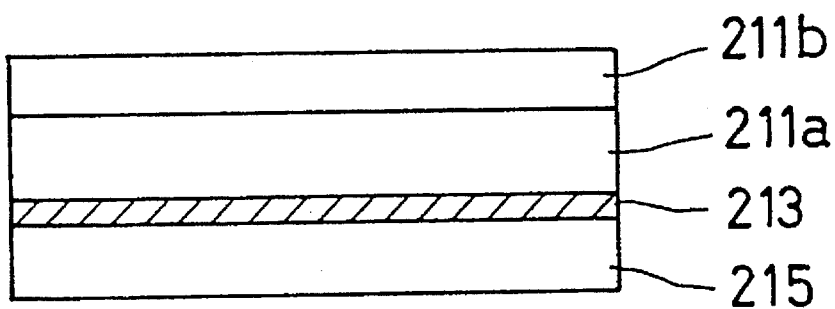

FIG. 9(b) and FIG. 10(b) show the cases having support member. The support member 215 and the electrode 213 are the same as those used for the first electrostatic information recording method.

Next, description is given on the electrostatic information recording method on the second electrostatic information recording medium.

Electrostatic information recording is performed in the same manner as in the information recording on the first electrostatic information recording medium. In this case, the electrostatic information may be recorded as it is, or information electric charge may be recorded with the electrostatic information recording medium heated to more than the glass transition temperature on the resin with low glass transition temperature and less than the electric charge leaking temperature of the heat-resistant insulating layer. Or, the electrostatic information can be more stabilized by heating the electrostatic information recording medium to higher than the glass transition temperature of the resin layer having low glass transition temperature and to lower than the electric charge leaking temperature of the heat-resistant insulating layer.

Figure 11A:
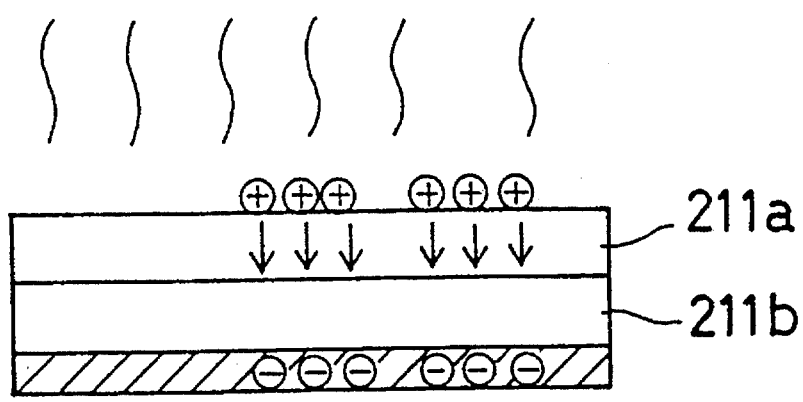
FIG. 11 is to explain electrostatic information stabilization method on the second electrostatic information recording medium.
Figure 11B:
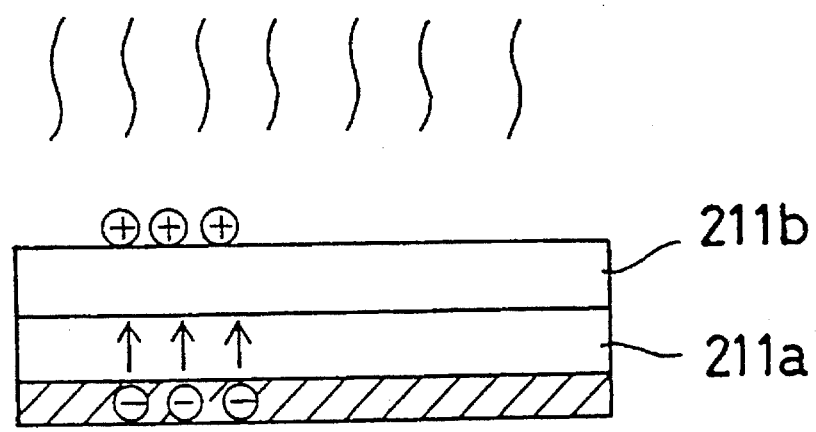

The mechanism to stabilize the electrostatic information by heating is schematically illustrated in FIG. 11(a) for the case of the electrostatic information recording medium of FIG. 9, and in FIG. 11(b) for the case of the electrostatic information recording medium of FIG. 10. The reason for the stabilization may be as follows: The electric charge induced by the information electric charge moves apparently by the effect of electric field in the resin layer having low glass transition temperature, which has been turned to electrically conductive by heating. Then, the resin having low glass transition temperature is turned to insulating material due to cooling and it is stably accumulated in the resin layer.

Many points still remain unknown about the change of actual electric charge on the site of such electric charge. The decrease of the measured surface potential may be attributable to the capacity change due to apparent movement of actual electric charge. The electrostatic information recording medium can retain the electrostatic information stably even when it is left without heating. By forcibly heating it, it can reach the stabilized status instantaneously. Compared with the case reaching the stabilization gradually, there is less possibility to cause trouble during the stabilization process. By cooling it after heating, it can be kept at stabilized state. The heating temperature must be lower than the electric charge leaking temperature of the heat-resistant insulating layer.

In the following, description is given on the examples:

EXAMPLE 5

To the film of tetrafluoroethylene-hexafluoropropylene copolymer (FEP) having glass transition temperature of 130° C., specific resistance of $10^{18}$ Ω·cm or more, water absorption 0.01%, and film thickness 12.5 μm (manufactured by DuPont), aluminum electrode was laminated in thickness of 1000 Å by vacuum evaporation ($10^{-5}$ Torr) as heat-resistant insulating layer. Then, to FEP film on the opposite side, 10% toluene solution of styrene-butadiene rubber having glass transition temperature of −70° C., specific resistance $10^{15}$ Ω·cm and water absorption 0.25% was coated as the resin layer with low glass transition temperature by the spinner coating method (1000 rpm×30 sec.) in thickness of 1.0 μm after drying. Thus, the electrostatic information recording medium of FIG. 9 was obtained.

Next, on the resin layer with low glass transition temperature of this electrostatic information recording medium, electric charge was given by corona charging to have surface potential of +100 V or −100 V, and it was then heated in an oven at 40° C. for 60 seconds. As the result, the surface potential changed to +90 V and −90 V, and it was maintained on the electrostatic information recording medium.

Then, the electrostatic information recording medium was left at room temperature and room humidity for 30 days, and the surface potential was measured. As the result, it was maintained at +90 V and −90 V. In the additional test by leaving it for 30 days at 60° C. and 20% R.H., the surface potential of ±80 V was maintained. Further, after leaving it under high humidity condition of 95% R.H. at 40° C. for 30 days, the surface potential of ±70 V was maintained.

EXAMPLE 6

On a glass substrate of 1 mm thick, aluminum electrode was laminated in thickness of 1000 Å by vacuum evaporation method ($10^{-5}$ Torr). On this aluminum electrode, 5% solution in fluorine type solvent of fluororesin (trade name: CYTOP; Asahi Glass Co.; glass transition temperature 100° C., water absorption 0.01%, specific resistance $1 \times 10^{18}$ Ω·cm) was coated by blade coater of 8 mil. After drying it at room temperature for 3 hours, heat-resistant resin layer of about 7 μm thick was laminated.

Next, on this heat-resistant resin layer, 5% solution in mixed solvent of toluene-MEK (1:1) of acrylic acid ester (trade name: Dianar, Mitsubishi Rayon Co.; glass transition temperature 40° C., water absorption 0.03%, and specific resistance $1 \times 10^{14}$ Ω·cm) was coated by blade coater. After drying, the resin layer with low glass transition temperature of about 3 μm thick was laminated, and the electrostatic information recording medium of FIG. 9 was obtained.

On this electrostatic information recording medium, electric charge was provided by corona charging to have the surface potential of +100 V or −100 V. After heating this in an oven at 45° C. for one minute, the surface potential was measured. As the result, the surface potential changed to 80 V and −80 V, and electrostatic information was maintained.

After leaving this electrostatic information recording medium at room temperature and humidity for 30 days, the surface potential was measured. It was +80 V and −80 V, showing no attenuation. Next, in the acceleration test under the condition of 60° C. and 20% R.H. leaving for 30 days, the surface potential of ±70 V was maintained. After leaving for 30 days under high humidity condition of 95% R.H. and 40° C., it was maintained at ±60 V.

EXAMPLE 7

By reversing the laminating sequence of heat-resistant insulating layer and the resin layer with low glass transition temperature of the Example 6, the electrostatic information recording medium of FIG. 10 was prepared by the same procedure as in the Example 6.

To this electrostatic information recording medium, electric charge was provided by corona charging to have the surface potential of +100 V or −100 V. After heating this in an oven at 45° C. for one minute, the electric charge retaining property was measured. It was found that surface potential changed to +80 V and −80 V, and electrostatic information was maintained.

After leaving this at room temperature and humidity for 30 days, surface potential was measured. It was maintained at +80 V and −80 V, and no attenuation of surface potential was noted. In the acceleration test by leaving it for 30 days under the condition of 60° C. and 20% R.H., the surface potential was maintained at ±70 V. After leaving for 30 days under high humidity condition of 95% R.H. at 40° C., the surface potential was maintained at ±60 V.

EXAMPLE 8

On a thermaly oxidized silicon-oxide layer (Mitsubishi Metal Co.) of 1.7 μm thick formed by thermal oxidation of silicon wafer, 40% monochlorbenzene solution of poly-(α-pinene) (trade name: Picolite A115; Rika Hercules Co.) having glass transition temperature of 64° C. was coated by the spinner coating method (3000 rpm×20 sec.) to thickness of 2.5 μm after drying, and the electrostatic information recording medium of FIG. 9 was obtained.

Next, on the resin layer with low glass transition temperature on this electrostatic information recording medium, electric charge was provided by corona charging using silicon wafer substrate as electrode to have surface potential of +170 V or −170 V, and this was heated at 100° C. for one hour on a hotplate. As the result, surface potential changed to +150 V and −120 V, and it was maintained on the electrostatic information recording medium.

Then, this electrostatic information recording medium was left for 30 days at room temperature and humidity, and surface potential was measured. It was maintained at +150 V and −120 V. In the acceleration test leaving it for 30 days under the condition of 60° C. and 20% R.H., surface potential was maintained at +140 V and −110 V. After leaving for 30 days under high humidity condition of 95% R.H. at 40° C., surface potential was maintained at +140 V and −100 V.

EXAMPLE 9

On a thermally oxidized silicon-oxide layer (Mitsubishi Metal Co.) of 1.7 μm thick formed by thermal oxidation of silicon wafer, using this as heat-resistant insulating material, 40% monochlor-benzene solution of poly-(α-pinene) (trade name: Picolite S115; Rika Hercules Co.) having glass transition temperature of 63.5° C. using this as the resin layer with low glass transition temperature, was coated by the spinner coating method (2000 rpm×20 sec.) to thickness of 4.4 μm after drying, and the electrostatic information recording medium of FIG. 9 was prepared.

Then, on the resin layer with low glass transition temperature of this electrostatic information recording medium, electric charge was provided by corona charging using silicon wafer substrate as electrode to have the surface potential of +250 V or −250 V, and this was heated on a hot plate at 100° C. for one hour. As the result, the surface potential changed to +110 V and −110 V, and it was maintained on the electrostatic information recording medium.

Then, this electrostatic information recording medium was left at room temperature and humidity for 30 days, and surface potential was measured. It was maintained at +110 V and −110 V. In the acceleration test leaving it for 30 days under the condition of 60° C. and 20% R.H., surface potential was maintained at +100 V and −100 V. Further, after leaving it for 30 days under high humidity condition of 95% R.H. at 40° C., surface potential was maintained at +105 V and −105 V.

EXAMPLE 10

On a thermally oxidized silicon-oxide layer (Mitsubishi Metal Co.) of 1.7 μm thick formed by thermal oxidation of silicon wafer, using this as heat-resistant insulating material, 40% monochlorbenzene solution of poly-(α-pinene) (trade name: Picolite A115; Rika Hercules Co.) having glass transition temperature of 64° C. was coated as the resin with low glass transition temperature by the spinner coating method (3000 rpm×20 sec.) in thickness of 2.5 μm after drying, and the electrostatic information recording medium of FIG. 9 was prepared.

On the resin layer with low glass transition temperature on this electrostatic information recording medium, electric charge was provided by corona charging using silicon wafer substrate as electrode to have surface potential of +170 V or −170 V.

After leaving this electrostatic information recording medium at normal temperature and humidity for 30 days, surface potential was measured. It was maintained at +170 V and −170 V. In the acceleration test leaving it for 30 days under the condition of 60° C. and 20% R.H., surface potential was maintained at +150 V and −120 V. Further, after leaving it for 30 days under high humidity condition of 95% R.H. and 40° C., surface potential was maintained at +160 V and −135 V.

(Electrostatic information recording method)

The organic photosensitive member used for the electrostatic information recording on the first electrostatic information recording medium, and the electrostatic information recording medium manufactured in the Example 5 were exposed to light under voltage application by the electrostatic information recording method of FIG. 3. After electric charge image of −150 V was obtained with the pattern of line width 20 μm, it was heated at 40° C. for 60 seconds.

On the other hand, the electrostatic information recording medium having only FEP layer on an electrode was prepared for comparison by the same procedure as in the Example 5, and the same electrostatic information recording was performed.

Acceleration test was carried out on this electrostatic information recording medium and the comparative medium by leaving them for 30 days under the condition of 40° C. and 95% R.H. The surface potential was measured and the reproduction by toner development was performed on each of them. On the electrostatic information recording medium of this invention, the surface potential was stabilized at −140 V after heating, and the pattern of 20 pm could be resolved by toner development. On the comparison medium, surface potential remained at −150 V without attenuating because it was not heated, but the pattern of 20 μm could not be resolved in the reproduction by toner development.

Next, description is given on the third electrostatic information recording medium.

Figure 12A:
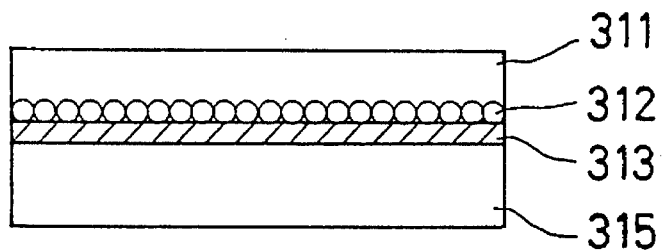
FIG. 12 shows cross-sectional views of the third electrostatic information recording medium.

FIGS. 12(a) and (b) are cross-sectional views of the third electrostatic information recording medium of this invention. FIGS. 12(c) and (d) are the cross-sectional views of the information preserving condition after information has been recorded on the electrostatic information recording medium of FIGS. 12(a) and (b). In the figures, 310 is a protective layer, 311 an insulating layer, 311' an insulating layer with thickness of 1000 A or less, 312 a particle layer, 313 an electrode, and 315 a support member.

The insulating layer must be highly resistant in order to suppress the migration of electric charge, and it is required to have the insulating property with specific resistance of $10^{14}$ Ω·cm.

In the case shown by FIG. 12(a), the particle layer 312 is formed on electrode by vacuum evaporation, and silica, alumina, etc. are formed on the particle layer by vacuum evaporation, or resin, rubber, etc. are dissolved in solvent and are formed on it by coating or dipping.

Figure 12B:
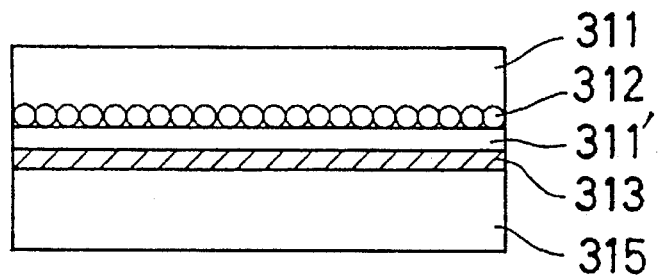
Figure 12C:
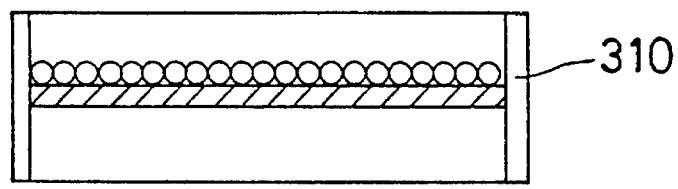

In the case shown by FIG. 12(b), the insulating layer 311' is laminated on the electrode in thickness of 1000 A or less. This insulating layer 311' has such function that electric charge is injected into the particles from the electrode 313 by the effect of electric field formed by the image electric charge and that the electric charge is stably maintained in the particles. For this purpose, it is preferable that it is laminated in thickness of 1000 A or less, and silica, alumina, etc. are laminated on it by vacuum evaporation, sputtering, etc., or resin, rubber, etc. are dissolved in solvent and are laminated by spinner coating.

As the material for the insulating layer, thermoplastic resin, or thermosetting resin, UV-setting resin, or energy beam setting resin such as electron beam setting resin, or engineering plastics or rubber can be used.

As thermoplastic resin, it is preferable to use the insulating layer forming materials as described in the first electrostatic information recording medium.

Further, as thermosetting resin, unsaturated polyester resin, epoxy resin, phenol resin, urea resin, melamine resin, diallylphthalate resin, silicone resin, etc. can be used.

As energy beam setting resin such as UV-setting resin, electron beam setting resin, etc., radical polymerizing acrylate compound can be used. There are ester compound of acrylic acid or metacrylic acid or their derivatives and having hydroxyl group at both ends. In actual cases, the following compounds can be used: (meta)acrylic ester compound having one polymerizing unsaturated group such as hydroxyethyl acrylate, hydroxypropyl acrylate, hydroxybutyl acrylate, hydroxyethyl metacrylate, hydroxypropyl metacrylate, hydroxybutyl metacrylate, 4-hydroxycyclohexyl acrylate, 5-hydroxycyclooctyl acrylate, 2-hydroxy-3-phenyloxypropyl acrylate, etc. and the compound having two polymerizing unsaturated groups and given by the following formula:

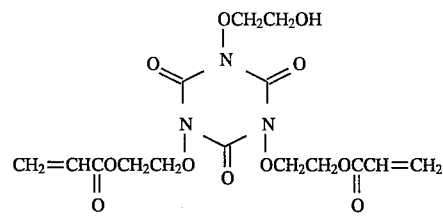

As the hardening compound having 2 hydroxy groups and one or two or more radical polymerizing unsaturated group, glycerol metacrylate or the acrylates given by the following formula can be used:

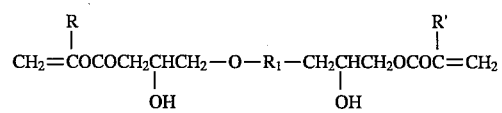

(where R and R' represent methyl group or hydrogen, and $R_1$ represents short chain diole group such as ethyleneglycol, propyleneglycol, diethyleneglycol, butanediole, 1,6-hexanediole, etc.

As the engineering plastics, the following compounds can be used: Polycarbonate, polyamide, acetal resin, polyphenylene oxide polybutylene-terephthalate, polyethylene-terephthalate, polyphenylene sulfide, polyimide resin, polysulfone, polyether sulfone, aromatic polyester, polyacrylate, etc.

The insulating layer to be laminated on the particle layer may be formed by attaching silicon film, polyester film, polyimide film, fluorine-containing film, polyethylene film, polypropylene film, polyparabanic acid film, polycarbonate film, polyamide film, etc. by adhesives.

The insulating layer to be laminated on the particle layer must be formed with thickness of 1000 A (0.1 μm) or more from the viewpoint of insulating property, and the thickness is preferably 100 μm or less from the viewpoint of flexibility.

The particles to accumulate electric charge are formed by photoconductive material and electrically conductive materials.

As the photoconductive particle materials, inorganic photoconductive materials such as amorphous silicon, crystalline silicon, amorphous selenium, crystalline selenium, cadmium sulfide, zinc oxide, etc., or organic photoconductive materials such as polyvinylcarbazole, phthalocyanine, azo type pigment, etc. can be used.

As the electrically conductive materials, the following materials can be used: The materials of I A group (alkali metal) of periodic table, I B group (copper group), II A group (alkali earth metal), IIB group (zinc group), IIIA group (aluminum group), III B group (rare earth group) IV B group (titanium group), V B group (vanadium group), VI B group (chromium group), VII B group (manganese group), VIII group (iron group and platinum group), or carbon, silicon, germanium, tin, and lead as IV A group (carbon group), antimony, bismuth as V A group (nitrogen group), sulfur, selenium, tellurium as VIA group (oxygen group) are used in fine powder. Of the above elements, metal element can be used in the form of metallic ion, fine powder alloy, organic metal or complex. Further, the above elements can be used in the form of oxide, phosphated compound, sulfonated compound or halogenated compound. Above all, it is preferable to use carbon, gold, copper, aluminum, etc.

Next, description is given on the method to form particle layer.

In the case shown by FIGS. 12(a) and (b), particle layer of amorphous silicon, amorphous selenium, crystalline selenium, etc. is formed on electrode or on insulating layer by vacuum-depositing the material by low pressure vacuum evaporation device. The particle layer forming materials are aggregated when evaporated under low pressure of $10-10^{-3}$ Torr and are turned to super-fine particles with diameter of 10–0.1 μm. The particles are laminated on the surface of electrode or insulating layer, aligned in single layer or in multiple layers.

The support member and the electrode are the same as those used on the first electrostatic information recording medium.

Next, description is given on the electrostatic information recording method on this electrostatic information recording medium.

Figure 13A:
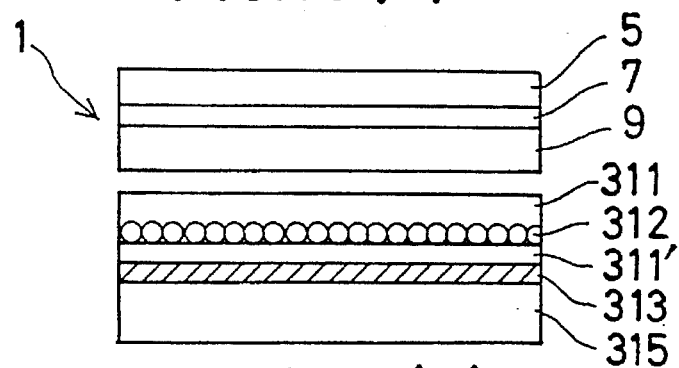
FIG. 13 and FIG. 14 are to explain the method to record information on the third electrostatic information recording medium.
Figure 13B:
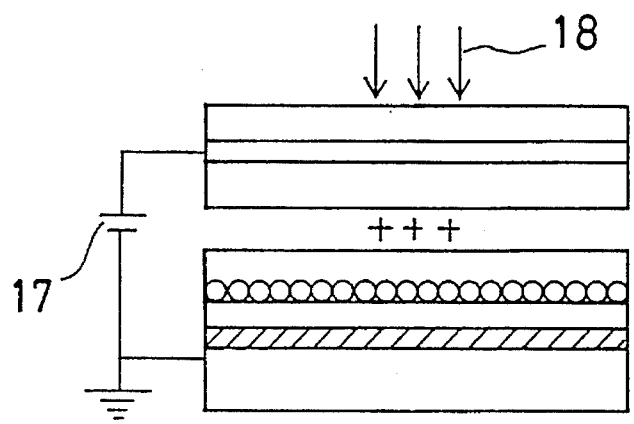
Figure 13C:
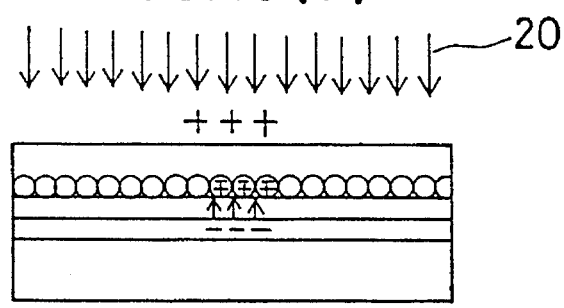
Figure 13D:
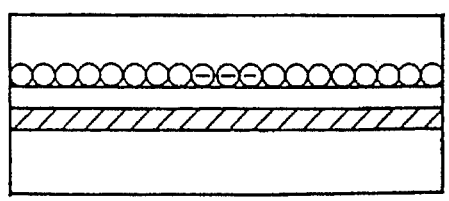
Figure 14A:
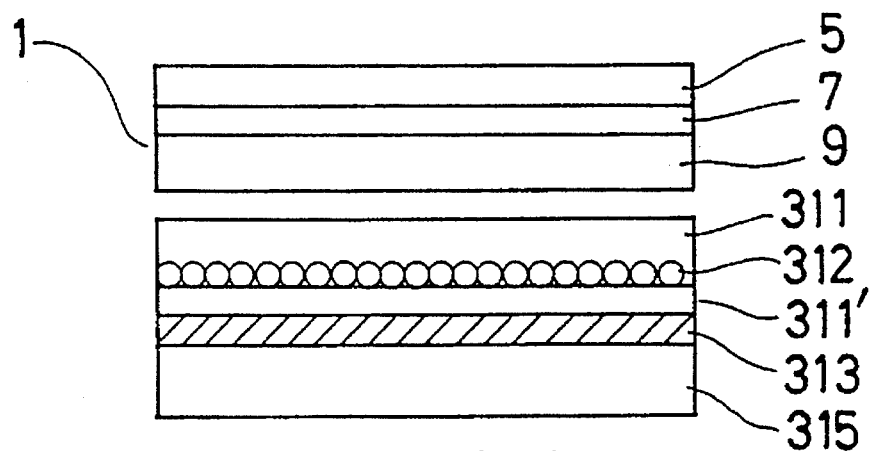
Figure 14B:
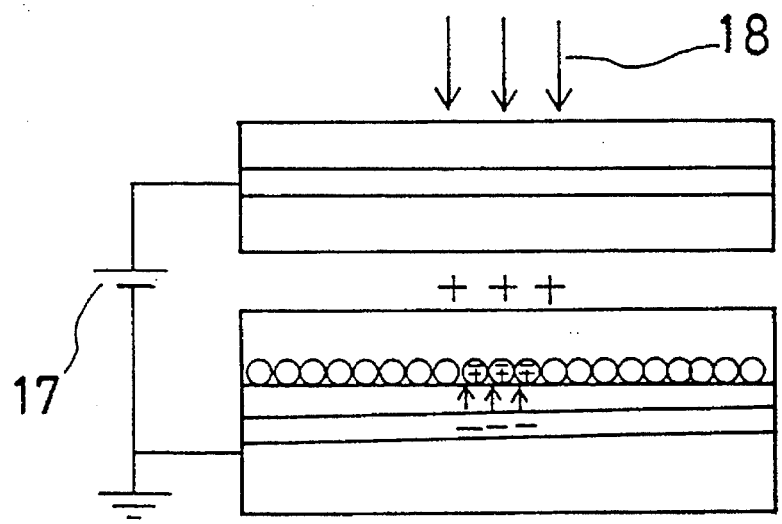
Figure 14C:
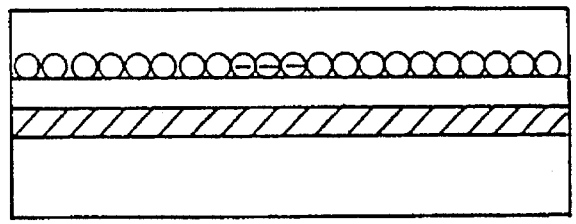

FIG. 13 and FIG. 14 are to explain the information recording on the electrostatic information recording medium of FIG. 12(b). FIG. 13 shows the case where the particles are photoconductive particles, and FIG. 14 the case of electrically conductive particles.

First, description is given on the electrostatic information recording method of FIG. 13.

The photosensitive member 1 is placed face-to-face to the electrostatic information recording medium with a gap of about 10 pm between them as shown in FIG. 13(a).

Next, as shown in FIG. 13(b), voltage is applied between the electrodes 7 and 313 from the power source 17, and exposure is performed under voltage application by the procedure explained in FIG. 3.

Then, the power source 17 is turned off, and the electrostatic information recording medium is detached from the photosensitive member 1 and total exposure 20 is performed as shown in FIG. 13(c). When electric charge is provided evenly, electron and hole carriers are generated on the particle layer of the exposed portion. By the image electric charge generated on the portion, where light enters, opposite electric charge is induced on the electrode 313 and moves in the insulating layer 311' by the effect of the electric field. Thus, electric charge is accumulated in the particle layer in stable condition.

In the total exposure, it is necessary to expose the particle layer to generate electron and hole carriers. In case exposure is performed from the direction of insulating layer, the electrode may be non-transparent, while the insulating layer must be transparent or semi-transparent. Thus, it is preferable to use transparent resin. When total exposure is performed from the direction of electrode, transparent electrode such as transparent inorganic conductive layer such as ITO, tin oxide, etc., or vacuum evaporation film of gold or the like must be used.

Next, description is given on the case where the particle layer 312 is electrically conductive particle as shown in FIG. 14.

As shown in FIG. 14(b), when light 18 enters from the direction of the photosensitive member 1, discharge occurs between this and the electrostatic information recording medium, and electric charge is accumulated on the surface of the electrostatic information recording medium. Then, by the effect of electric field generated by the electric charge, the opposite electric charge induced by the electrode moves in the insulating layer 311' and is permanently accumulated in the conductive particle layer as information electric charge. When exposure is completed, power source is turned off, and the electrostatic information recording medium is taken out. Thus, the formation of electrostatic latent image is completed.

In case of the electrostatic information recording medium of FIG. 12(a), particle layer 312 is directly laminated on the electrode 313. In this case, the information electric charge can be accumulated in the particle layer as described above.

Figure 12D:
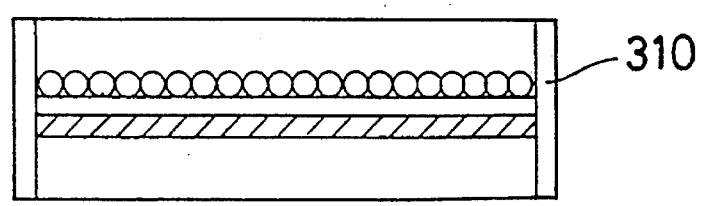

As shown in FIG. 12(c) and FIG. 12(d), the electrostatic information recording medium with the information electric charge accumulated in the particles can be coated with the insulating resin on electrode terminals to form the protective layer 310. When electrode terminals are sealed by the insulating resin, the information electric charge in the particle layer can be permanently maintained.

When this electrostatic image recording method is used for planar analog recording, the same high resolution as in the silver salt photography can be obtained, and the electric charge in the particle layer 312 is protected and is preserved for long period without discharging.

To reproduce the information from the electrostatic information recording medium with accumulated information electric charge, the protective layer 310 sealing the electrode terminals is detached to expose the electrode and to read the potential difference from the surface potential, or the terminal is punctured and is brought into contact with the electrode, utilizing the flexibility of the protective layer, and the potential difference between the terminal and the surface potential of electrostatic information recording medium is read.

In the following, description is given on the examples.

EXAMPLE 11

On a glass substrate of 1 mm thick, aluminum electrode is evaporated in thickness of 1000 A by vacuum evaporation ($10^{-5}$ Torr) method. On this aluminum electrode, $SiO_2$ insulating layer is vacuum-deposited in thickness of 500 Å by sputtering. Then, this substrate is heated on a heater plate to 100° C., and selenium is vacuum-deposited under low vacuum condition (3 Torr). Thus, selenium particle layer with average diameter of 0.5 μm is furnished on $SiO_2$ insulating layer. On this selenium particle layer, 50% xylene solution of silicon resin (TSR-144; Toshiba Silicon Co.) was coated by spinner coating (1000 rpm×30 sec.). After drying at 60° C. for 3 hours, the insulating layer of 10 μm thick was provided, and the electrostatic information recording medium was prepared.

EXAMPLE 12

Under the same condition as in the Example 11, low vacuum evaporation was performed on the material by resistance heating in crucible, using gold instead of selenium. As the result, black gold particles with average particle diameter of 0.2 μm were formed on silicon resin surface in single layer. Then, in the same procedure as in the Example 10, 50% xylene solution of silicon resin (TSR-144; Toshiba Silicon Co.) was coated by spinner coating (1000 rpm×30 sec.). After drying at 60° C. for 3 hours, the insulating layer of 10 pm thick was provided, and the electrostatic information recording medium was prepared.

EXAMPLE 13

On a glass substrate of 1 mm thick, aluminum electrode was laminated in thickness of 1000 Å by vacuum evaporation method ($10^{-5}$ Torr). Then, this substrate was heated on a heater plate to 100° C. By vacuum evaporation of selenium on this aluminum electrode under low vacuum condition (3 Torr), selenium particle layer with average diameter of 0.5 μm was furnished on the electrode in single layer.

Further, on this selenium particle layer, 50% xylene solution of silicon resin (TSR-144; Toshiba Silicon Co.) was coated by spinner coating (1000 rpm×30 sec.). After drying at 60° C. for 3 hours, insulating layer of 10 μm thick was provided, and the electrostatic information recording medium was prepared.

EXAMPLE 14

In the selenium vacuum evaporation in the Example 11, evaporation time was increased from 60 seconds to 300 seconds. As the result, crystalline selenium was formed on $SiO_2$ insulating layer in multiple layers. This was confirmed under light microscope. By the same procedure as in the Example 11, the electrostatic information recording medium was obtained.

EXAMPLE 15

As shown in FIG. 13, the same photosensitive member as the organic photoconductor member used for the electrostatic information recording of the first electrostatic information recording medium was used. Using polyester film of 10 μm thick as a spacer, the electrostatic information recording medium as manufactured in the Example 10 was placed face-to-face to the photoconductive layer surface of the above photosensitive member and was grounded. Then, DC voltage of 700 V was applied between two electrodes with the photosensitive member as positive and the resin layer as negative.

In case of amorphous silicon photosensitive member, it is preferable to apply voltage with photosensitive member as negative, and amorphous selenium photosensitive member as positive.

Under voltage application, exposure was performed for 1 second, using halogen lamp of 1000 luxes as light source with the light entering from photosensitive member side upon completion of the exposure, the electrostatic information recording medium was taken out, and electrostatic latent image was formed by total exposure.

Next, silicone resin was coated to seal the exposed portion of the electrode, and the medium was immersed into water. After the immersion, the medium was taken out and water was evaporated. Then, protective film was detached, and potential difference from the medium surface was measured. The surface potential of 50 V was measured by surface potentiometer on the surface of the medium, while the surface potential on the non-exposed portion was 0 V. When surface potential of the electrostatic information recording medium was measured in dark place before total exposure, the surface potential of 100 V was measured on the exposed portion, and this reveals that electric charge is accumulated in selenium particles by total exposure.

Next, the same exposure was performed by closely attaching a resolution pattern film on the photosensitive member glass substrate during exposure, and then XY-axis scanning was performed on the surface of micro-area surface potential measuring probe of 50×50 μm on the electrostatic information recording medium. The potential data of 50 μm unit was processed and was enlarged and displayed on CRT by potential-brightness conversion. As the result, the resolution pattern up to 100 μm could be confirmed on CRT. After the exposure, the electrostatic information recording medium was left for 3 months at room temperature of 25° C. and 35% humidity, and the same potential scanning reading was carried out. As the result, the resolution pattern display was exactly the same as that of immediately after the exposure.

Normal camera was used, and outdoor daytime object photographing was performed with voltage of −700 V applied under the condition of exposure f=1.4, and shutter speed of 1/60 seconds. After the exposure, XY-axis scanning was performed on the electrostatic information recording medium by micro-area surface potential measuring probe, and potential data was processed for 50 μm unit and were enlarged and displayed on CRT by potential-brightness conversion. As the result, an image with gradation was formed.

Next, description is given on the fourth electrostatic information recording medium.

Figure 15A:
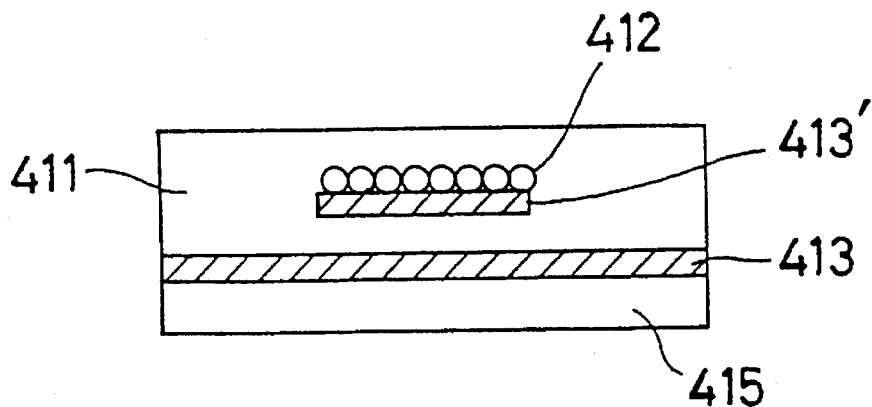
FIG. 15 represents cross-sectional views of the fourth electrostatic information recording medium.
Figure 15B:
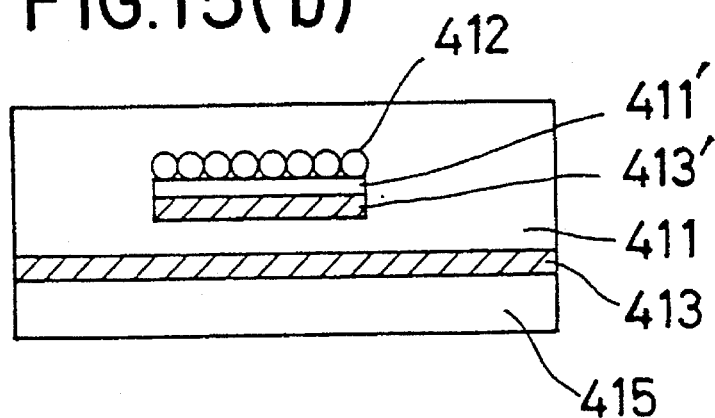
Figure 15C:
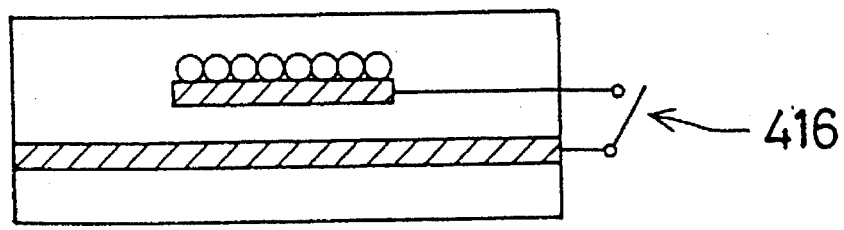

FIGS. 15(a) and (b) are cross-sectional views of the fourth electrostatic information recording medium, and FIG. 15(c) is a cross-sectional view to show the aspect at information recording. In the figure, 411 is an insulating layer, 411' is an insulating layer with thickness of 1000 Å or less, 412 a particle layer, 413 a first electrode, 413' a second electrode, 415 a support member and 416 a shorting circuit.

The fourth electrostatic information recording medium is to record the information on the particle layer 412 as a distribution of electrostatic charge as in the case the above third electrostatic information recording medium. The particle layer may be either photoconductive layer or electrically conductive layer.

FIG. 15(a) shows the case where a first electrode 413 is provided on a support member, the insulating layer 411 is laminated in thickness of 1000 Å or more, and a second electrode 413' is laminated on the insulating layer with the area smaller than surface of the first electrode. Then, the particle layer 412 is furnished on this second electrode layer, and this second electrode layer and the particle layer 412 are covered by the insulating layer.

To record electrostatic information on this electrostatic information recording medium, a shorting circuit 416 is formed between the first and the second electrodes as shown in FIG. 5(c), and information is recorded by the electrostatic information recording method as described above. The short-circuit is connected during information recording, and exposure is performed under voltage application. It is released after information recording, and the electrode and the particle layer with the recorded electrostatic information are sealed within the insulating layer.

It is preferable that the shorting circuit is formed by flexible resin such as rubber on the insulating layer and that it is penetrated by connecting wire to connect with the second electrode and the connecting wire is withdrawn after the information is recorded. When the information is reproduced, the connecting wire is penetrated again to connect with the second electrode. Thus, the electrostatic information of the particle layer can be reproduced by the potential difference from the surface potential of the medium.

In the electrostatic information recording medium of FIG. 15(b), the particle layer is laminated on the second electrode through the insulating layer 411'. This insulating layer 411' is laminated in thickness of 1000 A or less. When recording the information, electric charge can be injected into the particles from the second electrode by the effect of electric field, which is generated by the information electric charge on the surface of the electrostatic information recording medium. After injection, the information electric charge can be stably maintained in the particle layer of the insulating layer.

To laminate the second electrode, the insulating layer 411' and the particle layer, it is preferable, for example, that the surface end of the insulating layer laminated on the first electrode is adequately covered and that these layers are laminated by coating or vacuum evaporation.

The support member and the electrode are the same as those used in the first electrostatic information recording medium.

Next, description is given on the electrostatic information recording method.

Figure 16A:
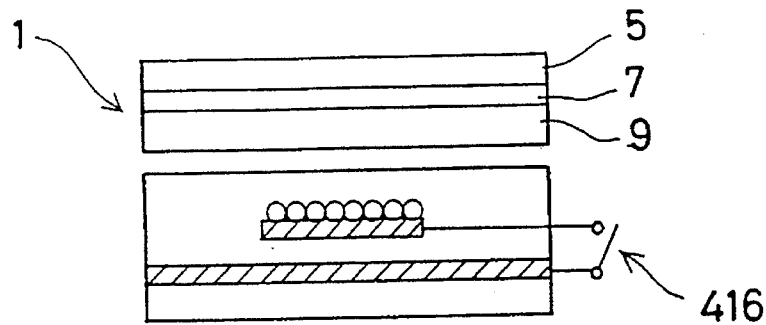
FIG. 16 and FIG. 17 are to explain the method to record information on the fourth electrostatic information recording medium.
Figure 16B:
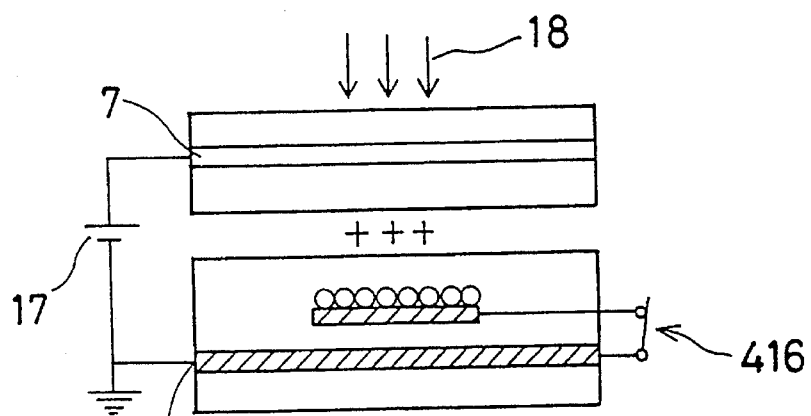
Figure 16C:
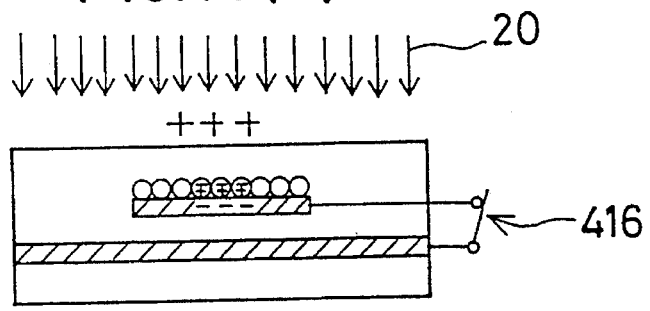
Figure 16D:
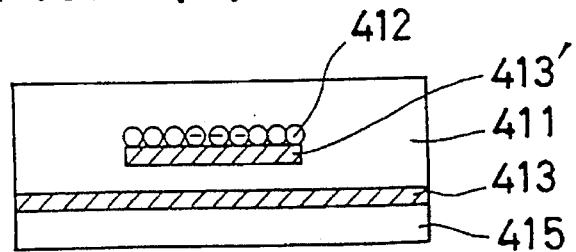
Figure 17A:
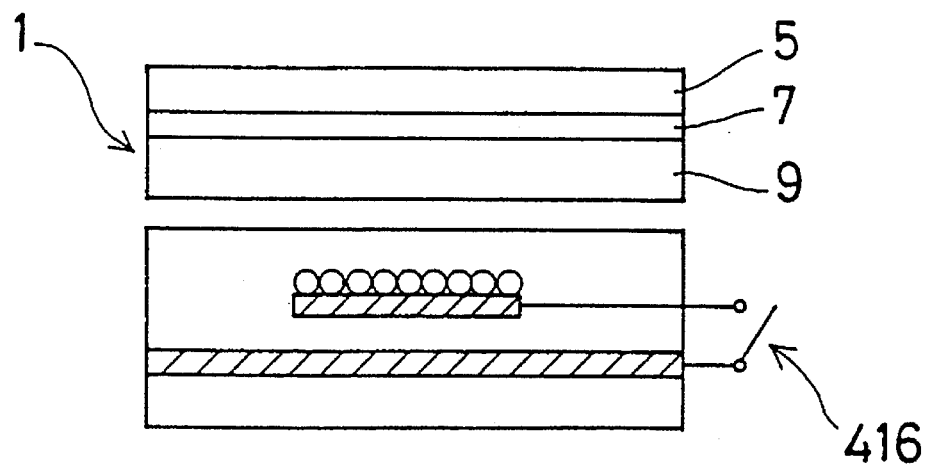
Figure 17B:
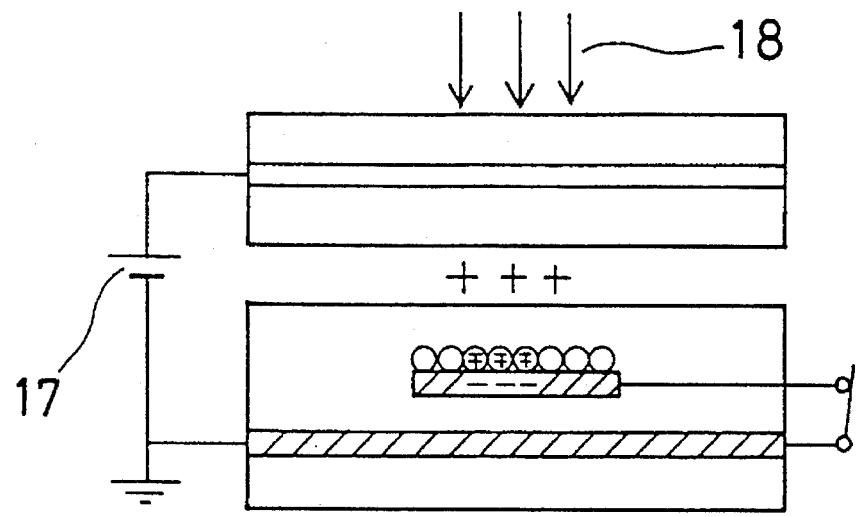
Figure 17C:
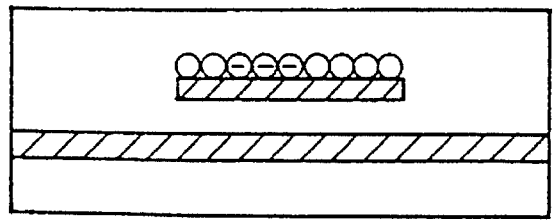

FIG. 16 and FIG. 17 are to explain the method to record on this electrostatic information recording medium. FIG. 16 shows the case where the particles are photoconductive particles, and FIG. 17 shows the case of electrically conductive particles. In the figure, 416 is a shorting circuit, 17 a power source, 18 information light, and 20 total exposure.

To the photosensitive member 1, the electrostatic information recording medium is placed with a gap of about 10 μm between them as shown in FIG. 16(a).

Next, the shorting circuit 416 in the electrostatic information recording medium is short-circuited as given in FIG. 16(b). By applying voltage between the electrodes 7 and 413 from the power source 17, electric charge is accumulated on the electrostatic information recording medium.

Then, the power source 17 is turned off, and the electrostatic information recording medium is detached from the photosensitive member 1. As shown in FIG. 16(c), total exposure is performed with the shorting circuit 416 in short-circuited state.

If an example is taken in the case without overburdened charge, opposite electric charge is induced on the second electrode 413' by the information electric charge generated on the portion where light enters, and the electric charge moves toward the particles by the effect of the electric field, and it appears that the information electric charge is stably accumulated in the particle layer.

In case where particles are electrically conductive particles, total exposure is not required as shown in FIG. 17, and the information electric charge can be accumulated in the particles.

The information recording is also performed in the electrostatic information recording medium of FIG. 15(b), and the information electric charge can be accumulated in the particles in more stabilized condition.

When planar analog recording is performed on the electrostatic information recording medium, the same high resolution as in the silver salt photography can be obtained. The electric charge in the particle layer is protected in the insulating layer and it is preserved for long period without being discharged.

In the following, some examples are described.

EXAMPLE 16

On a glass substrate of 1 mm thick, aluminum electrode is laminated in thickness of 1000 A by vacuum evaporation method ($10^{-5}$ Torr). On this aluminum electrode, 50% xylene solution of silicon resin (TSR-144; Toshiba Silicon Co.) was coated by spinner coating method (1000 rpm×30 sec.) and was dried. On the silicon resin layer with all its ends covered, aluminum was again vacuum-deposited in thickness of 1000 A by vacuum evaporation method ($10^{-5}$ Torr).

SiO$_2$ insulating layer was vacuum-deposited in thickness of 500 A by sputtering method. Next, this substrate was heated to 100° C. on a heater plate, and selenium was vacuum-deposited under low vacuum condition (3 Torr). Thus, selenium particle layer with average diameter of 0.5 μm was provided in single layer on SiO$_2$ insulating layer.

Then, the above covering was removed, and 50% xylene solution of silicon resin (TSR-144; Toshiba Silicon Co.) was coated on it by spinner coating (1000 rpm×30 sec.), and the surface was flattened. After drying this at 60° C. for 3 hours, this was turned to an insulating layer of 10 μm thick, and the electrostatic information recording medium was prepared.

EXAMPLE 17

Under the same condition as in the Example 16, low vacuum evaporation was performed by resistance heating in crucible, using gold as the particle forming material instead of selenium. As the result, gold particles in black color with average particle diameter of 0.2 μm were formed in single layer on the silicon resin layer. Then, 50% xylene solution of silicon resin (TSR-144; Toshiba Silicon Co.) was coated by spinner coating (1000 rpm×30 sec.). After drying this at 60° C. for 3 hours, an insulating layer of 10 μm thick was furnished, and the electrostatic information recording medium was prepared.

EXAMPLE 18

On a glass substrate of 1 mm thick, aluminum electrode was laminated in thickness of 1000 A by vacuum evaporation method ($10^{-5}$ Torr). On this aluminum electrode, 50% xylene solution of silicon resin (TSR-144; Toshiba Silicon Co.) was coated by spinner coating (1000 rpm×30 sec.) and was dried. On this silicon resin layer with all its ends covered, aluminum was again vacuum-deposited in thickness of 1000 A by vacuum evaporation method ($10^{-5}$ Torr).

Next, this substrate was heated to 100° C. on a heater plate, and selenium was vacuum-deposited under low vacuum condition (3 Torr). As the result, selenium layer with average diameter of 5 μm was furnished on $SiO_2$ insulating layer. Further, the above covering was removed, and 50% xylene solution of silicon resin (TSR-144; Toshiba Silicon Co.) was coated by spinner coating (1000 rpm×30 sec.) to cover the selenium particle layer, and the surface was flattened. After drying at 60° C. for 3 hours, it was turned to an insulating layer of 10 μm thick, and the electrostatic information recording medium was prepared.

EXAMPLE 19

In the selenium vacuum evaporation in the Example 16, vacuum evaporation time was increased from 60 seconds to 300 seconds, and crystalline selenium was formed in multiple layers on $SiO_2$ insulating layer. This was confirmed under light microscope. By the same procedure as in the Example 16, the electrostatic information recording medium was obtained.

EXAMPLE 20

The same photosensitive member as the organic photoconductor member used for the electrostatic information recording on the first electrostatic information recording medium was used. Using a polyester film of 10 μm thick as a spacer, the electrostatic information recording medium prepared in the Example 16 was placed face-to-face to the photoconductive surface of the above photosensitive member and was grounded. Then, the shorting circuit was closed, and the first electrode and the second electrode were connected with each other. DC voltage of 700 V was applied between two electrodes of photosensitive member and the electrostatic information recording medium with the former as positive and the latter as negative.

In case of amorphous silicon photosensitive member, it is preferable that voltage is applied with the photosensitive member as negative and amorphous selenium photosensitive member as positive.

Under voltage application, exposure is performed for one second from the direction of the photosensitive member using a halogen lamp of 1000 luxes as light source. Upon completion of the exposure, the electrostatic information recording medium was taken out, and total exposure was performed with the first and the second electrodes connected to each other. Thus, the formation of electrostatic latent image was completed.

After electrostatic latent image was formed, shorting circuit was released, and the medium was immersed in water. After the immersion, the medium was taken out and water was evaporated, and the potential difference between the second electrode and the surface of the electrostatic information recording medium was measured. The surface potential of 100 V was measured by surface potentiometer on the electrostatic information recording medium, while the potential difference from the first electrode was 0 V. On the other hand, the surface potential on the non-exposed portion was also 0 V. When surface potential of the electrostatic information recording medium was measured on the exposed portion in dark place before total exposure, the surface potential of 100 V was measured, and this revealed that electric charge was accumulated in selenium particles by total exposure.

Next, the same exposure was performed by closely attaching the resolution pattern film on photosensitive member glass substrate during exposure, and the electrostatic information recording medium was then scanned by XY-axis scanning using micro-area surface potential measuring probe of 50×50 μm. The potential data were processed in 50 μm unit and were enlarged and displayed on CRT by potential-brightness conversion. As the result, the resolution pattern up to 100 μm could be confirmed on CRT. After exposure, the electrostatic information recording medium was left for 3 months under the condition of room temperature 25° C. and 35%, and the same potential scanning reading was performed. As the result, the resolution pattern was exactly the same as that of immediately after the exposure.

Using an ordinary camera, outdoor daytime object photographing was carried out under the condition of exposure f=1.4, and the shutter-speed of 1/60 second with voltage of −700 V applied. After the exposure, XY-axis scanning was performed on the electrostatic information recording medium by micro-area surface potential measuring probe of 50×50 μm. The potential data of 50 μm unit were processed and were enlarged and displayed on CRT by potential-brightness conversion. As the result, an image with gradation was formed.

Next, description is given on the fifth electrostatic information recording medium.

Figure 18:
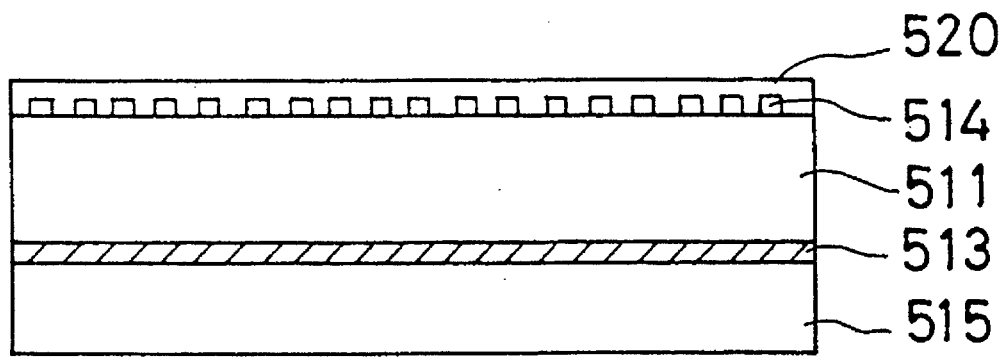
FIG. 18 is a cross-sectional view of the fifth electrostatic information recording medium.
Figure 19:
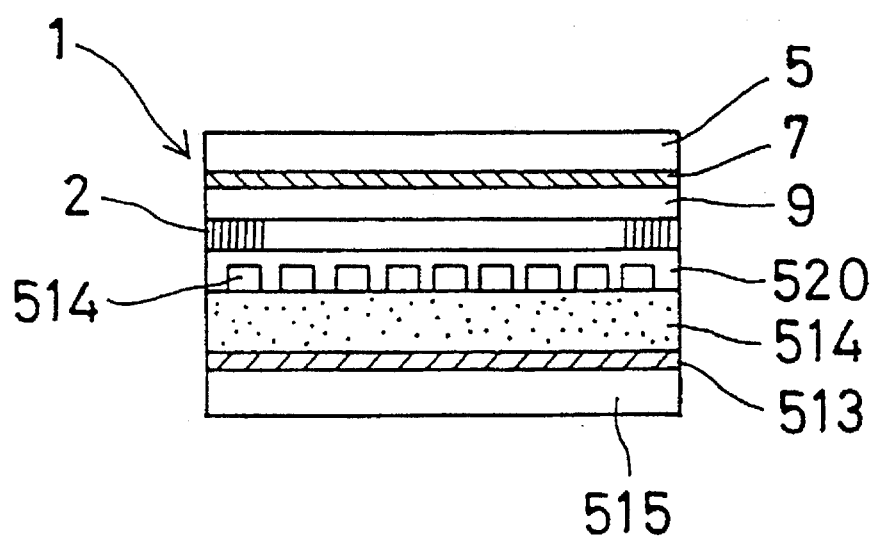
FIG. 19 shows an example of an electrostatic information recording apparatus incorporating the fifth electrostatic information recording medium.
Figure 20A:
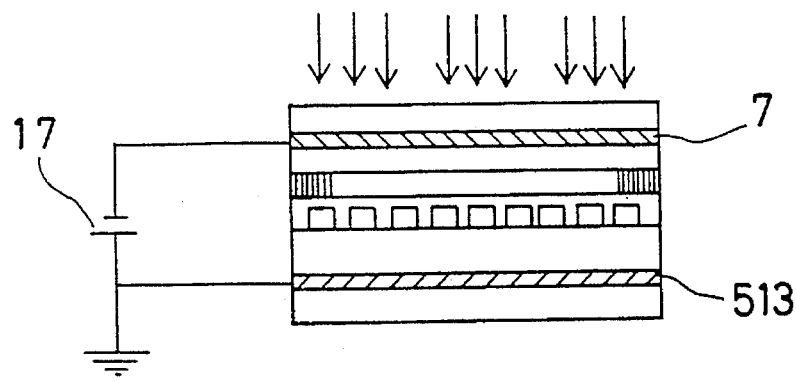
FIG. 20 is to explain the method to record information to the fifth electrostatic information recording medium.
Figure 20B:
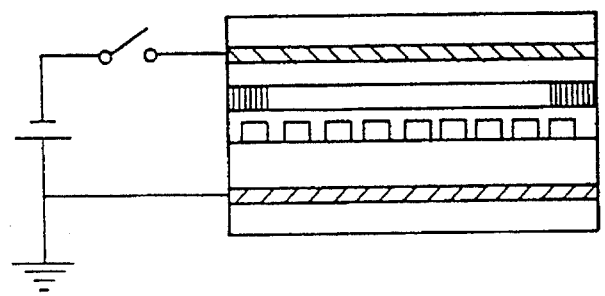
Figure 20C:
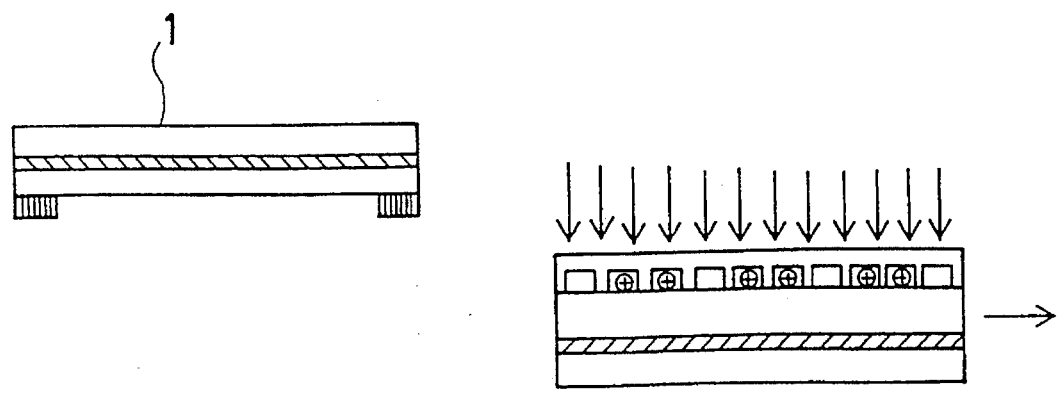

FIG. 18 is a cross-sectional view of the fifth electrostatic information recording medium. FIG. 19 and FIG. 20 are to explain the electrostatic information recording method. In the figures, 511 represents an insulating layer, 513 an electrode, 514 a photoconductive or electrically conductive layer, 515 a support member, and 520 a protective film.

First, insulating layer 511 is laminated on the electrode 513, and photoconductive or electrically conductive layer 514 is then laminated. The insulating layer forming materials may be the same as those used for the third electrostatic information recording medium.

Next, description is given on the photoconductive layer to be laminated on the insulating layer.

Photoconductive layer is a layer where optical carriers (electrons and holes) are generated on the portion irradiated by light and such effect is especially remarkable when electric field is present. The materials are inorganic photoconductive materials, organic photoconductive materials, organic-inorganic composite type photoconductive materials, etc.

The photoconductive materials include inorganic photoconductive materials such as hydrogenated amorphous silicon (a-Si:H), fluorinated amorphous silicon (a-Si:F), amorphous selenium (a-Se), amorphous selenium-tellurium (a-Se-Te), amorphous arsenic-selenium compound (a-$As_2Se_3$), amorphous arsenic-selenium compound+Te, cadmium sulfide (CdS), zinc oxide (ZnO), or organic photoconductive materials such as azo pigment, diazo pigment, trisazo pigment, phthalcyanine pigment, perylene pigment, pyrylium dye, cyanine dye, methine dye, etc. Also, there are hydrozone type, pyrazoline type, polyvinylcarbazole type, carbazole type, stilbene type, anthracene type, naphthalene type, tridiphenylmethane type, azine type, amine type, aromatic amine type, etc. including polyvinylcarbazole (PVK), trinitrofluorenone (TNF), PVK-TNF, etc. Inorganic materials can be laminated by vacuum evaporation method, sputtering method, CVD method, etc. Coating method may be adopted for zinc oxide. Organic materials may be laminated by dissolving in solvent and by coating, or by dipping method, vacuum evaporation method, sputtering method, etc.

As the electrically conductive materials, the following materials may be used: The materials of I A group (alkali metal) of periodic table, I B group (copper group), II A group (alkali earth metal), IIB group (zinc group), III A group (aluminum group), III B group (rare earth group), IV B group (titanium group), V B group (vanadium group), VI B group (chromium group), VII B group (manganese group), VIII group (iron group and platinum group), or carbon, silicon, germanium, tin, and lead as IV A group (carbon group), antimony and bismuth as V A group (nitrogen group), and sulfur, selenium and tellurium can be used in the form of metallic ion, fine powder alloy, organic metal or complex. Further, the above elements can be used in the form of oxide, phosphonated compound, sulfonated compound, or halogenated compound. Above all, it is preferable to use carbon, gold, copper, aluminum, etc.

Photoconductive or electrically conductive layer is laminated on the insulating layer in thickness of 0.1– several µm.

For the patterning of photoconductive or electrically conductive layers, mask is closely attached on the insulating layer, and photoconductive or electrically conductive material may be laminated by vacuum evaporation method, sputtering method or CVD method. Or, after uniform film is formed on the insulating layer, photoresist is coated, and exposure is performed through mask. Then, patterning is performed by etching. Not only photoconductive or electrically conductive layer, but also the insulating layer may be etched.

Next, on this patterned photoconductive layer or electrically conductive layer, a protective layer 520 is furnished. For this purpose, the insulating layer forming materials, for example fluororesin, is dissolved in solvent and is coated in thickness of 0.1–1 µm by spinner coating method or by blade coating method. Or, the protective layer is overcoated by vacuum evaporation method, sputtering method or CVD method. This protective layer must be thick enough for preventing the damage of the surface or the attenuation of the information electric charge and must be in such thickness that the image electric charge generated on this protective layer can penetrate to the photoconductive layer or electrically conductive layer in each pixel unit.

The support member and the electrode are the same as those used on the first electrostatic information recording medium.

Next, description is given on the electrostatic information recording method.

As shown in FIG. 19, the electrostatic information recording medium is placed face-to-face to the photosensitive member 1 with a gap of about 10 µm. Then, exposure is performed from the direction of photosensitive member. This is the same as the method used for the electrostatic information recording on the first electrostatic information recording medium. In case of the electrostatic information recording medium where photoconductive layer is patterned, total exposure is performed after the electrostatic information recording medium is taken out. In so doing, carriers are generated on photoconductive layer. By the effect of electric field generated by information electric charge, the information electric charge moves the protective layer to photoconductive layer, and the information electric charge is accumulated in pattern-like form on the photoconductive layer. In case of the electrostatic information recording medium where electrically conductive layer is patterned, total exposure is not required, and the information electric charge is accumulated in the patterned conductive layer as described above.

In this electrostatic information recording medium, the information electric charge is accumulated in the patterned photoconductive layer or electrically conductive layer and is sealed by the insulating protective layer. Thus, the information electric charge can be preserved for long period without being discharged whether it be light or dark.

In the following, several examples are described:

EXAMPLE 21

To a mixture solution containing 10 g of methylphenyl silicon resin and 10 g of xylene-butanol solvent (1:1), a hardening agent (metal catalyst) (trade name: CR-15) was added by 1 wt % (0.2 g) and was mixed well. Then, this was coated on a glass substrate, on which aluminum had been vacuum-deposited in thickness of 1000 A, using doctor blade 4-mil. After drying at 150° C. for one hour, a laminated substance of 10 µpm thick was obtained.

Then, Sibley Microposit 1400 was coated in thickness of 1 µm on this insulating layer as photoresist, and it was heated at 90° C. for 20 minutes. Then, using a mask with line width of 1 µm, exposure was performed twice in longitudinal and lateral directions, using ultra-high pressure mercury lamp. Then, it was developed and washed, using Sibley Microposit developer, and a-Se was formed in thickness of 0.5 µm as photoconductive layer by vacuum evaporation method.

Then, development (lift-off) was performed, using Sibley Microposit developer, and island-like pattern of photoconductive layer 1 µm long and 1 µm wide was formed on the insulating layer.

Further, 50% xylene solution of methylphenyl silicon resin was coated on this photoconductive layer by spinner coating method. After drying at 60° C., a protective film of 0.3 µm thick was formed.
(Electrostatic information recording method)

As shown in FIG. 19, the same photosensitive member as the organic photosensitive member used for the electrostatic information recording on the first electrostatic information recording medium was used. This photosensitive member 1 and the electrostatic information recording medium as prepared above were placed with a polyester film 2 of 10 µm thick as a spacer. Then, as shown in FIG. 20(*a*), DC voltage of −700 V was applied between two electrodes with the photosensitive member as negative and the insulating layer as positive. Under voltage application, exposure was performed for one second, using halogen lamp of 1000 luxes from the direction of photosensitive member. Upon completion of the exposure, the voltage was turned off. Then, as shown in FIG. 20(*c*), the electrostatic information recording medium was taken out. By total exposure, the electrostatic latent image was formed.
(Electric charge retaining property)

When the surface potential of the electrostatic information recording medium was measured by surface potentiometer from above the protective film, the surface potential of −100 V was measured, while it was 0 V on the non-exposed portion. When this electrostatic information recording medium was left for 30 days under the condition of 25° C. and 30% humidity, surface potential was 90 V.

EXAMPLE 22

To a mixture solution containing 10 g of methylphenyl silicon resin and 10 g of xylene-butanol (1:1) solvent, a hardening agent (metal catalyst) (Trade name: CR-15)-was added by 1 wt % (0.2 g) and was mixed well. This was coated on a glass substrate, on which aluminum had been vacuum-deposited in thickness of 1000 A, using doctor blade 4-mil. After drying at 150° C. for one hour, a laminated substance of 10 μm thick was obtained.

Then, a-Se was vacuum-deposited in thickness of 0.1 μm on this insulating surface as photoconductive layer, and Sibley Microposit 1400 was coated in thickness of 1 μm by spinner coating method on this photoconductive layer as photoresist.

Next, after pre-baking, exposure was performed twice in longitudinal and lateral directions using ultra-high pressure mercury lamp with a photo-mask having line width of 1 μm, and it was developed by Sibley Microposit developer.

Next, it was inserted between parallel electrodes of RF dry etching device, and dry etching was performed by glow discharge under vacuum condition of $2 \times 10^{-1}$ Torr, using carbon tetrachloride gas as etching gas. Thus, an island-like photoconductive layer pattern of 1 μm long, and 1 μm wide was formed on the insulating layer, and the resist was removed by Sibley Microposit developer.

Further, protective layer was formed on this photoconductive layer by the same procedure as in the Example 21.

When the surface potential was measured, it was 100 V on the exposed portion, and 0 V on non-exposed portion, and it was found that it can be used as (0.1) signal.

EXAMPLE 23

After the insulating layer was laminated on the electrode in the same manner as in the Example 21, aluminum was laminated as conductive layer in thickness of 0.5 μm by vacuum evaporation. Then, a film of 1.0 μm thick was coated on the conductive layer as photoresist, using Microposit 300-27 (Sibley).

Next, using a photomask with line width of 1 μm, exposure was performed twice in longitudinal and lateral directions by ultra-high pressure mercury lamp. After development, etching was performed with phosphate aqueous solution, and an island-like conductive layer pattern of 1 μm long and 1 μm wide was obtained.

Further, by the same procedure as in the Example 21, a protective film was formed on aluminum as in the Example 21, and the electrostatic information recording medium was prepared.

Using this electrostatic information recording medium, exposure under voltage application was performed as in the electrostatic image recording method of the Example 21. After the exposure, the power was turned off. The electrostatic information recording medium was taken out, and the potential was read by surface potentiometer. The surface potential of 100 V was detected on the protective film of 0.3 μm thick. After this electrostatic information recording medium was left for 30 days under the condition of 25° C. and 30% humidity, the surface potential was 88 V.

Next, description is given On the sixth electrostatic information recording medium.

Figure 21:
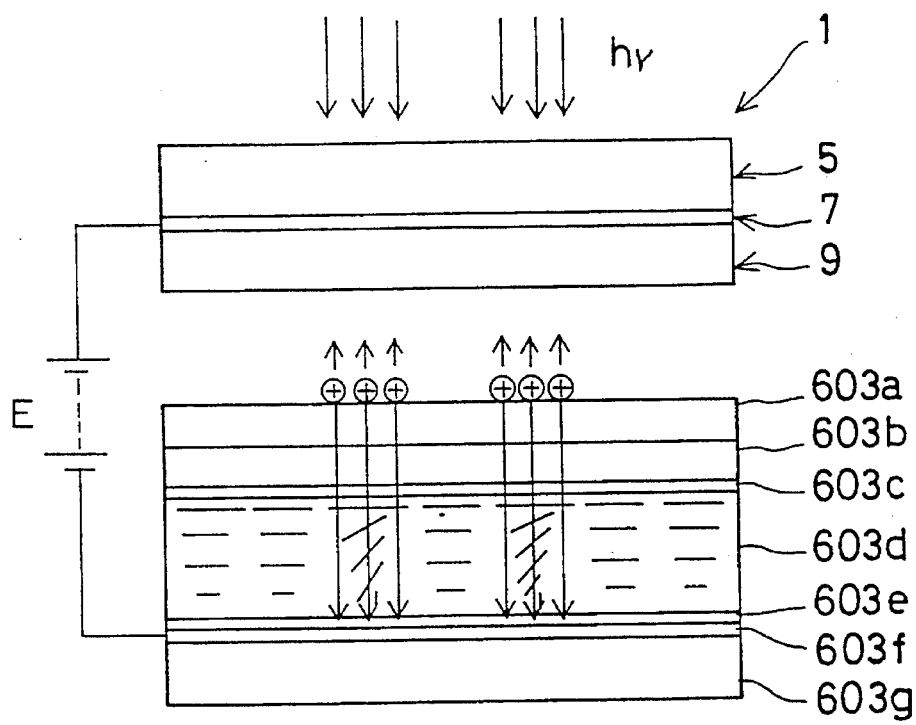
FIG. 21 represents a cross-sectional view of the sixth electrostatic information recording medium and is to explain the electrostatic information recording method.
Figure 22:
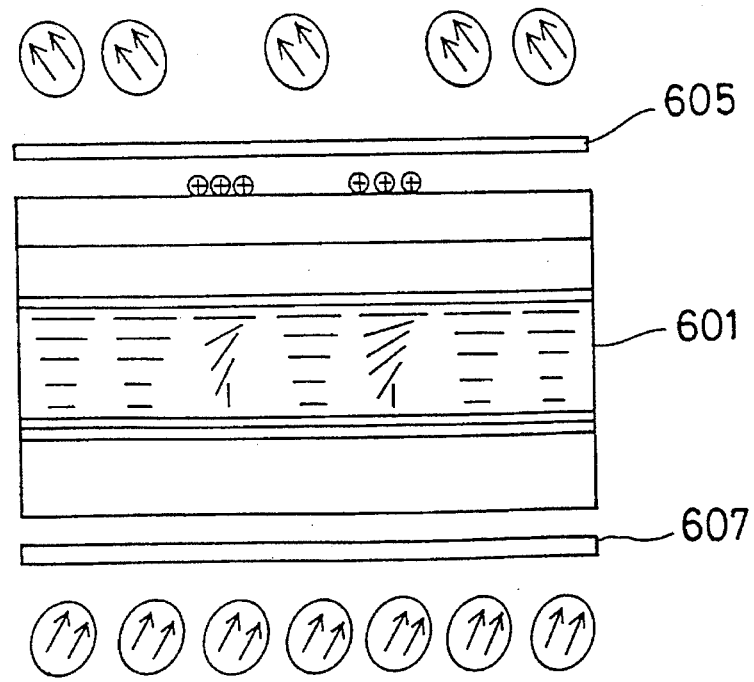
FIG. 22 is to explain the method to reproduce electrostatic information, which has been recorded on the sixth electrostatic information recording medium.

FIG. 21 and FIG. 22 are to explain this electrostatic information recording medium. In the figure, 603a represents an insulating layer, 603b a glass, 603c an orientation layer, 603d a liquid crystal, 603e an orientation layer, 603f an electrode, 603g a glass, and 605 and 607 are polarizing plates.

In FIG. 21, the electrostatic information recording medium was placed face-to-face to the photosensitive member 1 with a gap of about 10 μm. The electrostatic information recording medium consists of a glass plate 603b of 1 mm thick, on which an insulating layer 603a of 10 μm thick is formed. Liquid crystal 603d is sandwiched by the glass 603b and the glass 603g, on which ITO electrode 603f had been vacuum-deposited in thickness of 1000 A. Inside the glass 603b and the electrode 603f, the orientation layers 603c and 603e are formed. Voltage is applied between the electrodes 7 and 603f from the power source E, and light is irradiated from the direction of the photosensitive member 1, and electric charge is accumulated in pattern-like form on the insulating layer 603a.

The orientation layers 603C and 603e are placed in such manner that the directions of the orientation intersect with each other at an angle of 90°. Thus, the molecules of liquid crystal are twisted by 90° between the orientation layers of 603c and 603e. When the light polarized in perpendicular direction to paper surface enters from the direction of the glass 603g to the paper, 90° rotation occurs in the liquid crystal, and light is emitted from the isulating layer 603a as the light polarized in parallel to paper surface.

By the electric charge accumulated on the insulating layer 603a, the electric charge of opposite polarity is induced on the electrode 603f. As the result, electric line of force extends from the accumulated electric charge toward the electrode 603f as shown in the figure. By the effect of this electric field, molecular arrangement of liquid crystal changes on the portion facing to the position where electric charge is accumulated, and the light coming from the direction of the glass 603g is not subject to 90° rotation.

As shown in FIG. 22, polarizing plates 605 and 607 are placed on both sides of the electrostatic information recording medium so that the polarizing directions intersect perpendicularly to each other. Under this condition, the polarizing directions are not subject to 90° rotation on the portion where molecular arrangement is disturbed by the effect of electric charge. Thus, the polarized light passing through the polarizing plate 607 cannot pass through the polarizing plate 605. On the other hand, the light passes through the polarizing plate 605 on the portion where electric charge pattern is not formed and molecular arrangement is not disturbed because of 90° rotation.

Therefore, when viewed from the direction of the polarizing plate 605, the color of the polarizing plate 605 can be seen on the portion where electric charge is formed, and the portion where light passes through is seen as bright portion. As the result, electrostatic pattern can be observed. Not only nematic type, but also smectic type or cholesteric type liquid crystals can be used. And polymer dispersed liquid crystal can be used. In the case of polymer dispersed liquid crystal, it is not necessary to use polarizer.

In the above, it has been described that electric charge is accumulated on the insulating layer, while the presence of electric charge is not necessarily required if liquid crystal has memorizing property. However, if electric charge is not present, the disturbance of molecular arrangement is not continuous. Where electric field strength is higher than a certain level, the disturbance remains unchanged, while disturbance does not remain almost at all where electric field strength is lower than a certain level. Accordingly, the observed image becomes a binary image. In this respect, it is preferable that electric charge remains on the insulating layer in order to read the image as a photographic image.

In case the image is optically read by irradiating light as shown in FIG. 22, it is desirable to furnish a reflection preventive layer. Further, by providing pattern on the electrode 603*f*, AND computation for electrode pattern and exposed pattern can be performed. Specifically, by visually observing the overlapping of the electrode pattern and the exposure pattern, focus deviation can be detected.

In the above examples, description has been given mainly on the light, which passes through electro-optical material layer, whereas reflected light may be used. In such case, there is no need that the electrode 603*f* is transparent, and aluminum electrode may be used.

Further, electro-optical crystal with refractive index varying according to electric field may be used instead of liquid crystal. The phase difference of light due to the change in refractive index can be obtained by comparing incident light as reference signal. Thus, electrostatic pattern can be easily obtained. Not only inorganic crystal such as Li $Nb_2O_3$ or PLZT but also organic crystal can be used.

Next, description is given on the seventh electrostatic information recording medium.

Figure 23A:
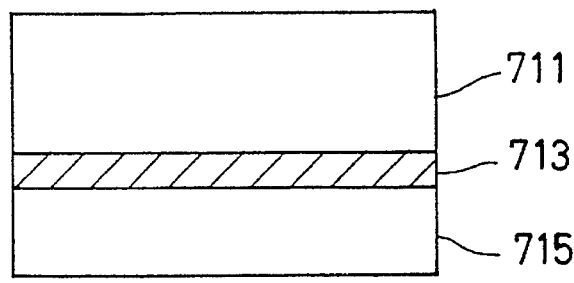
FIG. 23 represents cross-sectional views of the seventh electrostatic information recording medium and is to explain the condition to record on the electrostatic information recording medium.
Figure 23B:
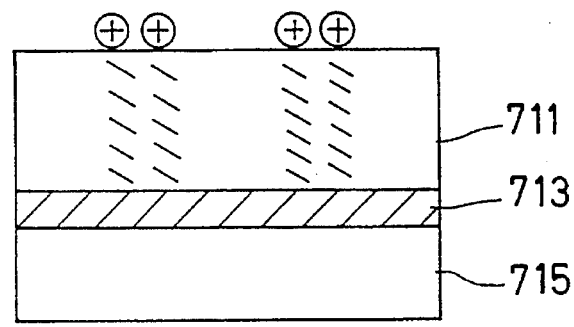
Figure 24:
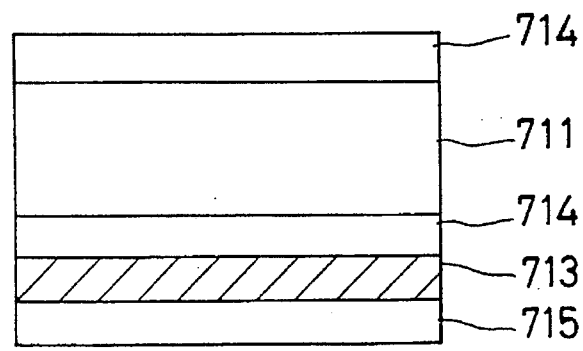
FIG. 24 is a cross-sectional view to show another aspect of the seventh electrostatic information recording medium.

FIG. 23 and FIG. 24 are cross-sectional views of this electrostatic information recording medium. In the figure, 711 is a liquid crystal polymer layer, 713 an electrode, 714 an insulating layer, and 715 a support member.

The seventh electrostatic information recording medium is to record information on a liquid crystal polymer layer.

On the liquid crystal polymer layer 711, thermotropic (heat melting type) liquid crystal is used. When heated, liquid crystal polymer is transferred from solid state to liquid crystal phase and solution phase by phase transition. For example, polyester type has very low viscosity in liquid crystal state and exhibits nematic or smectic liquid crystal phase.

Concretely speaking, the following substances can be used: Polyester type substances such as X7G (trade name; Eastman Kodak), Econol (trade name; Sumitomo Chemical Industry), Xydar (trade name; Dartco Japan Petrochemical Industry Co.), Vectra (trade name; Celanese Polyplastics Co.), Novaculate (trade name; Mitsubishi Kasei), Rodrun (trade name; Unitika, Ltd.), Ultrax (trade name; BASF), Idemitsu LCP (trade name; Idemitsu Kosan Co.), Toso LCP (trade name; Toso, Ltd.), or polyester amide type substances, main chain type liquid crystal polymer of polyazo methine type, side chain type liquid crystal polymer with mesogen group having liquid crystal property in skeleton chain such as polymetacrylate, polyacrylate, polysiloxane, polypeptide, polyphosphagen, polyethylimine, etc. and liquid crystal copolymer. The above liquid crystal polymers can be used by mixing two types of more of the above liquid crystal copolymers or low molecular liquid crystal having liquid crystal property may be mixed in polymer. By coating liquid crystal polymer on electrode substrate, film with thickness of 1– several hundreds μm can be formed.

The above liquid crystal polymer can be directly coated on electrode substrate if it has insulating property in solid state. If it has poor insulating property, liquid crystal polymer can be coated on electrode through an insulating layer as shown in FIG. 24. As the insulating layer 714, the insulating resin in common use as described above is used. The resin must have the heat-resistant property to the temperature higher than liquid crystal range of the liquid crystal polymer and must be able to maintain the information electric charge for a certain period of time within such temperature range.

As such resin, the following substances can be used: For example, fluororesin such as polytetrafluoroethylene, fluorinated ethylene-propylene, tetrafluoroethylene-perfluoroalkylvinylether copolymer, or polyimide resin, polyetheretherketone resin, polyparaxylylene, etc.

The insulating layer can be formed on electrode by vacuum evaporation method or sputtering method or by coating or dipping after dissolving in solvents. Or, the insulating layer may be formed by attaching the above polymer film by adhesive. The film must be thick enough to prevent the penetration of electric charge and is preferably at least 1000 Å or more. The insulating layer is to prevent the injection of the electric charge discharged from the electrode or from the photosensitive member as described later into the liquid crystal polymer phase. By maintaining the electric charge discharged from photosensitive member, it is possible to keep the orientation on the image exposure portion.

If necessary the orientation processing is performed in advance on the surface of the insulating layer by rubbing or using orientation agent. It is desirable to use polyimide film on the insulating layer because heat-resistant property is provided and orientation effect can be increased. This polyimide film may be formed by heat treatment after it is coated using polyamic acid. Film-like insulating layer can be laminated by making the orientation directions intersect at right angle.

The support member 715 is to mechanically support the information recording medium. There is no restriction to its material and thickness as far as it has a certain strength enough to support liquid crystal polymer layer. For example, flexible plastics film, or rigid body such as glass, plastic sheet, etc. are used. It must have light transmitting property and heat-resistant property at the temperature where liquid crystal polymer melts.

On the other side of the support member, it is desirable to laminate a layer with reflection preventive effect if necessary or to adjust the support member in such thickness to give the reflection preventive effect or further to give reflection preventive property by combining these two.

The electrode is formed on the support member and must be transparent or semi-transparent. Also, it must have the heat-resistant property as described above, and there is no restriction on the material as far as specific resistance is $10^6$ Ω·cm or less. Inorganic metal conductive film, inorganic metal oxide conductive film, organic conductive film such as tertiary ammonium salt can be used. Such electrode is formed by the methods such as vacuum evaporation, sputtering, CVD, coating, metalplating, dipping, electrolytic polymerization, etc. It is necessary to change the film thickness according to the electrical characteristics of the electrode materials and the applied voltage during information recording. It is 100–3000 Å, for example, and it is formed on the entire surface between the support member and liquid crystal polymer layer or according to the pattern of liquid crystal polymer layer.

Next, description is given on the information recording method on this electrostatic information recording medium.

FIG. 25 is to explain the information recording method. To the photosensitive member 1, the electrostatic information recording medium is placed face-to-face with a gap of about 10 μm (FIG. 25(*a*)).

Then, voltage is applied between the electrodes 7 and 713 from power source 17 as shown in FIG. 25(*b*), and the exposure is performed under voltage application by the general procedure as described above.

To record the information on the information recording medium consisting of liquid crystal polymer, liquid crystal polymer layer is exposed to light under voltage application by heating to the liquid crystal temperature range as shown in FIG. 25(*b*). To heat the liquid crystal polymer layer, it may be heated by resistance heating in the support member, or only the information recording medium may be heated by external heating means. As schematically given in FIG. 23(b), the orientation of liquid crystal polymer molecules is formed on the exposed portion under voltage application.

The image electric charge is formed by discharging. Because liquid crystal polymer is sensitive to low voltage in some cases, the voltage distribution on liquid crystal polymer layer should be adjusted to fall within the operating voltage range by properly setting the voltage distribution on the photosensitive member, the air gap and the information recording medium.

Figure 25A:
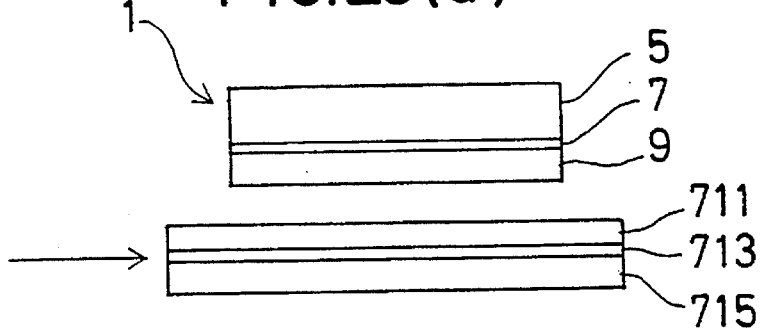
FIG. 25 is to explain the method to record electrostatic information on the seventh electrostatic information recording medium.
Figure 25B:
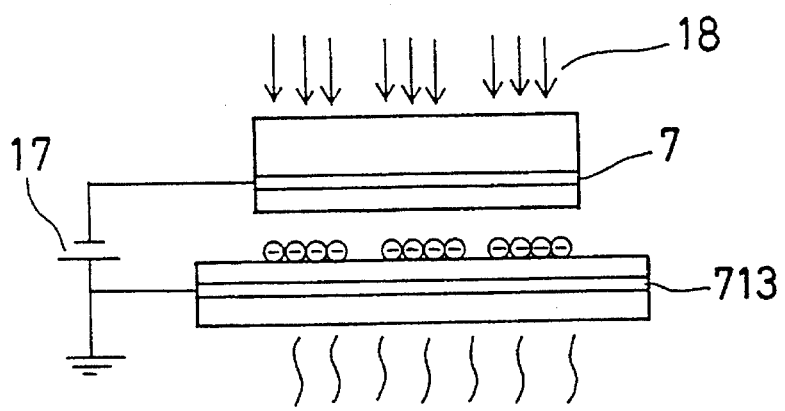
Figure 25C:
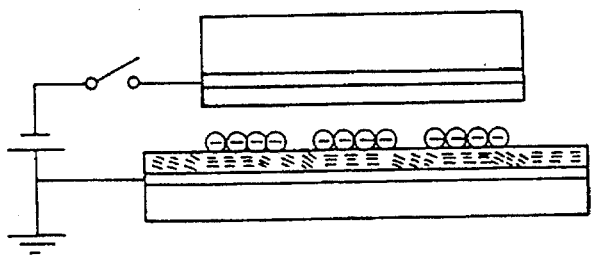
Figure 25D:
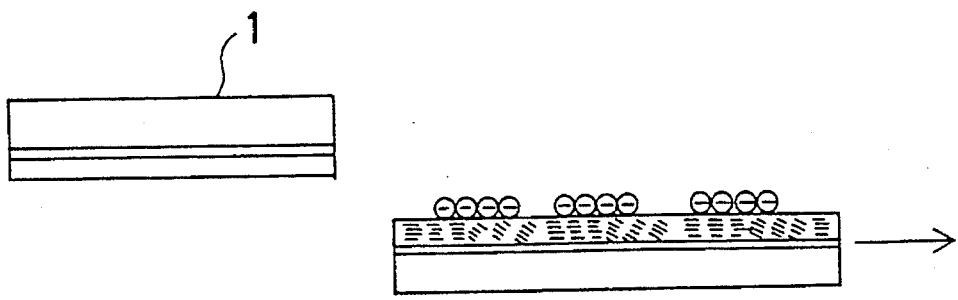

When the imformation has been recorded on liquid crystal polymer layer, power source 17 is turned off, and the electrostatic information recording medium is detached from photosensitive member. By cooling it down as shown in FIG. 25(d), the recording status on liquid crystal polymer can be stabilized.

Figure 25E:
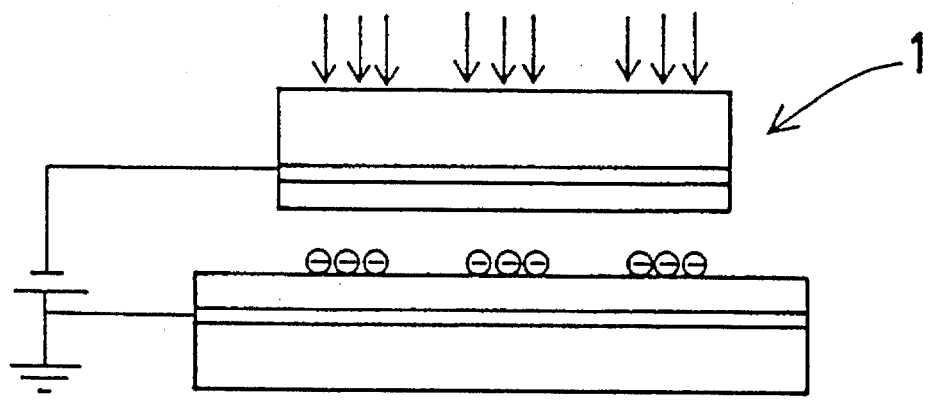
Figure 25F:
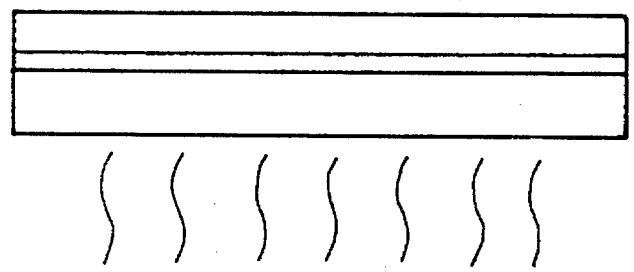

In addition, it is possible to keep liquid crystal in orientation by heating the electrostatic information recording medium as given in FIG. 25(f) after voltage is applied without heating as shown in FIG. 25(e) and after detaching the electrostatic information recording medium from the photosensitive member.

When planar analog recording is performed on this electrostatic information recording medium, the orientation on the level of liquid crystal polymer molecule can be obtained. Thus, the same high resolution as in the silver salt photography can be obtained. Because the exposure pattern is maintained in the orientation of the liquid crystal polymer layer, it can be preserved for long period.

Next, description is given on the method to reproduce the information recorded on this electrostatic information recording medium.

Figure 26:
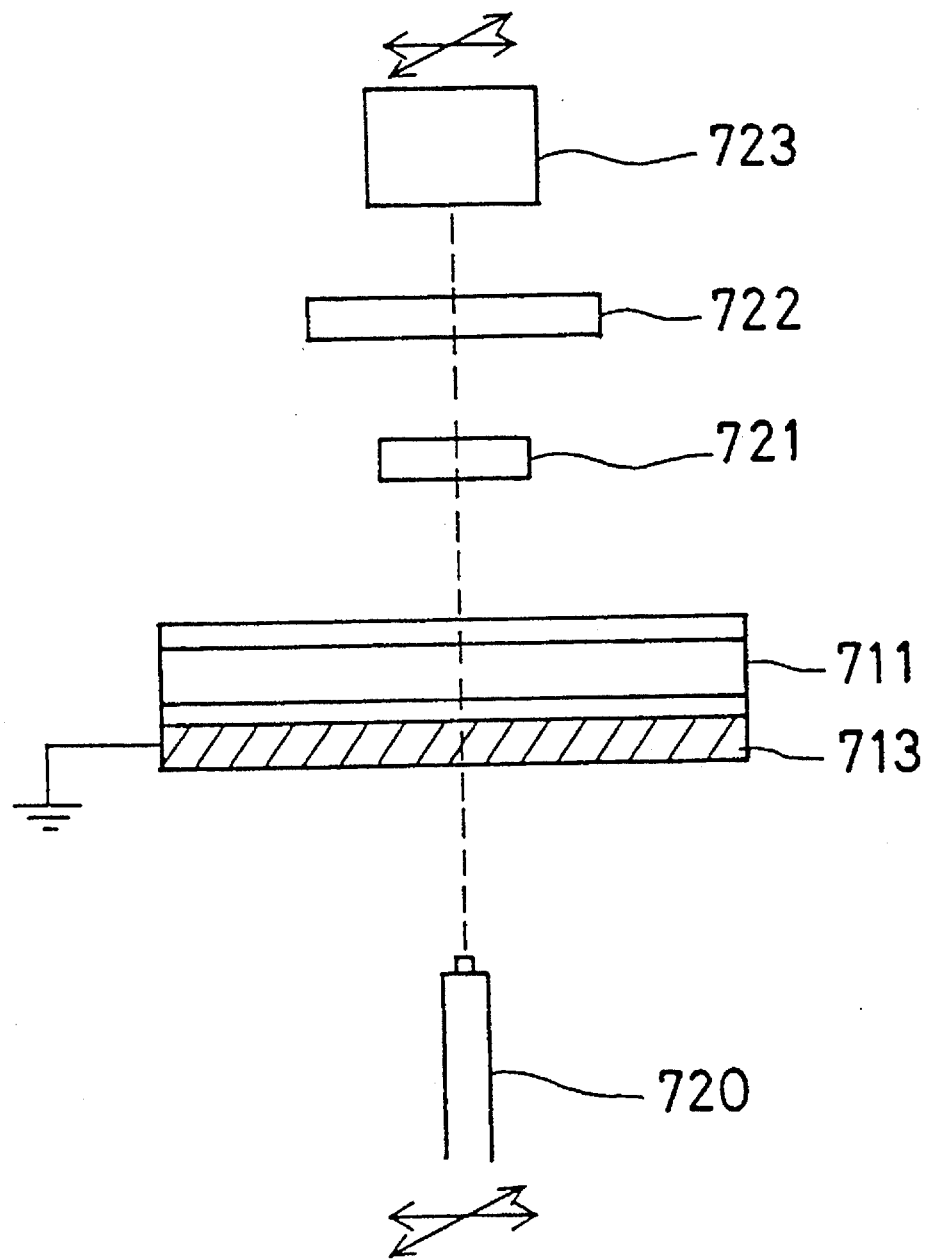
FIG. 26 is to explain the method to reproduce the information recorded on the seventh electrostatic information recording medium.

FIG. 26 shows an example of the information recording and reproducing method. In the figure, 720 is laser, 721 a ¼ wavelength plate, 722 an analyzer, and 723 a photodetector.

To reproduce the information from the information recording medium where the information is recorded, the electrode on the information recording medium should be grounded, and it is scanned by laser beam from laser 720 from lower portion of the information recording medium. With the polarization means consisting of a ¼ wavelength plate 721 and an analyzer 722 placed in the optical path, the polarized laser beam is detected by the photodetector 23, and the information in the orientation of the liquid crystal polymer layer can be reproduced. Or, it can also be reproduced by natural light.

In the following, it is described by examples. In the case of the optical information was recorded by scattering made of the liquid crystal polymer it is not necessary to use polarizer.

EXAMPLE 24

On a glass substrate of 1 mm thick, an electrode of indium tin oxide (ITO) was laminated in thickness of 1000 Å by sputtering method. On this electrode, a liquid crystal polymer (phase transition temperature °C., g36, n108i), having acrylate as main skeleton and mesogen group and containing the repeating unit given by:

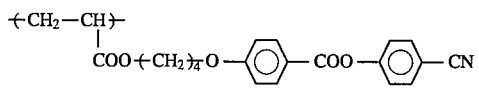

is coated in 30% solution in methylethylketone mixed solvent using a blade coater to have the thickness of 10 μm when dried. Thus, an electrostatic information recording medium was prepared.

EXAMPLE 25

Using the same photosensitive member as the organic photosensitive member used for the electrostatic information recording on the first electrostatic information recording medium, an electrostatic information recording medium prepared in the Example 24 was placed face-to-face with polyester film of 10 μm thick as a spacer, and it was grounded. Then, the information recording medium was placed on a heating plate (not shown) heated at 50° C., and DC voltage of 600 V was applied between both electrodes with the photosensitive member as negative and liquid crystal polymer layer as positive. Under voltage application, exposure was performed for 1 second with halogen lamp of 1000 luxes as light source from the side of photosensitive member, and the information was recorded on the liquid crystal polymer layer.

From the electrostatic information recording medium with the information thus recorded, the exposed pattern on liquid crystal polymer layer could be clearly reproduced, using argon laser 720 as shown in FIG. 26.

Next, description is given on the eighth electrostatic information recording medium.

Figure 27A:
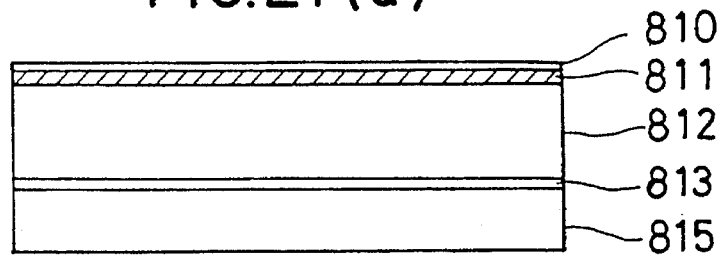
FIG. 27 shows cross-sectional views of the eighth electrostatic information recording medium.
Figure 27B:
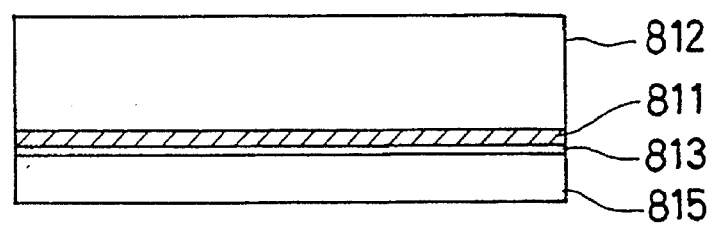

FIGS. 27(a) and (b) are cross-sectional views of the eighth electrostatic information recording medium. In the figure, 810 is an insulating layer, 811 an electrophoretic substance layer or electrochromy layer, 812 a thermoplastic resin layer, 813 an electrode, and 815 a support member.

The thermoplastic resin layer 812 is formed of thermoplastic resin material having specific resistance of $10^{14}$–$10^{18}$ Ω·cm. It is softened at heat development, and the ionized dye and the ionized pigment in the electrophoretic substance layer are diffused in the direction of the electrode by the effect of electric field, which is formed by image electric charge accumulated in the insulating layer 810.

As the thermoplastic resin, the same substances as the insulating layer forming materials described for the first electrostatic information recording medium can be used.

This electrostatic information recording medium is to reproduce the electrostatic information as visual image by transmission light, and the thermoplastic resin layer must be the resin having transparent or semi-transparent property. The thermoplastic resin layer can be formed by dissolving the above thermoplastic resin in solvent and by coating or dipping or by vacuum evaporation or sputtering methods. The thickness of the resin layer is preferably 1 μm or more. From the viewpoint of flexibility, it is preferably 100 μm or less.

As the electrophoretic substances, cation dye with its counter anion belonging to Lewis acid of halogen (such as $Cl^-$, $I^-$, etc.) or halogen compounds (such as $ClO^-$, $ClO_2^-$, $ClO_3^-$, $BF_4^-$, $PF_6^-$, etc.) can be used. The substances of diallylmethane type, triallylmethane type, thiazole type, methine type, xanthene type, oxazine type, thiazine type, azine type, acridine type, or azo type having the entire molecule as cation or anion can be used.

Also metal complex salt dyes (such as core metal, chromium, cobalt, etc.) can be used.

Also, ionic pigment can be used. As the ionic pigments, soluble azo type pigment, for example,

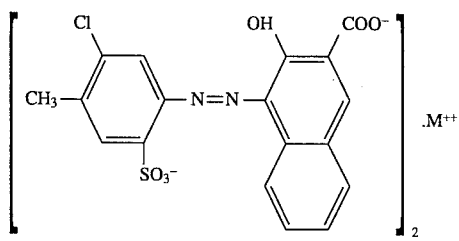

with water-soluble base laked to metal and turned to insoluble can be used, or organic pigment forming metal complex such as phthalocyanine type pigment can be used.

These electrophoretic substance layers can be formed by dissolving the following substances in binder or dispersed in binder and by coating it on the above thermoplastic resin layer: Thermoplastic resin, silicone resin, styrene-butadiene copolymer resin, epoxy resin, acryl resin, unsaturated or saturated polyester resin, polycarbonate resin, polyvinyl alcohol resin, phenol resin, polymethyl-metacrylate resin, melamine resin, polyimide resin, etc. Or, only the electrophoretic substance may be formed on the thermoplastic resin layer by sputtering, vacuum evaporation, etc. The thickness is preferably about 0.1–10 µm.

Instead of electrophoretic substance layer, electrochromy layer 811 may be formed. The electrochromy layer is based on the principle that reversible oxidation and reduction reaction can be induced and color can be developed by the effect of electric field generated by the information electric charge in the insulating layer by turning thermoplastic resin layer to electrically conductive at the heat development. Similarly to the above electrophoretic substance layer, the electrochromy layer can be laminated on the thermoplastic resin layer by coating, vacuum evaporation, etc.

As the materials to form electrochromy layer, the substance to develop color by reduction such as tungsten oxide ($WO_3$), molybdenum oxide ($MoO_3$), vanadium oxide ($V_2O_5$), heptylbiologen, polybiologen complex, tetrathiofluvalene, pasophenanthroline complex can be used. Also, the substances to develop color by oxidation such as iridium oxide ($IrO_x$), rhodium oxide ($RhO_x$), nickel oxide ($NiO_x$), chromium oxide ($CrO_x$), prussian blue complex, ruthenium purple complex, indium nitride (InN), polythiophene (polypyrrole), styryls, or the substances to develop color by oxidation and reduction such as rare earth phthalocyanine, anthraquinone-pyrazoline mixture can be used.

As the insulting layer to be laminated on the electrophoretic substance layer or the electrochromy layer, the insulating resin materials with high glass transfer temperature can be used. For example, fluororesin, polyether-etherketone resin, polyparaxylylene resin, etc. can be used. It is preferable to laminate by film laminating method, coating method, vacuum evaporation method, etc. in thickness of 0.1–10 µm, or more preferably, 1–5 µm.

The support member and the electrode are the same as those used in the first electrostatic information recording medium.

Next, description is given on the method to record the information on this electrostatic information recording medium.

First, the information electric charge is accumulated on the insulating layer of the electrostatic information recording medium. The information electric charge can be accumulated by discharge electrode or by placing it face-to-face to the photosensitive member and by the exposure with voltage applied between two electrodes.

For the information recording by the exposure under voltage application, description is given on the case where cationic dye is used as electrophoretic substance.

The electrostatic information recording medium is formed, for example, as follows: On a support member 815 made of glass of 1 mm thick, an aluminum electrode of 1000 Å is formed by vacuum evaporation, and thermoplastic resin layer is laminated on this electrode in thickness of about 10 µm. Further, cationic dye layer of 1 µm thick and an insulating layer of 1 µm thick are formed.

Figure 28A:
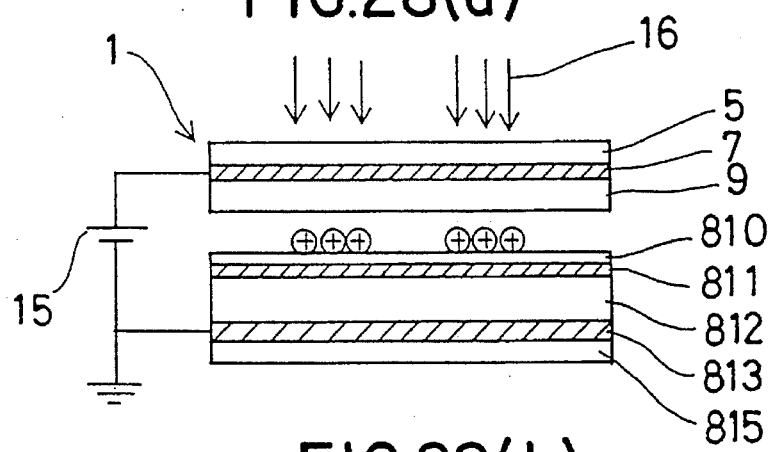
FIG. 28 is to explain the method to record electrostatic information to the eighth electrostatic information recording medium and the recording condition.

As shown in FIG. 28(a), the electrostatic information recording medium is placed face-to-face to the photosensitive member 1 with a gap of about 10 µm, and voltage is applied from the power source 15 between the electrodes 7 and 813. In this case, voltage is applied with the photosensitive member electrode as positive. Information exposure is performed from the photosensitive member, and power is turned off. The electrostatic information recording medium may be detached or may not be detached from the photosensitive member.

Figure 28B:
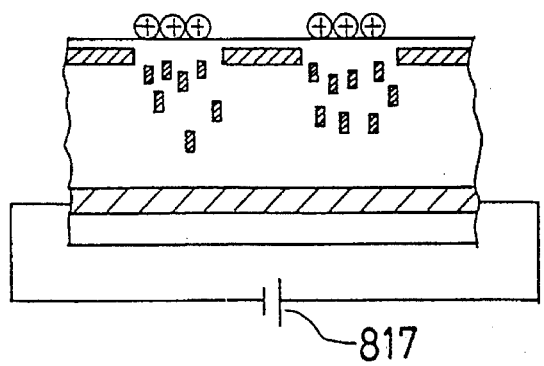

Next, as shown in FIG. 28(b), the electrode 813 is heated by resistance heater 817, or thermoplastic resin layer is heated by another means and is softened. By the effect of electric field generated by information electric charge, electrophoretic substance is diffused toward the electrode substrate. When heating is stopped, resin is hardened again. The diffused particles stay as they are, and information electric charge is converted to the position information.

When the electrostatic information recording medium thus formed is observed under transmission light, light does not transmit at non-diffused electrophoretic substance layer, whereas light transmits at the diffused electrophoretic substance layer, and visible image matching the exposure can be obtained.

In the above, description has been given on the case where electrophoretic substance layer is formed by cationic dye, while the same applies to the case where the other ionic dye or ionic pigment is used. In case electrochromy layer is used instead of electrophoretic substance layer, the same electrostatic information recording method can be used although the diffusion of electrochromy layer does not occur.

When electrostatic information recording is performed in planar analog recording, the same high resolution as in silver salt photographing can be obtained because the information is in the electrostatic unit. The information electric charge is fixed in the resin layer as position information and is preserved for long period. To input the information on the electrostatic information recording medium of this invention, general method as described above can be used.

In the following, some examples are described.

EXAMPLE 26

A solution containing 10 g of rosin ester resin (stebelite ester 10) and 50 g of tetrahydrofuran was coated on a glass substrate on which aluminum had been vacuum-deposited in thickness of 1000 Å, by spinner coating (1000 rpm, 90 sec.). It was left at 60° C. for one hour to dry up the solvent, and uniform film of 5 µm thick was obtained.

On this medium, 10% dichlorethane solution containing crystal violet (Hodogaya Chemical Industry Co.) given by the following formula:

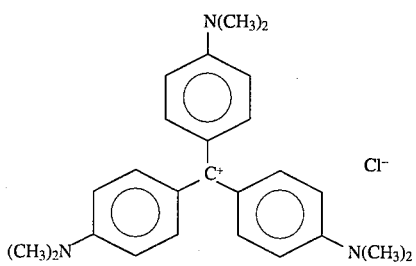

mixed to polyvinylbutyral resin by 1 wt % was coated on the above rosin ester resin layer, and ionized dye layer of 1 μm thick was obtained.

Then, fluororesin (Saitop; Asahi Glass Co.) was coated on the ionized dye layer. After drying, insulating layer of 1.5 μm thick was laminated, and the electrostatic information recording medium was prepared.

(Electrostatic information recording method)
[Preparation example of inorganic photosensitive member]

Using metal granules, in which tellurium (Te) was mixed to selenium (Se) by 13 wt %, a-Se-Te thin film was vacuum-deposited on ITO glass substrate by resistance heating method under vacuum condition of $10^{-5}$ Torr. Film thickness was set to 1 μm. Further, with the vacuum condition maintained, only Se was vacuum-deposited by resistance heating method on a-Se-Te layer to form a-Se layer of 10 μm thick. Thus, a photosensitive member was obtained.

As shown in FIG. 28(a), the above electrostatic information recording medium was placed face-to-face to the above selenium type photosensitive member with polyester film of 10 μm thick as a spacer and was grounded. DC voltage of +700 V was applied between two electrodes with the photosensitive member as positive and the resin layer as negative.

Under voltage application, exposure 16 was performed for one second using halogen lamp of 1000 luxes as light source from the direction of photosensitive member, and surface potential of +350 V was generated on the exposed portion. Upon completion of the exposure, the electrostatic information recording medium was taken out as shown in FIG. 28(b) and was heated at 80° C. by resistance heating. Thus, the ionized dye was moved into the resin.

When transmission light was irradiated on the electrostatic information recording medium thus obtained from the direction of the electrode, visible image was formed according to the density of the ionized dye.

EXAMPLE 27

Instead of the ionized dye of the Example 26, an ionized pigment Watchung Red as given by the following formula:

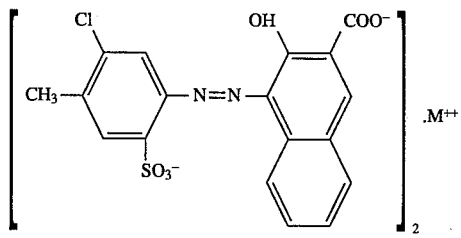

was used, and the electrostatic information recording medium was prepared by the same procedure as in the Example 26.

Then, the polarity of the applied voltage was reversed, and image was formed by the same procedure as in the Example 26, using polyvinylcarbazole-trinitrofluorene organic photosensitive member. On the exposed portion, color has changed from red to orange, and it was confirmed that information electric charge has changed to visible information according to the degree of discoloring.

EXAMPLE 28

Thermoplastic resin layer was coated on electrode substrate in the same manner as in the Example 26, and tungsten oxide was laminated in thickness of 1 μm by EB vacuum evaporation method. Then, fluororesin (Saitop; Asahi Glass Co.) was coated in thickness of 1.5 μm, and electrostic information recording medium was prepared.

When this was observed under transmission light, the electrochromy layer on the exposed portion has changed to blue, showing that the information electric charge has changed to visible information.

Next, description is given on the ninth electrostatic information recording medium.

Figure 29:
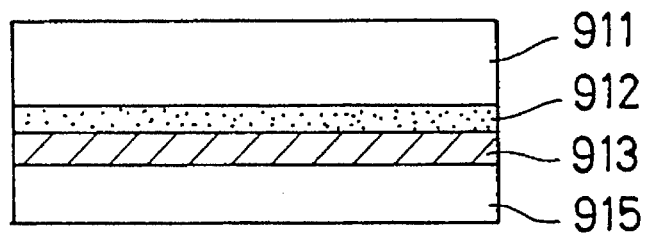
FIG. 29 is a cross-sectional view of the ninth electrostatic information recording medium.

FIG. 29 is a cross-sectional view of the electrostatic information recording medium, and FIG. 30 is to explain the recording method. In the figures, 911 refers to an insulating layer having electric charge transporting property, 912 is a non-destructive electric charge injection preventive layer, 913 an electrode, 914 an electrically conductive portion, 915 a support member, and 916 a heating unit.

The insulating layer 911 having electric charge transporting property functions as an insulating layer when voltage is not applied. When voltage is applied (or when image electric charge is generated) and electric charge enters from electrode, such electric charge can be easily moved. In this invention, it is necessary to provide hole transporting property or electron transporting property according to the polarity of the electric charge during reproduction.

When the electrode is positive, amorphous selenium or organic photosensitive materials having good hole transporting property can be used. For example, hydrazone type, pyrazoline type, PVK type, carbazole type, oxazole type, triazole type, aromatic amine type, amine type, triphenylmethane type, polycyclic aromatic compounds, etc. can be used.

The layer of a-Se can be formed by vacuum evaporation, sputtering method, etc. Amorphous selenium, amorphous tellurium, amorphous arsenic selenium compound (a-$As_2Se_3$), amorphous arsenic selenium compound (a-$As_2Se_3$)+ tellurium, etc. may be laminated in single layer or in multiple layers, or various types of amorphous selenium may be combined and laminated. In case of organic photosensitive material, it is coated by spinner coating method after dissolving in solvent.

When the electrode is negative, zinc oxide, cadmium sulfide, etc. having good electron transporting property can be used. Coating method or CVD method (chemical vapor deposition) can be used. For coating, zinc sulfide granulates (particle size 1–100 μm) is dispersed in binder and is coated on the electric charge generating layer by adding solvent, or organic metal such as diethyl zinc or dimethyl zinc is mixed with oxygen gas under low vacuum condition ($10^{-2}$–1 Torr), and chemical reaction is induced on a substrate heated to 150° C.–400° C. to deposit as zinc oxide film.

When coating method is adopted, it is preferable to add silicone resin, styrene-butadiene copolymer resin, epoxy resin, acryl resin, saturated or unsaturated polyester resin, polycarbonate resin, polyvinyl acetal resin, phenol resin, polymethyl-metacrylate (PMMA) resin, melamine resin, polyimide resin, etc. as binder by 0.1–10 parts to one part of the electric charge transport material for the better attachment. The thickness is preferably 10–50 μm.

In this electrostatic information recording medium, the type of the electrode and the combination of the insulating layer having electric charge transport property are important, and the present inventor has found that the injection property of electric charge differs according to the type of electrode. For example, when polyvinylcarbazole is used as insulating layer material, electric charge is not injected very much into aluminum electrode, while it is easily injected into electrode if ITO electrode is used. In the present invention, it is necessary to select the combination for easier injection of electric charge when voltage is applied.

For the electrode, it is better to select the material for easier injection of electric charge into the insulating layer having electric charge transport property. For example, in case organic photoconductive material such as polyvinylcarbazole is used as insulating layer with electric charge transport property, inorganic metal oxide, e.g. indium-tin oxide (ITO) may be used as the electrode.

In this electrostatic information recording medium, non-destructible electric charge injection preventive layer 912 is furnished between the electrode 913 and the insulating layer 911 having electric charge transport property.

The destructible electric charge injection preventive layer is furnished to prevent the moving of electric charge from the electrode to the insulating layer with electric charge transport property when voltage is applied. This electric charge injection preventive layer is divided into two types: Insulating layer having such thickness that electric charge is not moved and the layer, which utilizes rectifying effect. In this electrostatic information recording medium, the layer has such function that the insulating layer and the electrode are made electrically continuous on this portion by the information writing means such as laser irradiation, or heating by thermal head.

As the materials for this electric charge injection preventive layer, inorganic insulating materials and organic insulating materials can be used.

As the inorganic insulating materials, $TeO_x$ is formed into the thickness of 0.1–10 μm by glow discharge, vacuum evaporation, sputtering, etc. When heated and molten by laser irradiation, these compounds with low melting point can be turned to electrically conductive according to the degree of crystallization, and continuous conductivity can be obtained according to the degree of laser irradiation.

As the other inorganic insulating materials, the following materials are formed in thickness of 0.01–1 μm by glow discharge, vacuum evaporation, sputtering, CVD method, etc.: $As_2O_3$, $B_2O_3$, $Bi_2O_3$, CdS, CaO, $CeO_2$, $Cr_2O_3$, CoO, $GeO_2$, $HfO_2$, $Fe_2O_3$, $La_2O_3$, MgO, $MnO_2$, $Nd_2O_3$, $Nb_2O_5$, PbO, $Sb_2O_3$, $SiO_2$, $SeO_2$, $Ta_2O_5$, $TiO_2$, $WO_3$, $V_2O_5$, $Y_2O_5$, $Y_2O_3$, $ZrO_2$, $BaTiO_3$, $Al_2O_3$, $Bi_2TiO_5$, CaO—SrO, CaO—$Y_2O_3$, Cr—SiO, $LiTaO_3$, $PbTiO_3$, $PbZrO_3$, $ZrO_2$—Co, $ZrO_2$—$SiO_2$, AlN, BN, NbN, $Si_3N_4$, TaN, TiN, VN, ZrN, SiC, TiC, WC, $Al_4C_3$, $SiN_4$—$Al_2O_3$ For example, cracking occurs when $SiO_2$ is heated by thermal head, and the cracked portion can be turned to electrically conductive by making the insulating layer with electric charge transport property electrically continuous with the electrode. Thus, it is possible to perform (0.1) recording.

As the organic insulating materials, there are polypropylene, polyethylene, vinyl chloride, vinylidene chloride, polyester, polyamide, degenerated PVA, acrylpolycarbonate, and silicon resin. As the film-like materials, there are heat-shrinking type film such as polystyrene, polybutadiene, PET, polypropyrene, polyethylene, vinyl chloride, polyamide, degenerated PVA, acryl, straight-chain low molecular weight polyethylene film, etc. The material is coated by spinner coating together with solvent. In case of the film-like material, it is coated on electrode by adhesive or sticking agents. When heated by thermal head, the heated portion is shrinked and makes the insulating layer with electric charge transport property electrically continuous with the electrode.

This layer must have the thickness of 1000 A or more to prevent the injection of electric charge.

The electric charge transport layer with electric charge transport property having polarity opposite to the polarity of the electrode substrate may be furnished by utilizing rectifying effect. Similarly to the above insulating material, the material to cause electric continuity by heating can be used.

This electric charge injection preventive layer is formed from inorganic insulating layer, organic insulating layer or organic-inorganic composite insulating layer, and the film thickness is about 0.1–10 μm. Concretely speaking, in case the electrode is negative, amorphous silicon insulating layer doped with B, Al, Ga, In, etc., amorphous selenium, or organic insulating layer formed by dispersing the following substances can be used: oxadiazole, pyrazoline, polyvinylcarbazole, stilbene, anthracene, naphthalene, tridiphenyl-methane, triphenyl-methane, azine, amine, aromatic amine, etc. In case the electrode is positive, amorphous silicon insulating layer doped with P, N, As, Sb, Bi, etc., ZnO insulating layer, etc. are formed by glow discharge, vacuum evaporation, sputtering, CVD, coating, etc.

In case one side or both sides of the electric charge injection preventive layer is made of organic material, if a layer to generate heat by light absorption from LED, laser beam, etc. is furnished, optical writing can be performed by such light source. For example, by dissolving dye, pigment, etc. in solvent and by dispersing them, and further, by coating it with binder when necessary, the above electric charge injection preventive layer can be easily destroyed. As such dye or pigment, there are direct dye, acidic dye, basic dye, metal complex salt dye, butt dye, sulfide dye, naphthol dye, dispersion dye, reaction dye, fluorescent whitening dye, oxide dye, etc. or pigments such as inorganic pigment, phthalocyanine type organic pigment, dyeing pigment, soluble azo type pigment, insoluble azo type pigment, polyazo type pigment, butt type pigment, fluorescent pigment, etc.

The support member 915 mechanically supports the insulating layer with electric charge transport property, while it is not required in case the insulating layer 911 is of film-like type. In this case, the above electrode can be formed on one side of film through electric charge injection preventive layer.

Next, description is given on the information recording method.

First, the information recording method using photosensitive member is described in connection with FIG. 30. In this figure, 911 is an insulating layer having light carrier generating property and carrier transport property, and 17 a power source.

Figure 30A:
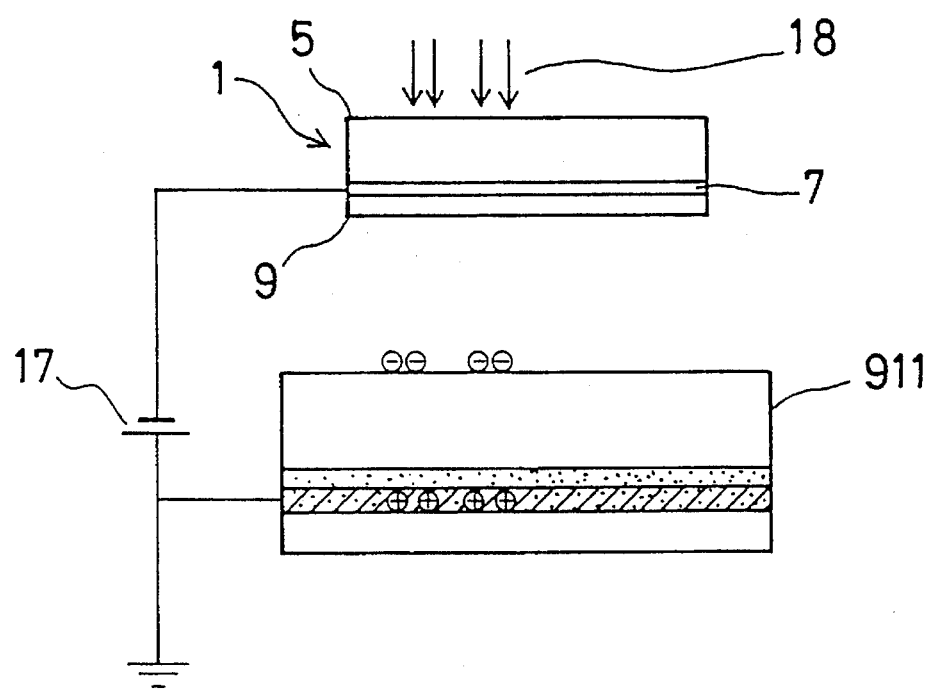
FIG. 30 is to explain the method to record electrostatic information on the ninth electrostatic information recording medium.

As shown in FIG. 30(a), the above electrostatic information recording medium is placed face-to-face to the photosensitive member 1 with a gap of about 10 μm, and the image electric charge is accumulated on the electrostatic information recording medium by general method as described above.

Figure 30B:
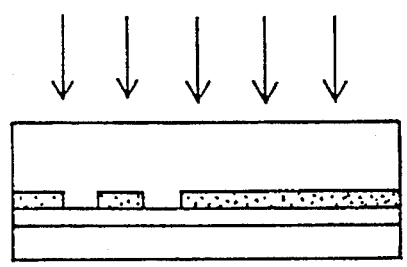

Next, as shown in FIG. 30(b), the medium is taken out, and total exposure is performed with the wavelength corresponding to the electrostatic information recording medium. Then, light carrier is generated on the portion where image electric charge is present. Light carrier having the same polarity as the image electric charge is pulled toward the electrode of the electrostatic information recording medium and it is moved to the interface of the electric charge injection preventive layer. When high voltage is applied between the electrode during information recording, high electric field is generated between the image electric charge and the electric charge on the electrode. (If surface potential is 1000 V, electric field strength is $10^7$ V/cm.) On the portion where image electric charge is present, discharge destruction occurs on the electric charge injection preventive layer, and the insulating layer with electric charge transport property is electrically communicated with the electrode. In this case, the material to form the electric charge injection preventive layer has preferably such thickness that the electric charge does not move (1000 A or more).

On this electrostatic information recording medium, the information can be recorded by the method other than the exposure under voltage application as described above.

Figure 31A:
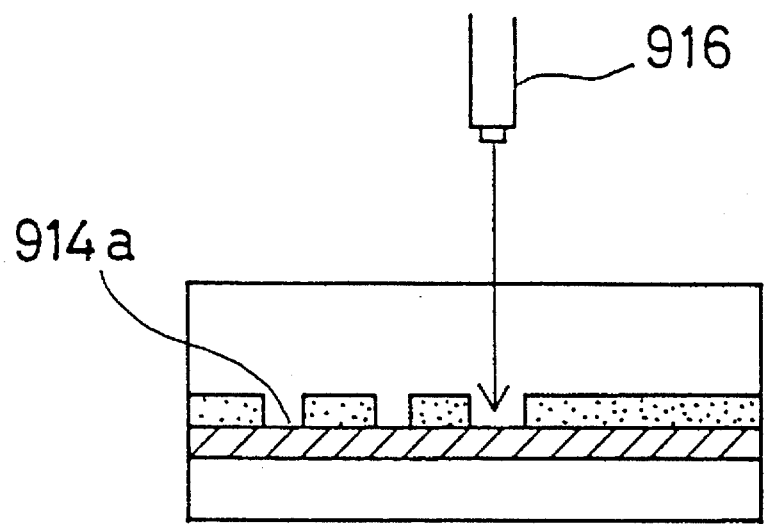
FIG. 31 is to explain another method to record information on the ninth electrostatic information recording medium.
Figure 31B:
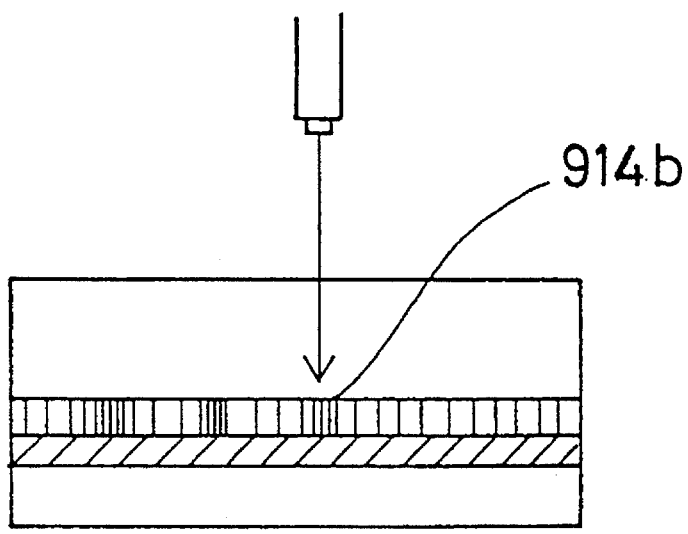

FIG. 31(a) shows the conditions where the electric charge injection preventive layer is cracked or destroyed by shrinking, and FIG. 31(b) represents the condition where the electric charge injection preventive layer is destroyed when it is turned to electrically conductive by crystallization effect. In the figures, 914a is the portion lacking the electric charge injection preventive layer, 914b a portion where the electric charge injection preventive layer is crystallized, and 916 a heating means.

First, in the information recording method as given in FIG. 31(a), the information is thermally inputted to the electric charge injection preventive layer by heating means 916 such as thermal head, laser beam, etc. from upper or lower portion of the electrostatic information recording medium. Thus, the electric charge injection preventive layer is shrinked or cracked to make the insulating layer with electric charge transport property electrically continuous with the insulating layer. As the result, the electrically continuous portion corresponding to the information can be formed, and the information can be recorded in the form of (0.1) signals.

FIG. 31(b) shows the case where the electric charge injection preventive layer is formed using low melting compound such as tellurium oxide. In this case, when the information is applied by heating of the heating means 916, the electric charge injection preventive layer is molten on that portion and is crystallized when cooled down. Analog recording of the information is performed according to the principle that it is turned to electrically conductive due to the degree of crystallization.

In case light-absorbing heat-generating substance such as dye, pigment, etc. is present near or in the electric charge injection preventive layer, optical recording by laser can be performed. As light source, argon laser (514. 488 nm), helium-neon laser (633 nm), or semiconductor laser (780 nm, 810 nm, etc.) can be used. Laser exposure corresponding to image signal, character signal, code signal, line drawing signal is performed by scanning from above or below of the electrostatic information recording medium. The analog recording such as image recording is performed by modulating the luminous intensity of laser, while digital recording such as character, code, line drawing, etc. is performed by ON-OFF control of laser beam. When image is formed by dots, it is formed by dot generator ON-OFF control of laser beam.

Next, description is given on the method to reproduce the recorded information.

FIG. 32 shows cross-sectional views of the electrostatic information recording medium where the information is recorded.

Figure 32A:
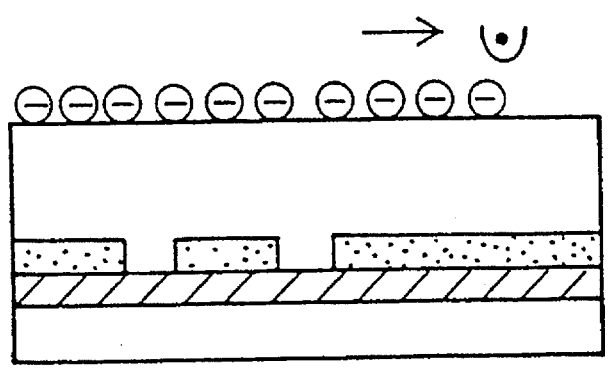
FIG. 32 is to explain an example of the method to reproduce the information recorded on the ninth electrostatic information recording medium.
Figure 32B:
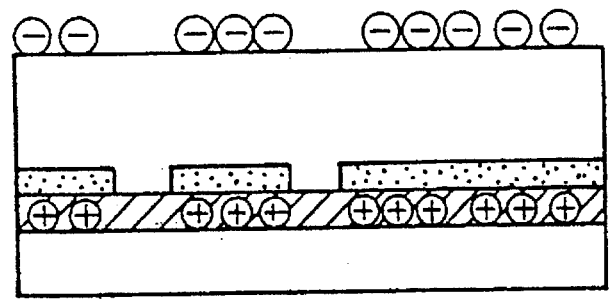

To reproduce the information from this electrostatic information recording medium, total charging is performed on upper surface of the insulating layer of the electrostatic information recording medium as shown in FIG. 32(a) by corona charge or by applying voltage from the opposing electrodes. As shown in FIG. 32(b), the electrode and the electric charge transport layer are electrically continuous on the portion, which lacks the electric charge injection preventive layer, and electric charge moves from the electrode. The electric charge on the insulating layer with electric charge transport property is neutralized, and electric charge remains on the portion without patterning. This electric charge is developed by toner and can be used for electrostatic printing. Or, the information in positive state can be reproduced.

In the following, several examples are described.

EXAMPLE 29

On a glass substrate (1 mm thick), where $In_2O_3$—$SnO_2$ is sputtered in thickness of about 1000 A, $SiO_2$ was formed in thickness of 0.2 μm as electric charge injection preventive layer by the sputtering method.

Then, on this electric charge injection preventive layer, 1% tetrahydrofuran solution of crystal violet (Junsei Chemical Co.) was coated by spinner coating (1000 rpm, 30 sec.) in thickness of 0.05 μm.

Next, on the laser beam absorption layer thus formed, mixture solution containing 10 g of poly-N-vinylcarbazole (Anan Koryo Co., Ltd.), 10 g of 2,4,7-trinitrofluorenone, 2 g of polyester resin (binder; Byron 200; Toyobo), and 90 g of tetrahydrofuran (THF) prepared in dark place was coated using doctor blade. After drying at 60° C. for one hour in the air, the electrostatic information recording medium having the insulating layer with electric charge transport property of about 10 μm thick was obtained.

EXAMPLE 30

On a PET film substrate (100 μm thick) where $In_2O_3SnO_2$ was sputtered in thickness of about 1000 A, biaxial stretching ethylene film was laminated on the electrode using adhesive.

Next, on this electric charge injection preventive layer, mixture solution containing 10 g of poly-N-vinylcarbazole (Anan Koryo Co., Ltd.), 10 g of 2,4,7-trinitrofluorenone, 2 g of polyester resin (binder; Byron 200; Toyoho), and 90 g of tetrahydrofuran, prepared in dark place was coated by doctor blade. After drying at 60° C. for about one hour in the air, the electrostatic information recording medium having insulating layer with electric charge transport property of about 10 μm thick was obtained.

EXAMPLE 31

On a glass substrate (1 mm thick), where $In_2O_3$—$SnO_2$ was sputtered in thickness of about 1000 A, tellurium oxide was formed as the electric charge injection preventive layer by sputtering Te under oxygen atmosphere in thickness of 1 μm.

Next, on this electric charge injection preventive layer, a mixture solution containing 10 of poly-N-vinylcarbazole (Anan Koryo Co., Ltd.), 10 g of 2,4,7-trinitrofluorenone, 2 g of polyester resin (binder; Byron 200; Toyobo), and 90 g of tetrahydrofuran was prepared in dark place and was coated by doctor blade. After drying at 60° C. for about one hour in the air, the electrostatic information recording medium having insulating layer with electric charge transport property of about 10 µm thick was obtained.

EXAMPLE 32

As shown in FIG. 31(a), the pattern scanning exposure was performed by He—Ne laser (633 nm) of 15 mW, spot diameter of 5 µm φ and 10 ms from the upper surface of the electrostatic information recording medium as prepared in the Example 29. After the irradiation, corona charge was performed on the surface of the electrostatic information recording medium with −6 kV. As the result, surface potential was 0 V on the exposed portion and −450 V on the non-exposed portion. By wet toner (Ricoh BS toner), toner development was performed.

Toner could not be attached on the portion, on which He—Ne laser was irradiated, and clear (0.1) printing could be performed.

EXAMPLE 33

As shown in FIG. 30(a), the same photosensitive member as the organic photosensitive member used on the electrostatic information recording on the first electrostatic information recording medium was used. This organic photosentsitive member was placed face-to-face to the electrostatic information recording medium as prepared in the Example 31 with a polyester film of 10 µm thick as a spacer, and DC voltage of −700 V was applied between two electrodes with photosensitive member as negative and the insulating layer electrode as positive. Under voltage application, pattern exposure was performed for one second using halogen lamp of 1000 luxes as light source from the direction of the photosensitive member. Upon completion of the exposure, voltage was turned off.

Next, the electrostatic information recording medium was taken out, and white light of 10 luxes was irradiated on the entire surface for 10 second. Then, corona charge (−6 kV) was performed in dark place. When surface potential was measured it was 0 V on the pattern exposed portion and −300 V on the non-exposed portion. When reproduced on CRT, pattern image was reproduced.

Next, description is given on the electrostatic information recording method by electro-optical reading of the electrostatic pattern of this invention.

The electrostatic pattern on the electrostatic information recording medium is characterized by very high resolution, whereas it is extremely difficult to read this at high accuracy. For example, the potential reading method depends much upon scanning density of the reading head, and the reading with high resolution is not achievable.

Figure 33:
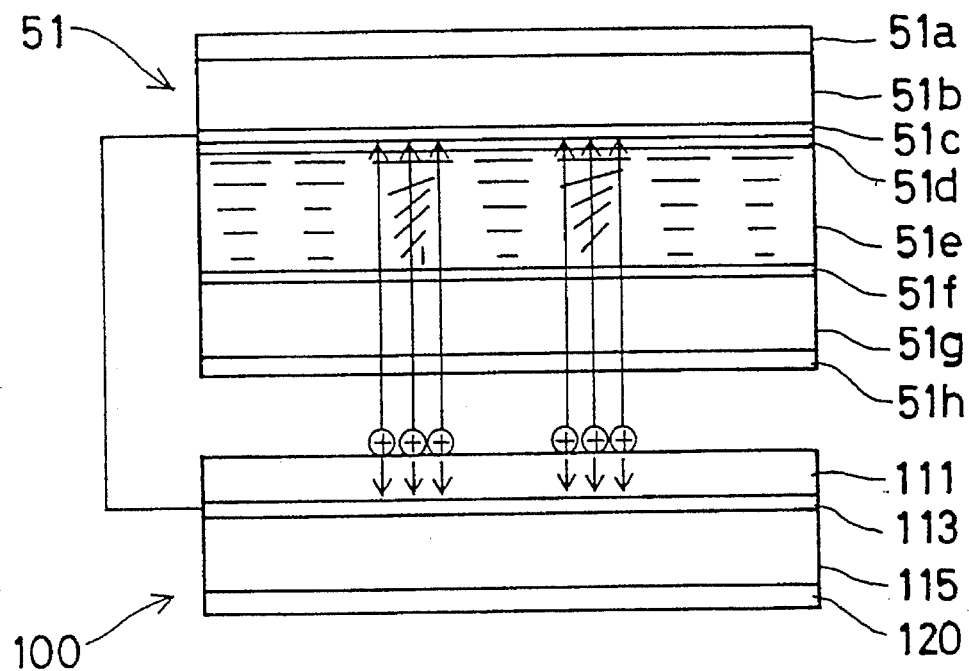
FIG. 33 and FIG. 34 are to explain the electro-optical method to read electrostatic pattern recorded on the electrostatic information recording medium.
Figure 34:
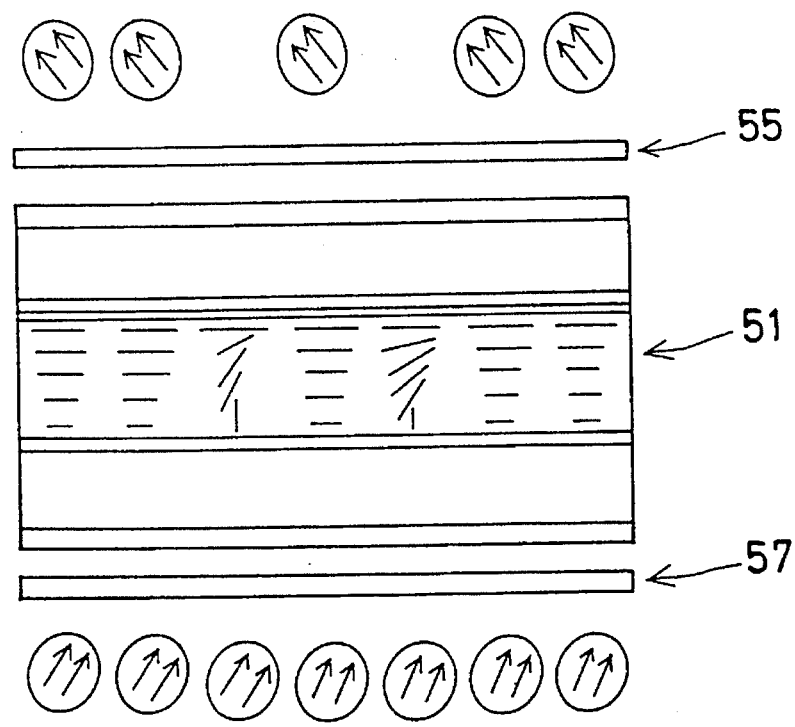

FIG. 33 and FIG. 34 are to explain the electro-optical reading method of the electrostatic pattern of the present invention. In the figures, 51 is an electrostatic pattern reading unit, 51a and 51h are reflection preventive layers, 51b and 51g are glasses, 51c is a transparent electrode, 51d and 51f are orientation layers, 51e liquid crystal, 100 an electrostatic information recording medium, 111 an insulating layer, 113 an electrode, 115 a glass support member, 120 a reflection preventive layer, and 55 and 57 are polarizing plates.

In FIG. 33, the electrostatic information recording medium 100 consists of a transparent glass support member 115, on which a transparent electrode 113 and an insulating layer 111 are laminated, and on the backside of which a reflection preventive layer 120 is formed. On the insulating layer 111, electric charge is accumulated in pattern-like form by the exposure under voltage application as described above.

The electrostatic pattern reading unit 51 placed face-to-face to this has such structure that a liquid crystal 51e is sandwiched by orientation layers 51d and 51f and by glasses 51b and 51g and that reflection preventive layers 51a and 51h are provided on the surface of the glasses. Further, a transparent electrode 51c is furnished between the glass 51b and the orientation layer 51d and it is to be short-circuited with the electrode 113 of the electrostatic information recording medium, on which electrostatic pattern is formed. The orientation layers 51d and 51f are placed in such manner that the directions of the orientations intersect with each other at right angle. Therefore, the molecules of liquid crystal are twisted by 90 degrees between the orientation layers of 51d and 51f. When the light polarized in vertical direction enters the paper surface from the direction of the reflection preventive layer 51h, 90° rotation occurs in the liquid crystal, and the light goes out of the reflection preventive layer 51a as the light polarized in parallel to paper surface.

According to the prevent invention, a reflection preventive layer 120 is provided on the backside of the electrostatic information recording medium 100, and light is irradiated from the direction of the electrostatic information recording medium so that electro-optical reading can be performed with the electrostatic information recording medium and electro-optical element at the positions close to each other.

By the electric charge accumulated on the insulating layer 111, electric charge of opposite polarity is induced on the electrode 113, and the electric charge with the polarity opposite to the surface electric charge is also induced on the electrode 51c of the reading unit, connected to the above electrode and with the same potential. As the result, electric line of force extends from the accumulated electric charge to the electrode 51c as shown in the figure, and molecular arrangement of liquid crystal on the portion facing to the position where electric charge is accumulated is changed by the effect of electric field. Thus, the light entering from the reflection preventive layer 51h is not subject to 90° rotation.

If it is supposed that the liquid crystal 51e has memory property, electrostatic pattern is preserved as the disturbance of liquid crystal even when it is separated from the electrostatic information recording medium.

As shown in FIG. 34, polarizing plates 55 and 57 are placed on both sides of the electrostatic pattern reading unit 51 so that the polarizing directions intersect with each other at right angle. Under this condition, the polarizing direction is not rotated by 90 degrees on the portion where molecular arrangement is disturbed by the effect of electric charge. Thus, the polarized light passing through the polarizing plate 57 cannot pass through the polarizing plate 55. On the other hand, on the portion where electric charge pattern is not formed and molecular arrangement is not disturbed, 90° rotation occurs, and light passes through the polarizing plate 55. Therefore, when viewed from the polarizing plate 55, the portion where electric charge is formed is seen as dark, and the portion where light passes is seen as bright. As the result, the electrostatic pattern can be observed. Although it is provided with memory property, when the reading unit is separated from the electrostatic information recording medium and the effect of electric field to liquid crystal is removed, the disturbance of molecular arrangement ceases to be continuous. When electric field strength is higher than a certain level, the disturbance remains as it is, while it does not remain almost at all at the portion where electric field strength is lower than a certain level. Thus, the image observed is binary image. Accordingly, to read it as a photograph-like image, it is necessary to place it face-to-face to the electrostatic information recording medium and to read it with the electrodes short-circuited with each other. For this purpose, the electrostatic information recording medium 100 must be transparent and reflection preventive layer 120 must be furnished on its backside.

In the above examples, description has been given mainly on the light which passes through electro-optical element of the reading unit, whereas reflected light may be used. In such case, the electrode 51c needs not be transparent and it may be aluminum electrode. Also, the reflection preventive layer 51a can be omitted.

Instead of liquid crystal, electro-optical effect material, in which refractive index changes according to electric field, may be used. The phase difference of light due to the change of refractive index can be obtained by comparing the incident light as reference signal. Thus, electrostatic pattern can be easily obtained.

As described above, the electrostatic pattern with high resolution formed on the electrostatic information recording medium can be converted to the optical change of the electro-optical element. By optically reading this change of optical property, it is possible to read it on molecular level at high accuracy.

INDUSTRIAL APPLICABILITY

When information is recorded in electrostatic pattern on an electrostatic information recording medium, the information memory capacity is, for example, 175 lines/in. 2R (4 pixels/dot), i.e. 350 pixels/in=14 dots/mm. Under the condition of A4 size, it is 297 mm×14 dots/in×210 mm×14 dots/in×4 colors. Accordingly, it is 50 MB in information quantity of printed matters of A4 size. If it is supposed that the information quantity per $mm^2$ of the electrostatic information recording medium of this invention is such that the pixels of 1 μm×1 μm can be drawn and read and that one pixel has 256 gradations (information quantity of one pixel= 1B) (analog recording), information density of 1 $MB/mm^2$ can be obtained by 1000 pixels×1000 pixels. Thus, in the electrostatic information recording medium per $mm^2$, the information can be accommodated, which corresponds to a color printed matter of A3 size having 175 lines. Compared with the information density of conventional type unit such as $3\times10^3$ $bit/cm^2$ of 8-inch 1MB floppy disk, $10^6$ $bit/cm^2$ of high density floppy disk, $7.5\times10^6$ $bit/cm^2$ of digital audio tape (DAT), and $2\times10^8$ $bit/cm^2$ of opto-magnetic disk, the information density of the electrostatic information recording medium of this invention is $8\times10^8$ $bit/cm^2$.

Also, the electrostatic information recording medium of the present invention can be laminated on card material such as prepaid card, credit card, etc. and can be used as electrostatic information recording card. In this case, the surface of the electric charge carrying layer is exposed and is embedded in card material, or it is attached and laminated on card material.

To laminate on card material, it may be laminated regardless of whether information is recorded or not on the medium. Also, the recording form of the information may be electric charge or toner through toner development. To record the information after it is made in card form, the electrode of the electrostatic information recording medium is partially exposed from adequate point to connect it to the photosensitive member electrode. This makes it possible to record the information not only in case the recorded information is turned to the form of a card, but also in case where electrostatic electric charge recording medium with no recorded information is turned to the form of a card and information can be recorded when it is used. In such case, protective film may be laminated on the electric charge carrying layer or it maybe detachable, or the protective film may be thin film so that information can be recorded from above the protective film. Particularly, when digital information such as (0.1) information is recorded by scanning through beam irradiation, the recorded electric charge can be preserved as it is or through toner development. Also, it is possible to display on CRT or to print on printer by potential reading means and by reproduction means. Also, it is possible to utilize the reading means, which is used on optical card.

When the information is recorded in electrostatic pattern, it is not visible. Thus, it is possible to use a means to prevent the falsification of cards. Or, the memory capacity is high and information can be recorded on a plane by plane exposure and information can be processed on plane. It is also possible to input or output electric signals or to input the image data on plane, and the types of the data include analog, digital, image, sound and (0.1) information recording. Also, it can be used as external memory of computer. The recorded information can be easily erased.

When sound information is to be recorded at the same time, a part of the information recording area on the electrostatic information recording medium is allocated to the sound information recording area. In the electrostatic information recording method, sound can be converted to optical information and recorded. This sound information recording area is allocated on peripheral portion of the electrostatic information recording medium.. In this case, the electrostatic information recording medium comprises the information recording area for characters, line drawing, image, code, and (1.0) information and sound information recording area.

In addition to the application as electrostatic recording card, the electrostatic information recording medium of this invention can be used as various types of magnetic card and IC card, optical card of ROM type, DRAW type and EDRAW type optical card or marking card by converting the information input means and using this medium as a master. Also, it is possible to use by replacing the recording areas.

In this respect, this medium can be used as ID card, prepaid card, credit card, desktop electronic calculator, electronic notebook, camera, medical record card, timetable, map, electronic lock (key), mini-book, visiting card, sensor, dust remover, battery, bar code, orchestral background music for amateur singers, message (communication means such as postcard), phonograph, game, or learning tools. This electrostatic recording card can be used as a recording medium in banking system, ID system, prepaid system, credit system, ticket-issuing system, medical diagnostic system, navigation system, electronic locking system, message system, game system, learning system, etc.

What we claim is:

1. An electrostatic information recording and reproducing method, characterized in that a photosensitive member having photoconductive layer with electrode on its front is placed face-to-face to an electrostatic information recording medium made of liquid crystal polymer layer and furnished with an electrode on backside, that exposure is performed without heating or by heating the electrostatic information recording medium up to the liquid crystal phase range with voltage applied between two electrodes, that the electrostatic information recording medium is separated and cooled in the case of heating after the exposure pattern is recorded along the orientation of liquid crystal polymer or the electrostatic information recording medium is heated and cooled down after it is separated following the image exposure to record the information, and that the exposure pattern thus recorded is reproduced through a polarization means.

2. An electrostatic information recording medium, characterized in that an electrode is provided on a substrate, a thermoplastic resin layer, electrophoretic substance layer or electrochromy layer and insulating are sequentially laminated on said electrode, or that electrophoretic substance layer or electrochromy layer and thermoplastic resin layer are sequentially laminated on said electrode, and that said substrate, electrode, thermoplastic resin layer and insulating layer are transparent or semi-transparent.

3. An electrostatic information recording medium according to claim 2, wherein said electrophoretic substance layer is an ionized dye layer.

4. An electrostatic information recording medium according to claim 2, wherein said electrophoretic substance layer is an ionized pigment layer.

5. An electrostatic information recording and reproducing method, characterized in that it comprises a photosensitive member having a photoconductive layer with an electrode on its front, that there is provided an electrostatic information recording medium having a substrate on its backside, that an electrode is laminated on said substrate, that thermoplastic resin layer, electrophoretic substance layer or electrochromy layer and insulating layer are sequentially laminated on said electrode, or that electrophoretic substance layer or electrochromy layer and thermoplastic resin layer are sequentially laminated, that said substrate, electrode, thermoplastic resin layer and insulating layer are transparent or semi-transparent, that photoconductive layer surface of said photosensitive member is placed face-to-face to the insulating layer surface of said electrostatic information recording medium on contact or non-contact basis, and that pattern exposure is performed by applying voltage between two electrodes and the electrostatic information recording medium is developed after the exposure by heat development.

6. An electrostatic information recording and reproducing method, characterized in that there is provided an electrostatic information recording medium, in which an insulating layer having electric charge transport property is laminated on electrode layer via a destructible electric charge injection preventive layer, that information is recorded by destroying the electric charge injection preventive layer by heating means and by turning the destroyed electric charge injection preventive layer to electrically conductive, and that the information is reproduced by performing total exposure on upper surface of insulating layer of the electrostatic information recording medium.

7. An electrostatic information recording and reproducing method according to claim 6, wherein said heating means is pattern exposure by laser beam.

8. An information recording and reproducing method, characterized in that there is provided an electrostatic information recording medium, which is furnished with an insulating layer having optical electric charge generating property and electric charge transport property, laminated on electrode layer via a destructible electric charge injection preventive layer, that a photosensitive member having photoconductive layer laminated on an electrode is provided, that the insulating layer of the electrostatic information recording medium and the photoconductive layer of photosensitive member are placed face-to-face to each other, that pattern exposure is performed with voltage applied between two electrodes, that electrostatic pattern is formed on the insulating layer and total exposure is performed on the insulating layer and information is recorded by destroying the electric charge injection preventive layer in the electrostatic pattern forming portion and turning it to electrically conductive, and that said electrostatic information is reproduced by total charging on the upper surface of the electrostatic information recording medium.

9. An electrostatic information recording and reproducing method according to claims 6, 7 or 8, wherein said method to reproduce the recorded electrostatic information is performed by toner development or by surface potential reading.

10. An electrostatic information recording and reproducing method, characterized in that there is provided an electro-optical element, which changes the optical property according to the effect of electric field, that an electrostatic information recording medium is provided, which comprises an electrode and an insulating layer on a support member and on which electric charge is accumulated, that said electro-optical element is placed face-to-face to said electrostatic information recording medium, that the electrodes of electro-optical element and electrostatic information recording medium are short-circuited with each other and light is irradiated to the electro-optical element, and that electric charge pattern is read by transmission light or reflected light.

11. An electrostatic information recording and reproducing method according to claim 10, wherein a reflection preventive layer is furnished on the side of the electrostatic information recording medium opposite to the electro-optical element, and that, after the electrodes of the electrostatic information recording medium and the electro-optical element are short-circuited, light is irradiated through the electrostatic information recording medium.

12. An electrostatic information recording and reproducing method according to claim 10, wherein the electro-optical element consists of electro-optical effect material, and that electric charge pattern is read by utilizing the change of refractive index of the electro-optical effect material by the effect of electric field.

13. An electrostatic information recording and reproducing medium, characterized in that the electro-optical element is a liquid crystal element having memory property, that electric charge pattern information is memorized in the liquid crystal element by short-circuiting the electrodes of electro-optical element and of electrostatic information recording medium, and that light is irradiated to the liquid crystal element through a polarizing plate and the information is read by transmission light or reflected light through a polarizing plate.

14. An electro-optical reading method according to claims 10 or 13, wherein reflection preventive layers are furnished on both sides of electro-optical element.

* * * * *